United States Patent
Konuma et al.

(10) Patent No.: US 7,175,781 B2
(45) Date of Patent: Feb. 13, 2007

(54) SOLID ELECTROLYTIC CAPACITOR AND METHOD FOR PRODUCING THE SAME

(75) Inventors: Hiroshi Konuma, Chiba (JP); Koro Shirane, Chiba (JP); Ryuji Monden, Nagano (JP); Atsushi Sakai, Nagano (JP); Yuji Furuta, Nagano (JP); Katsuhiko Yamazaki, Nagano (JP); Toru Sawaguchi, Nagano (JP); Hideko Ohata, Chiba (JP); Yoshiaki Ikenoue, Tokyo (JP)

(73) Assignee: Showa Denko K.K., Tokyo (JP)

( * ) Notice: Subject to any disclaimer, the term of this patent is extended or adjusted under 35 U.S.C. 154(b) by 129 days.

(21) Appl. No.: 10/939,569

(22) Filed: Sep. 14, 2004

(65) Prior Publication Data

US 2005/0030703 A1     Feb. 10, 2005

Related U.S. Application Data

(62) Division of application No. 09/963,331, filed on Sep. 26, 2001, now Pat. No. 6,807,049, which is a division of application No. 09/233,451, filed on Jan. 20, 1999, now Pat. No. 6,351,370.

(60) Provisional application No. 60/106,969, filed on Nov. 4, 1998, provisional application No. 60/106,968, filed on Nov. 4, 1998, provisional application No. 60/106,967, filed on Nov. 4, 1998.

(30) Foreign Application Priority Data

Mar. 19, 1998 (JP) ................... H10-70908
Apr. 22, 1998 (JP) ................... H10-112552

(51) Int. Cl.
*H01G 9/00* (2006.01)
*H01G 9/028* (2006.01)

(52) U.S. Cl. ............... 252/500; 252/62.2; 361/523; 361/524; 361/525; 361/527; 361/529; 29/25.03

(58) Field of Classification Search ........... 252/511, 252/519.21, 62.2, 500, 519.1; 361/523–529; 29/25.03

See application file for complete search history.

(56) References Cited

U.S. PATENT DOCUMENTS

| 4,780,796 A | 10/1988 | Fukuda et al. |
| 4,803,596 A | 2/1989 | Hellwig et al. |

(Continued)

FOREIGN PATENT DOCUMENTS

EP     0 652 576     5/1995

(Continued)

*Primary Examiner*—Mark Kopec
*Assistant Examiner*—Kallambella Vijayakumar
(74) *Attorney, Agent, or Firm*—Sughrue Mion, PLLC

(57) ABSTRACT

A solid electrolytic capacitor includes a valve acting metal having microfine pores, a dielectric film formed on a surface of the valve acting metal, and a solid electrolyte layer provided on the dielectric film, in which at least a portion of the solid electrolyte layer is of a lamellar structure. In particular, a solid electrolytic capacitor includes an electrically conducting polymer having a specified condensed ring structure containing (1) a solid electrolyte layer containing a sulfoquinone anion, and (2) a solid electrolyte layer containing an anthracenesulfonate ion and other anion.

22 Claims, 4 Drawing Sheets

U.S. PATENT DOCUMENTS

| | | |
|---|---|---|
| 4,910,645 A | 3/1990 | Jonas et al. |
| 4,959,753 A * | 9/1990 | Kudoh et al. ............ 361/525 |
| 5,223,120 A * | 6/1993 | Kojima et al. ............ 205/317 |
| 5,225,495 A * | 7/1993 | Han et al. ............ 525/327.4 |
| 5,436,796 A * | 7/1995 | Abe et al. ............ 361/525 |
| 5,455,736 A | 10/1995 | Nishiyama et al. |
| 5,473,503 A | 12/1995 | Sakata et al. |

FOREIGN PATENT DOCUMENTS

| | | |
|---|---|---|
| EP | 0 820 076 | 1/1998 |
| EP | 0 825 626 | 2/1998 |
| JP | 61-239617 | 10/1986 |
| JP | 61-240625 | 10/1986 |
| JP | 62-118509 | 5/1987 |
| JP | 62-118511 | 5/1987 |
| JP | 63-118323 | 5/1988 |
| JP | 2-242816 | 9/1990 |
| JP | 5-175082 | 7/1993 |
| JP | 8-53566 | 2/1996 |
| JP | 9-320901 | 12/1997 |
| JP | 10-32145 | 3/1998 |

* cited by examiner 15.0 μm 3.00 μm

SOLID ELECTROLYTIC CAPACITOR AND METHOD FOR PRODUCING THE SAME

This is a divisional of application Ser. No. 09/963,331 filed Sep. 26, 2001 now U.S. Pat. No. 6,807,049, which is a divisional of application Ser. No. 09/233,451, now U.S. Pat. No. 6,351,370, filed Jan. 20, 1999, which claims benefit of Provisional Application Nos. 60/106,967, 60/106,968 and 60/106,969 filed Nov. 4, 1998; the disclosures of which are incorporated herein by reference in their entirety.

TECHNICAL FIELD

The present invention relates to a solid electrolytic capacitor utilizing a specified electrically conducting polymer as a solid electrolyte. More specifically, the present invention relates to a solid electrolytic capacitor capable of realizing down-sizing, high capacity and low impedance of the electrolytic capacitor and having good moisture-resistant load characteristic and excellent head resistance as well as excellent thermal stress relaxation characteristic and to a method for production of the same.

BACKGROUND ART

A solid electrolytic capacitor is a device which comprises a metal foil subjected to etching treatment and having a large specific surface area (anode substrate) on which is formed an oxide dielectric layer and a solid semiconductor layer (hereinafter simply referred to as a solid electrolyte) as an opposing electrode outside the oxide dielectric layer and preferably further an electric conductor layer such as an electrically conducting paste. The device has an cathode lead terminal connected to the metal foil and an anode terminal connected to the electric conductor layer and as a whole is completely sealed by an epoxy resin or the like and is put into use as a capacitor part in electric products over a wide range.

As the method for forming a solid electrolyte layer, there have conventionally been known a method of fusing a solid electrolyte onto a dielectric layer which has been formed on a metal surface and has a porous or fine void structure to form a solid electrolyte layer on the dielectric layer and a method by producing a solid electrolyte on a dielectric layer.

According to recent digitalization of electronic equipment, an increase in the operation speed of personal computers, a compact capacitor having a high capacity and a low impedance in high-frequency regions is being demanded. Hitherto, as a capacitor having a high capacity, there have been known electrolytic capacitors such as an aluminum electrolytic capacitor and a tantalum electrolytic capacitor. However, an aluminum electrolytic capacitor has problems that it has a high impedance in high frequency regions because it uses an ion conducting liquid electrolyte and also has a poor temperature characteristic. A tantalum capacitor, which uses manganese oxide as the electrolyte, has a problem that it has a high impedance in high frequency regions since the manganese oxide has a relatively high specific resistance.

To cope with the problems, it has been heretofore proposed to use an electrically conducting polymer having an electron conductivity as the solid electrolyte. For example, there has been known use of polymers such as an intrinsic electrically conducting polymer having an electric conductivity of $10^{-3}$ to $10^3$ S/cm [JP-A-1-169914 (the term "JP-A" as used herein means laid-open publication of unexamined Japanese patent application) (U.S. Pat. No. 4,803,596)], polyaniline (JP-A-61-239617), polypyrrole (JP-A-61-240625), polythiophene derivative (JP-A-2-15611 (U.S. Pat. No. 4,910,645)), and polyisothianaphthene (JP-A-62-118511). Many of these electrically conducting polymers comprising a π-conjugated system are used as a composition containing a dopant. Further, recently, not only dopants are used singly but also they are used in combination with manganese dioxide (JP-B-6-101418 (the term "JP-B" as used herein means publication of examined Japanese patent application) (U.S. Pat. No. 4,959,753)) or a filler (JP-A-9-320901).

Thus, the reason why electrically conducting polymers are drawing an attention as the solid electrolyte is that they may be improved to have a sufficiently high electric conductivity. However, there is a problem in that if the electric conductivity is higher than a proper range, the leakage current greatly increases to cause short circuit, whereas if it is lower than the proper range, the frequency properties are deteriorated to cause a large reduction in the capacity. Accordingly, it is a subject of development how to control the electric conductivity of the solid electrolyte in a proper range and attain the heat resistance and thermal stability thereof.

On the other hand, as the method for forming a solid electrolyte layer, there have hitherto been known a method of forming by fusion a solid electrolyte layer on a dielectric layer of a valve acting metal surface having a microfine porous or void structure and a method of producing the above-mentioned electrically conducting polymer on a dielectric layer. More specifically, for example, in the case of using a polymer of a 5-membered heterocyclic compound such as pyrrole or thiophene, there have been known a method where an anode foil is dipped in a solution of a 5-membered heterocyclic compound in a lower alcohol/water, and then dipped in an aqueous solution having dissolved therein an oxidizing agent and an electrolyte to give rise to chemical polymerization, thereby forming an electrically conducting compound (JP-A-5-175082), and a method where a 3,4-dioxyethylenethiophene monomer and an oxidizing agent each preferably in the form of a solution are applied separately differing in time or simultaneously on an oxide cover layer of a metal foil to thereby form a solid electrolyte layer (JP-A-2-15611 (U.S. Pat. No. 4,910,645) and JP-A-10-32145 (European Patent Application Laid-open No. 820076(A2)). In particular, JP-A-10-32145 (European Patent Application Laid-open No. 820076(A2)) discloses polymers of a monomer selected from pyrrole, thiophene, furan, aniline and derivatives thereof and doped with an aromatic polysulfonic acid having a plurality of sulfonic acid groups in the molecular structure and also discloses as a production method, a polymerization method in which a monomer is introduced after a mixed solution of the above-mentioned monomer and an oxidizing agent is coated and dried or after an oxidizing agent is introduced. Also, JP-A-10-32145 (European Patent Application Laid-open No. 820076(A2)) discloses a production method in which the dopant of the aromatic polysulfonic acid is utilized as a constituent component of the oxidizing agent (ferric salt) and describes that the solid electrolytic capacitor provided therewith has an advantage that it is excellent in high temperature resistance and prevention of deterioration of static capacity. As the oxidizing agent used in the prior art in the case of chemical polymerization of 5-membered aromatic cyclic compounds, for example, thiophene, there have been known iron (III) chloride, $Fe(ClO_4)_3$, organic acid iron (III) salt, inorganic acid iron (III) salt, alkyl persulfate, ammonium persulfate (hereafter, abbreviated as APS), hydrogen peroxide, $K_2Cr_2O_7$, etc. (JP-A-2-15611 (U.S. Pat. No. 4,910,645)), cupric compounds, silver compounds, etc. (JP-A-10-32145 (European Patent Application Laid-open No. 820076(A2)).

More specifically, the capacitor comprising a solid electrolyte of the manganese dioxide is disadvantageous in that the oxide layer is ruptured at the thermal decomposition of manganese nitrate and the impedance property is unsatisfactory. Use of lead dioxide must be accompanied with a consideration on the environment.

The solid electrolytic capacitor using a tetracyanoquinodimethane (TCNQ) complex salt has good heat fusion workability and excellent electric conductivity but the TCNQ complex salt itself is said to have a problem in the heat resistance and in turn, a poor reliability in the soldering heat resistance.

In order to overcome these problems, the above-mentioned electrically conducting polymer such as polypyrrole is applied to the solid electrolyte on a dielectric surface by electrochemical polymerization or chemical polymerization but the conventional capacitors with electrically conducting polymer such as polypyrrole has a problem that their capacitor characteristics vary greatly depending on the humidity resistance load.

Further, as associated with humidity resistance load, heat resistance is highly demanded. For example, soldering heat resistance (reflow characteristic) when a capacitor element is molded into a capacitor component is laid importance so that a capacitor element having a high heat resistance is demanded.

The electrically conducting polymer layer as a solid electrolyte must have a high conductivity and be a heat resistant material which can be formed so as to cover all the inner surfaces of the pore cavities inside the anode and endure the above-mentioned soldering temperature. In addition, the following conditions are required therefor.

That is, firstly, it can relax thermal stress generated by soldering, etc., secondly it has good adhesion both mechanically and electrically with an electrically conducting paste layer formed on the electrically conducting polymer layer, and thirdly it has a good ability of repairing an oxide dielectric film when it is conducted electrically.

With respect to the first condition of relaxation of thermal stress, it has been proposed to form an electrically conducting polymer layer having a certain thickness on the outer surface of anode on which an oxide dielectric film has been formed. To achieve this, there have been disclosed a method in which a first electrically conducting polymer layer which serves as a precoat layer is formed by chemical polymerization and then a second electrically conducting polymer layer is formed by electrolytic polymerization using the first polymer layer as an electrode (JP-A-63-173313 (U.S. Pat. No. 4,780,796) and a method in which a solution of electrically conducting polymer containing a filler is coated to form an electrically conducting polymer layer (JP-A-9-320901). The ability of relaxing thermal stress is influenced not only by the thickness of the layer but also by the structure of the layer. As the electrically conducting polymer having a different macroscopic structure, there has been disclosed a sponge-like electrically conducting polymer molded article containing the electrically conducting polymer as a continuous phase (JP-A-8-53566).

With respect to the improvement in the adhesion between the second electrically conducting polymer layer and the electrically conducting paste layer, it has been proposed to form unevenness on the surface of the electrically conducting polymer layer. To achieve this, there have been disclosed a method in which a solution having mixed therein microfine powder is coated as it is on a first electrically conducting polymer layer to provide the microfine powder and then a second electrically conducting polymer layer is formed thereon (JP-A-7-94368 (U.S. Pat. No. 5,473,503)) and a method in which microfine electrically conducting polymer powder is injected or sprayed as contained in a gas or liquid flow on a first electrically conducting polymer layer and then a second electrically conducting polymer layer is formed thereon (JP-A-9-320898 (European Patent Application Laid-open No. 825626(A2)).

With respect to the improvement in the ability of repairing oxide dielectric film as the third point, a method has been disclosed in which a tantalum solid electrolytic capacitor has a structure that has an electrically conducting polymer compound covers an oxide dielectric film so that cavities remain in the pores and is provided with an oxygen source to enable insulation of the electrically conducting polymer compound upon electric conduction (JP-A-7-122464 (U.S. Pat. No. 5,455,736)).

As stated above, the conventional electrically conducting polymers are insufficient in heat resistance.

Also, the method proposed for the relaxation of thermal stress is disadvantageous in that the electrically conducting polymer layer formed by electrolytic polymerization has less surface unevenness and the adhesion with the electrically conducting paste layer is poor. In the method of forming an electrically conducting polymer layer having a certain thickness by coating an electrically conducting polymer solution containing a filler (JP-A-9-320901), the ability of relaxing thermal stress per thickness of the polymer layer is low so that the polymer layer has to have a relatively large thickness, which is disadvantageous for the down-sizing and increasing capacity of the device.

The sponge-like electrically conducting polymer molded article (JP-A-8-53566) is not applied to a solid electrolytic capacitor and the production method for the sponge-like electrically conducting polymer molded article according to the invention described in this prior art is a method in which an electrically conducting polymer solution is cooled to freeze the solvent and carry out polymerization and thereafter the solvent is removed by freeze-drying or thawing and hence its operation is cumbersome and further the oxide dielectric film tends to suffer damages upon freezing and thawing, so that it cannot be said to be a method which is applicable to solid electrolytic capacitors.

Next, with respect to the proposal for improving the adhesion with the electrically conducting paste layer by forming unevenness on the surface of the electrically conducting polymer layer, the method in which a solution having mixed therein microfine powder is coated as it is on a first electrically conducting polymer layer to provide the microfine powder (JP-A-7-94368 (U.S. Pat. No. 5,473,503)) has a problem that the conditions of forming unevenness fluctuate in a device or lot or between lots. Also, the method in which microfine powder of an electrically conducting polymer is injected or sprayed as contained in a gas or liquid flow on a first electrically conducting polymer layer (JP-A-9-320898 (European Patent Application Laid-open No. 825626(A2))) has a problem that the ability of relaxing thermal stress per thickness of the polymer layer is low so that the polymer layer is required to have a relatively large thickness, which is disadvantageous for the down-sizing and increasing capacity of the device.

Further, a proposal has been made to improve the ability of repairing the oxide dielectric film. In the method in which an electrically conducting polymer compound covers the oxide dielectric film with leaving cavities in the pores (JP-A-7-122464 (U.S. Pat. No. 5,455,736)), the ratio of cavities in the pores is adjusted by repetition of oxidative polymerization so that when formation of a thick layer of electrically conducting polymer on the outer surface of the anode is contemplated the cavities already existing in the pores tend to be closed. Therefore, there is a problem that the formation of an electrically conducting polymer layer having a certain thickness on the outer surface and securing cavities in the pores are not fulfilled simultaneously. Also there is a problem that failure of forming unevenness on the surface of the polymer layer results in a poor adhesion with the electrically conducting paste layer.

As described above, upon the production of a capacitor, further improvements are required on the material for the solid electrolyte, production method thereof, heat stability, homogeneity of the film and the like.

Under these circumstances, an object of the present invention is to provide a solid electrolytic capacitor having excellent heat resistance comprising an electrically conducting polymer layer excellent in the ability of relaxing thermal stress, adhesion with an electrically conducting paste layer, ability of repairing an oxide dielectric film.

Also, an object of the present invention is to provide a capacitor satisfying the requirements with respect to the reduction in the weight, high capacity, high frequency property, tan δ, leakage current, heat resistance (reflow property), durability, etc.

Further, an object of the present invention is to provide a method for the production of an electrolytic capacitor having the above-mentioned properties and thereby providing a solid electrolytic capacitor which is excellent in not only initial properties such as loss factor, leakage current, heat resistance, equivalent series resistance and impedance in high frequency regions but also durability in a sparking voltage test, long-term reliability (durability under high temperature and high humidity conditions, etc.).

DISCLOSURE OF THE INVENTION

The present inventors have made intensive research on the chemical structure and lamellar structure of an electrically conducting polymer layer as a solid electrolyte with view to achieving the above-mentioned objects and as a result they have found that use of an electrically conducting polymer having a lamellar structure can solve the problems of ability of relaxing thermal stress, etc.

That is, as a result of intensive research on the kind, combination, content, etc. of dopant anions in the electrically conducting polymer composition as the solid electrolyte, it has now been found that a high performance solid electrolytic capacitor which is small in size, has a low impedance and exhibits durability in a sparking voltage test can be obtained by providing a solid electrolytic capacitor comprising opposite electrodes, a dielectric layer having pores comprised by a metal oxide on a surface of a valve acting metal foil as one of electrodes, and a solid electrolyte comprised by an electrically conducting polymer compound with (1) a sulfoquinone having at least one sulfoanion group and a quinone structure in the molecule and an anion other than the sulfoquinone, having a dopant function in combination in the solid electrolyte or (2) at least one anthracene monosulfonic acid selected from anthracenesulfonic acid or derivatives thereof having a sulfonic acid group as a dopant in the solid electrolyte.

Based on the above-described findings, the present invention provides the following solid electrolytic capacitors and methods for the production of the same.

(1) A solid electrolytic capacitor comprising a valve acting metal having pores, a dielectric film formed on a surface of the valve acting metal, and a solid electrolyte layer provided on the dielectric film, wherein at least a portion of the solid electrolyte layer is of a lamellar structure.

(2) The solid electrolytic capacitor described in (1) above, in which the solid electrolyte layer is formed on an outer surface of the dielectric film or on the outer surface and inside the pores.

(3) The solid electrolytic capacitor as described in (1) or (2) above, in which at least a portion of interlayer portion in the lamellar structure comprises a space portion.

(4) The solid electrolytic capacitor as described in any one of (1) to (3) above, in which each unit layer of the solid electrolyte constituting the lamellar structure has a thickness in the range of 0.01–5 μm and a total thickness of the solid electrolyte layer is in the range of 1–200 μm.

(5) The solid electrolytic capacitor as described in any one of (1) to (4) above, in which the solid electrolyte layer comprises a composition containing a π-electron conjugated system polymer and/or other electrically conducting polymer.

(6) The solid electrolytic capacitor as described in (5) above, in which the electrically conducting polymer comprises as a repeating unit a structural unit represented by general formula (I) below

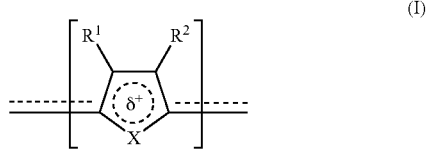

(wherein the substituents $R^1$ and $R^2$ each independently represents hydrogen atom, a linear or branched, saturated or unsaturated C1–6 (meaning 1 to 6 carbon atoms, hereafter the same) alkyl group, a linear or branched, saturated or unsaturated C1–6 alkoxy group, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, X represents a hetero atom selected from S, O, Se, Te or $NR^3$, $R^3$ represents a hydrogen atom, a linear or branched, saturated or unsaturated C1–6 alkyl group, a phenyl group or a linear or branched, saturated or unsaturated C1–6 alkoxy, the alkyl group and the alkoxy group represented by $R^1$, $R^2$ or $R^3$ may optionally contain in the chain thereof a carbonyl bond, an ether bond, an ester bond, an amide bond or an imino bond, and δ represents a number of from 0 to 1).

(7) The solid electrolytic capacitor as described in (5) above, in which the electrically conducting polymer comprises as a repeating unit a structural unit represented by general formula (II) below

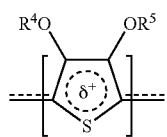

(wherein the substituents $R^4$ and $R^5$ each independently represents hydrogen atom, a linear or branched, saturated or unsaturated C1–6 alkyl group or a substituent for forming at least one 5-, 6- or 7-membered structure containing the two oxygen elements shown in the formula by combining the C1–6 alkylene groups to each other at any position, the ring structure formed in the scope thereof includes a chemical structure such as a vinylene group which may be substituted and a phenylene group which may be substituted, and δ represents a number of from 0 to 1).

(8) The solid electrolytic capacitor as described in (5) above, in which the electrically conducting polymer is a condensed heteropolycyclic polymer comprising as a repeating unit a structural unit represented by general formula (III) below

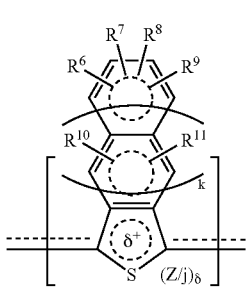

(wherein the substituents $R^6$, $R^7$, $R^8$, $R^9$, $R^{10}$ and $R^{11}$ each independently represents a monovalent group selected from the group consisting of a hydrogen atom, a linear or branched, saturated or unsaturated C1–10 alkyl, alkoxy or alkyl ester group, a halogen atom, a nitro group, a cyano group, a primary, secondary or tertiary amino group, a trihalomethyl group, a phenyl group and a substituted phenyl group, the alkyl chains of $R^6$, $R^7$, $R^8$, $R^9$, $R^{10}$ and $R^{11}$ may combine to each other at any position to form at least one divalent chain for forming at least one 3-, 4-, 5-, 6- or 7-membered saturated or unsaturated hydrocarbon cyclic structure together with the carbon atoms to which the substituents are bonded, the alkyl group, the alkoxy group or the alkyl ester group of $R^6$, $R^7$, $R^8$, $R^9$, $R^{10}$ or $R^{11}$ or the cyclic hydrocarbon chain formed by the substituents may contain any number of any of carbonyl, ether, ester, amide, sulfide, sulfinyl, sulfonyl and imino bonds, k represents a number of the condensed ring enclosed by the thiophene ring and the benzene ring having substituents $R^6$ to $R^9$ and represents an integer of from 0 to 3 excluding a form in which all of $R^6$ to $R^9$ represent a hydrogen atom from among derivatives in which k=0, and the condensed ring may optionally contain 1 to 2 nitrogen atoms (N) or N-oxide, δ is in the range of 0 to 1, Z represents an anion, j is a valency of Z and is 1 or 2.)

(9) The solid electrolytic capacitor as described in (8) above, in which the condensed heteropolycyclic polymer represented by general formula (III) is a condensed heteropolycyclic polymer comprising represented by general formula (IV) below where k=0

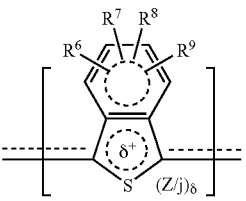

(wherein $R^6$, $R^7$, $R^8$, $R^9$, δ, Z and j are the same as in formula (III), and the condensed ring may optionally contain 1 to 2 nitrogen atoms (N) or N-oxide).

(10) The solid electrolytic capacitor as described in (9) above, in which the condensed heteropolycyclic polymer represented by general formula (IV) above is a condensed heteropolycyclic polymer selected from 5,6-dioxymethylene-isothianaphthenylene polymer and and 5,6-dimethoxy-isothianaphthenylene polymer.

(11) The solid electrolytic capacitor as described in (8) above, in which the condensed heteropolycyclic polymer represented by general formula (III) is a condensed heteropolycyclic polymer comprising represented by general formula (V) below where k=1

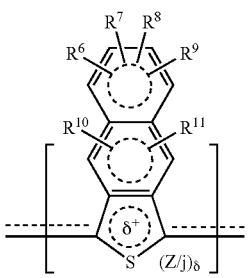

(wherein $R^6$, $R^7$, $R^8$, $R^9$, $R^{10}$, $R^{11}$, δ, Z and j are the same as in formula (III), and the condensed ring may optionally contain 1 to 2 nitrogen atoms (N) or N-oxide).

(12) The solid electrolytic capacitor as described in (5) above, in which the electrically conducting polymer is an electrically conducting polythiophene and the composition containing the electrically conducting polythiophene contains a sulfate ion in the range of 0.1–10 mol % and a naphthalenesulfonate ion in the range of 1–50 mol %.

(13) The solid electrolytic capacitor as described in (12) above, in which the electrically conducting polythiophene contains as a repeating unit the structural unit represented by general formula (II) described in (7) above.

(14) The solid electrolytic capacitor as described in (12) or (13) above, in which the sulfate ion is derived from a reduced form of persulfate.

(15) A solid electrolytic capacitor comprising a valve acting metal having pores, a dielectric film formed on a surface of the valve acting metal, and a solid electrolyte layer comprising an electrically conducting polymer composition layer provided on the dielectric film, in which the composition contains sulfoquinone anion having at least one sulfo anion group and a quinone structure in the molecule in an amount of 0.1–50 mol % and an anion other than the sulfoquinone anion in the range of 0.1–10 mol %.

(16) The solid electrolytic capacitor as described in (15) above, in which a main chain of the electrically conducting polymer in the composition contains a structural unit represented by general formula (I) below

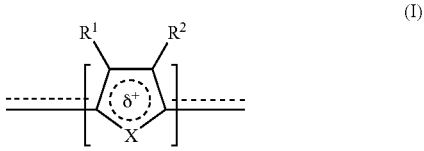

(wherein the substituents $R^1$ and $R^2$ each independently represents hydrogen atom, a linear or branched, saturated or unsaturated C1–6 alkyl, a linear or branched, saturated or unsaturated C1–6 alkoxy group, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, X represents a hetero atom selected from S, O, Se, Te or $NR^3$, $R^3$ represents H, a linear or branched, saturated or unsaturated C1–6 alkyl group, a phenyl group or a linear or branched, saturated or unsaturated C1–6 alkoxy group, the alkyl group and the alkoxy group represented by $R^1$, $R^2$ or $R^3$ may optionally contain in the chain thereof a carbonyl bond, an ether bond, an ester bond, an amide bond or an imino bond, and δ represents a number of from 0 to 1).

(17) The solid electrolytic capacitor as described in (16) above, in which the structural unit represented by formula (I) is a chemical structure represented by the following formula (II):

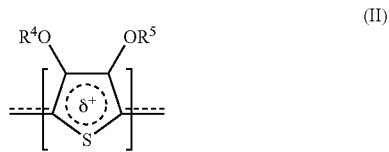

(wherein the substituents $R^4$ and $R^5$ each independently represents hydrogen atom, a linear or branched, saturated or unsaturated C1–6 alkyl group or a substituent for forming at least one 5-, 6- or 7-membered heterocyclic structure containing the two oxygen elements shown in the formula by combining the C1–6 alkyl groups to each other at any position, the ring structure formed in the scope thereof includes a chemical structure such as a vinylene group which may be substituted and a substituted phenylene group which may be substituted, and δ represents a number of from 0 to 1).

(18) The solid electrolytic capacitor as described in any one of (15) to (17), in which a base structure of the sulfoquinone anion is at least one selected from the group consisting of p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornadione, 9,10-phenanthrenequinone, and 2,7-pyrenequinone.

(19) The solid electrolytic capacitor as described in (18) above, in which the sulfoquinone contains in the molecule thereof a sulfoquinone having at least one sulfoanion group and a quinone structure and a hydroquinone structure and/or quinhydrone structure thereof produced from the sulfoquinone.

(20) The solid electrolytic capacitor as described in any of (15) to (19) above, in which the anion other than the sulfoquinone anion is a reduced form anion of an oxidizing agent.

(21) The solid electrolytic capacitor as described in (20) above, in which the reduced form anion of an oxidizing agent is a sulfate ion.

(22) A solid electrolytic capacitor comprising a valve acting metal having pores, a dielectric film formed on a surface of the valve acting metal, and a solid electrolyte layer comprising an electrically conducting polymer composition layer provided on the dielectric film, in which the composition contains at least one anthracenemonosulfonate anion selected from anthracenesulfonic acid having a sulfonate group or derivatives thereof as a dopant.

(23) The solid electrolytic capacitor as described in (22) above, in which the solid electrolytic capacitor as described in (22) above, in which the anthracenemonosulfonate anion is contained in the range of 0.1–50 mol % of total repeating unit of the electrically conducting polymer.

(24) The solid electrolytic capacitor as described in (22) or (23) above, which contains in addition to the anthracene monosulfonate anion a reduced form anion of an oxidizing agent in the range of 0.1–10 mol %.

(25) The solid electrolytic capacitor as described in (24) above, in which the reduced form anion of an oxidizing agent is a sulfate ion.

(26) The solid electrolytic capacitor as described in any one of (22) to (25) above, in which the anthracenesulfonic acid derivative is anthracenemonosulfonic acid of which at least one of hydrogen atoms on an anthracene ring is substituted by a C1–12 linear or branched, saturated or unsaturated alkyl group or alkoxy group.

(27) The solid electrolytic capacitor as described in (22) above, in which a main chain of the electrically conducting polymer in the composition contains a structural unit represented by general formula (I) below

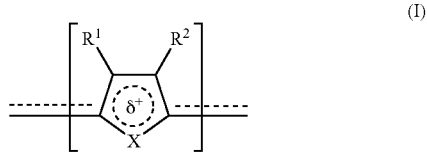

(wherein the substituents $R^1$ and $R^2$ each independently represents hydrogen atom, a linear or branched, saturated or unsaturated C1–6 alkyl, a linear or branched, saturated or unsaturated C1–6 alkoxy group, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, X represents a hetero atom selected from S, O, Se, Te or $NR^3$, $R^3$ represents H, a linear or branched, saturated or unsaturated C1–6 alkyl group, a phenyl group or an alkoxy group having a linear or branched, saturated or unsaturated C1–6 hydrocarbon group, the alkyl group and the alkoxy group represented by $R^1$, $R^2$ or $R^3$ may optionally contain in the chain thereof a carbonyl bond, an ether bond, an ester bond, an amide bond or an imino bond, and δ represents a number of from 0 to 1).

(28) The solid electrolytic capacitor as described in (27) above, in which the structural unit represented by formula (I) is a chemical structure represented by the following formula (II):

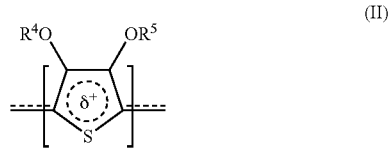

(wherein the substituents $R^4$ and $R^9$ each independently represents hydrogen atom, a linear or branched, saturated or unsaturated C1–6 alkyl group or a substituent for forming at least one 5-, 6- or 7-membered cyclic structure containing the two oxygen elements shown in the formula by combining the C1–6 alkyl groups to each other at any position, the ring structure formed in the scope thereof includes a chemical structure such as a vinylene group which may be substituted and a substituted phenylene group which may be substituted, and δ represents a number of from 0 to 1).

(29) A method for producing a solid electrolytic capacitor as described in (1) above comprising a valve acting metal having pores, a dielectric film formed on a surface of the valve acting metal, and a solid electrolyte layer provided on the dielectric film, the method comprising polymerizing a condensed heteropolycyclic compound represented by the following formula (VI):

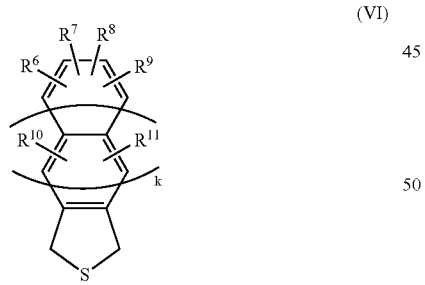

(wherein the substituents $R^6$, $R^7$, $R^8$, $R^9$, $R^{10}$ and $R^{11}$ each independently represents a monovalent group selected from the group consisting of H, a linear or branched, saturated or unsaturated C1–10 alkyl, alkoxy or alkylester group, a halogen, a nitro group, a cyano group, a primary, secondary or tertiary amino group, a trihalomethyl group, a phenyl group and a substituted phenyl group, the alkyl chains of $R^6$, $R^7$, $R^8$, $R^9$, $R^{10}$ and $R^{11}$ may combine to each other at any position to form at least one divalent chain for forming at least one 3-, 4-, 5-, 6- or 7-membered saturated or unsaturated hydrocarbon cyclic structure together with the carbon atoms to which the substituents are bonded, the alkyl group, the alkoxy group or the alkylester group of $R^6$, $R^7$, $R^8$, $R^9$, $R^{10}$ or $R^{11}$ or the cyclic hydrocarbon chain formed by the substituents may contain any of carbonyl, ether, ester, amide, sulfide, sulfinyl, sulfonyl and imino bonds, k represents a number of the condensed ring enclosed by the thiophene ring and the benzene ring having substituents $R^6$ to $R^9$ and represents an integer of from 0 to 3, and the condensed ring may optionally contain nitrogen or N-oxide) alone or together with another anion having a dopant ability, on the dielectric film formed on a porous valve acting metal surface by the action of an oxidizing agent to form a solid electrolyte layer on the dielectric film.

(30) The method for producing a solid electrolytic capacitor, as described in (29) above, in which as the condensed heteropolycyclic compound, there is used at least one member selected from dihydroisothianaphthene, dihydronaphtho[2,3-c]thiophene and dihydrothieno[3,4-b]quinoxaline derivatives.

(31) The method for producing a solid electrolytic capacitor, as described in (29) above, in which at least one member selected from 1,3-dihydroisothianaphthene, 5,6-dioxymethylene-1,3-dihydroisothianaphthene, 5,6-dimethoxy-1,3-dihydroisothianaphthene, 1,3-dihydronaphtho[2,3-c]thiophene and 1,3-dihydrothieno[3,4-b]quinoxaline.

(32) A method for producing a solid electrolytic capacitor as described in (1) above comprising a valve acting metal having pores, a dielectric film formed on a surface of the valve acting metal, and a solid electrolyte layer provided on the dielectric film, the method comprising polymerizing a condensed heteropolycyclic compound represented by the following formula (VII):

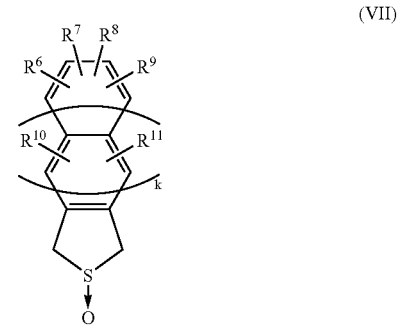

(wherein the substituents $R^6$, $R^7$, $R^8$, $R^9$, $R^{10}$ and $R^{11}$ and k have the same meanings as in general formula (VI) described in (29) above, and the condensed ring may optionally contain 1 to 2 nitrogen atoms (N) or N-oxide) alone or together with another anion having a dopant ability, on the dielectric film formed on a porous valve acting metal surface by the action of an oxidizing agent to form a solid electrolyte layer on the dielectric film.

(33) The method for producing a solid electrolyte as described in (32) above, in which as the condensed heteropolycyclic compound, there is used at least one member selected from dihydroisothianaphthene-2-oxide, dihydronaphtho[2,3-c]thiophene-2-oxide and dihydrothieno[3,4-b]quinoxaline-2-oxide derivatives.

(34) The method for producing a solid electrolytic capacitor, as described in (32) above, in which at least one member selected from 1,3-dihydroisothianaphthene-2-oxide, 5,6-dioxymethylene-1,3-dihydroisothianaphthene-2-oxide, 5,6-dimethoxy-1,3-dihydroisothianaphthene-2-oxide, 1,3-dihydronaphtho[2,3-c]thiophene-2-oxide and 1,3-dihydrothieno[3,4-b]quinoxaline-2-oxide.

(35) A method for producing a solid electrolytic capacitor as described in (1) above comprising a valve acting metal having pores, a dielectric film formed on a surface of the valve acting metal, and an electrically conducting polythiophene composition as a solid electrolyte provided on the dielectric film, the method comprising polymerizing a thiophene monomer represented by the following formula (IX):

(wherein $R^4$ and $R^5$ have the same meanings as defined in (17) above) in the presence of naphthalenesulfonate anion by the action of a persulfate to form a solid electrolyte layer on the dielectric film.

(36) The method for producing a capacitor as described in (35) above, in which the persulfate is ammonium persulfate or potassium persulfate.

(37) The method for producing a capacitor as described in any one of (29) to (36) above, in which the polymerization by the action of an oxidizing agent within the metal oxide pores in the dielectric layer is repeated at least twice.

(38) A method for producing a capacitor as described in (15) above comprising a valve acting metal having pores, a dielectric film formed on a surface of the valve acting metal, and a solid electrolyte layer comprising an electrically conducting polymer composition layer provided on the dielectric film, in which the method comprises polymerizing a monomer compound represented by the following formula (VIII):

(wherein $R^1$, $R^2$ and X have the same meanings as defined in (16) above) in the presence of a compound which donates a sulfoquinone anion by the action of an oxidizing agent to form a solid electrolyte layer.

(39) The method for producing a solid electrolytic capacitor as described in (38) above, in which the monomer compound represented by general formula (VIII) above is a compound represented by the following general formula (IX):

(wherein $R^4$ and $R^5$ have the same meanings as defined in (17) above).

(40) A method for producing a solid electrolytic capacitor as described in (15) above comprising a valve acting metal having pores, a dielectric film formed on a surface of the valve acting metal, and a solid electrolyte layer comprising an electrically conducting polymer composition provided on the dielectric film, the method comprising polymerizing a monomer by the action of an oxidizing agent to form a solid electrolyte layer on the dielectric film, in which the method comprises the steps of dipping the valve acting metal having formed thereon the dielectric film layer in a solution containing a monomer compound, and dipping in a solution containing an oxidizing agent and a sulfoquinone anion.

(41) The method for producing a solid electrolytic capacitor as described in (40) above, in which the valve acting metal having formed thereon the dielectric film layer is dipped in a solution containing a monomer compound and then in a solution containing an oxidizing agent and a sulfoquinone anion.

(42) The method for producing a solid electrolytic capacitor as described in (43) above, in which the method comprises the step of repeating in a plurality of times the steps of dipping the valve acting metal having formed thereon the dielectric film layer in a solution containing a monomer compound and then dipping the metal in a solution containing an oxidizing agent and a sulfoquinone anion.

(43) The method for producing a solid electrolytic capacitor as described in (42) above, in which the method comprises the step of repeating in a plurality of times the steps of dipping the valve acting metal having formed thereon the dielectric film layer in a solution containing a monomer compound and then dipping the metal in a solution containing an oxidizing agent and a sulfoquinone anion, followed by washing and drying.

(44) The method for producing a solid electrolytic capacitor as described in (40) above, in which the method comprises the step of dipping the valve acting metal having formed thereon the dielectric film in a solution containing an oxidizing agent and a sulfoquinone anion and then dipping the metal in a solution containing a monomer compound.

(45) The method for producing a solid electrolytic capacitor as described in (44) above, in which the method comprises the step of repeating in a plurality of times the steps of dipping the valve acting metal having formed thereon the dielectric film in a solution containing an oxidizing agent and a sulfoquinone anion and then dipping the metal in a solution containing a monomer compound.

(46) The method for producing a solid electrolytic capacitor as described in (45) above, in which the method comprises the step of repeating in a plurality of times the steps of dipping the valve acting metal having formed thereon the dielectric film in a solution containing an oxidizing agent and a sulfoquinone anion and then dipping the metal in a solution containing a monomer compound, followed by washing and drying.

(47) A method for producing a solid electrolytic capacitor as described in (15) above comprising a valve acting metal having pores, a dielectric film formed on a surface of the valve acting metal, and a solid electrolyte layer comprising an electrically conducting polymer composition provided on the dielectric film, the method comprising polymerizing a monomer by the action of an oxidizing agent to form a solid electrolyte layer on the dielectric film, in which the method comprises the steps of dipping the valve acting metal having formed thereon the dielectric film layer in a solution containing an oxidizing agent and of dipping the metal in a solution containing a monomer compound and a sulfoquinone anion.

(48) The method for producing a solid electrolytic capacitor as described in (47) above, in which the valve acting metal having formed thereon the dielectric film layer is dipped in a solution containing an oxidizing agent and then in a solution containing a monomer compound and a sulfoquinone anion.

(49) The method for producing a solid electrolytic capacitor as described in (48) above, in which the method comprises the step of repeating in a plurality of times the steps of dipping the valve acting metal having formed thereon the dielectric film layer in a solution containing an oxidizing agent and then dipping the metal in a solution containing a monomer compound and a sulfoquinone anion.

(50) The method for producing a solid electrolytic capacitor as described in (49) above, in which the method comprises the step of repeating in a plurality of times the steps of dipping the valve acting metal having formed thereon the dielectric film layer in a solution containing an oxidizing agent and then dipping the metal in a solution containing a monomer compound and a sulfoquinone anion, followed by washing and drying.

(51) The method for producing a solid electrolytic capacitor as described in (47) above, in which the valve acting metal having formed thereon the dielectric film layer is dipped in a solution containing a monomer compound and a sulfoquinone anion and then in a solution containing an oxidizing agent.

(52) The method for producing a solid electrolytic capacitor as described in (51) above, in which the method comprises the step of repeating in a plurality of times the steps of dipping the valve acting metal having formed thereon the dielectric film layer in a solution containing a monomer compound and a sulfoquinone anion and then dipping the metal in a solution containing an oxidizing agent.

(53) The method for producing a solid electrolytic capacitor as described in (52) above, in which the method comprises the step of repeating in a plurality of times the steps of dipping the valve acting metal having formed thereon the dielectric film layer in a solution containing a monomer compound and a sulfoquinone anion and then dipping the metal in a solution containing an oxidizing agent, followed by washing and drying.

(54) The method for producing a solid electrolytic capacitor as described in any one of (38) to (53) above, in which the oxidizing agent is a persulfate.

(55) The method for producing a solid electrolytic capacitor as described in any one of (40) to (53) above, in which the oxidizing agent is a persulfate and the monomer compound is a compound represented by the following general formula (VIII)

(wherein $R^1$, $R^2$ and X have the same meanings as defined in (16) above)

(56) The method for producing a solid electrolytic capacitor as described in (55) above, in which the monomer compound represented by the general formula (VIII) above is a compound represented by the following general formula (IX)

(wherein $R^4$ and $R^5$ have the same meanings as defined in (17) above).

(57) A method for producing a capacitor as described in (22) above comprising a valve acting metal having pores, a dielectric film formed on a surface of the valve acting metal, and a solid electrolyte layer comprising an electrically conducting polymer composition layer provided on the dielectric film, the method comprising polymerizing a monomer compound by the action of an oxidizing agent on the oxide dielectric film, in which the compound represented by the following formula (VIII):

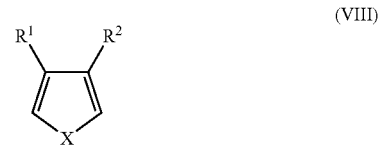

(wherein $R^1$, $R^2$ and X have the same meanings as defined in (27) above) is polymerized in the presence of a compound which donates at least one anthracenemonosulfonate anion selected from anthracenesulfonic acid and derivatives thereof to form a solid electrolyte layer.

(58) The method for producing a solid electrolytic capacitor as described in (57) above, in which the monomer compound represented by general formula (VIII) above is a compound represented by the following general formula (IX):

(wherein $R^4$ and $R^9$ have the same meanings as defined in (28) above).

(59) A method for producing a solid electrolytic capacitor as described in (22) above comprising a valve acting metal having pores, a dielectric film formed on a surface of the valve acting metal, and a solid electrolyte layer comprising an electrically conducting polymer composition provided on the dielectric film, the method comprising polymerizing a monomer by the action of an oxidizing agent to form a solid electrolyte layer on the dielectric film, in which the method comprises the steps of dipping the valve acting metal having formed thereon the dielectric film layer in a solution containing a monomer compound, and dipping in a solution containing an oxidizing agent and at least one anthracenemonosulfonate anion selected from anthracenesulfonic acid having one sulfonate group and derivatives thereof.

(60) The method for producing a solid electrolytic capacitor as described in (59) above, in which the valve acting metal having formed thereon the dielectric film layer is dipped in a solution containing a monomer compound and then in a solution containing an oxidizing agent and at least one anthracenemonosulfonate anion selected from anthracenesulfonic acid having one sulfonate group and derivatives thereof.

(61) The method for producing a solid electrolytic capacitor as described in (60) above, in which the method comprises the step of repeating in a plurality of times the steps of dipping the valve acting metal having formed thereon the dielectric film layer in a solution containing a monomer compound and then dipping the metal in a solution containing an oxidizing agent and at least one anthracenemonosulfonate anion selected from anthracenesulfonic acid having one sulfonate group and derivatives thereof.

(62) The method for producing a solid electrolytic capacitor as described in (61) above, in which the method comprises the step of repeating in a plurality of times the steps of dipping the valve acting metal having formed thereon the dielectric film layer in a solution containing a monomer compound and then dipping the metal in a solution containing an oxidizing agent and at least one anthracenemonosulfonate anion selected from anthracenesulfonic acid having one sulfonate group and derivatives thereof, followed by washing and drying.

(63) The method for producing a solid electrolytic capacitor as described in (59) above, in which the method comprises the step of dipping the valve acting metal having formed thereon the dielectric film in a solution containing an oxidizing agent and at least one anthracenemonosulfonate anion selected from anthracenesulfonic acid having one sulfonate group and derivatives thereof and then dipping the metal in a solution containing a monomer compound.

(64) The method for producing a solid electrolytic capacitor as described in (63) above, in which the method comprises the step of repeating in a plurality of times the steps of dipping the valve acting metal having formed thereon the dielectric film in a solution containing an oxidizing agent and at least one anthracenemonosulfonate anion selected from anthracenesulfonic acid having one sulfonate group and derivatives thereof and then dipping the metal in a solution containing a monomer compound.

(65) The method for producing a solid electrolytic capacitor as described in (64) above, in which the method comprises the step of repeating in a plurality of times the steps of dipping the valve acting metal having formed thereon the dielectric film in a solution containing an oxidizing agent and at least one anthracenemonosulfonate anion selected from anthracenesulfonic acid having one sulfonate group and derivatives thereof and then dipping the metal in a solution containing a monomer compound, followed by washing and drying.

(66) A method for producing a solid electrolytic capacitor as described in (22) above comprising a valve acting metal having pores, a dielectric film formed on a surface of the valve acting metal, and a solid electrolyte layer comprising an electrically conducting polymer composition provided on the dielectric film, the method comprising polymerizing a monomer by the action of an oxidizing agent to form a solid electrolyte layer on the dielectric film, in which the method comprises the steps of dipping the valve acting metal having formed thereon the dielectric film layer in a solution containing an oxidizing agent and of dipping the metal in a solution containing a monomer compound and an anthracenemonosulfonate anion.

(67) The method for producing a solid electrolytic capacitor as described in (66) above, in which the valve acting metal having formed thereon the dielectric film layer is dipped in a solution containing an oxidizing agent and then in a solution containing a monomer compound and at least one anthracenemonosulfonate anion selected from anthracenesulfonic acid having one sulfonate group and derivatives thereof.

(68) The method for producing a solid electrolytic capacitor as described in (67) above, in which the method comprises the step of repeating in a plurality of times the steps of dipping the valve acting metal having formed thereon the dielectric film layer in a solution containing an oxidizing agent and then dipping the metal in a solution containing a monomer compound and at least one anthracenemonosulfonate anion selected from anthracenesulfonic acid having one sulfonate group and derivatives thereof.

(69) The method for producing a solid electrolytic capacitor as described in (68) above, in which the method comprises the step of repeating in a plurality of times the steps of dipping the valve acting metal having formed thereon the dielectric film layer in a solution containing an oxidizing agent and then dipping the metal in a solution containing a monomer compound and at least one anthracenemonosulfonate anion selected from anthracenesulfonic acid having one sulfonate group and derivatives thereof, followed by washing and drying.

(70) The method for producing a solid electrolytic capacitor as described in (66) above, in which the valve acting metal having formed thereon the dielectric film layer is dipped in a solution containing a monomer compound and at least one anthracenemonosulfonate anion selected from anthracenesulfonic acid having one sulfonate group and derivatives thereof and then in a solution containing an oxidizing agent.

(71) The method for producing a solid electrolytic capacitor as described in (70) above, in which the method comprises the step of repeating in a plurality of times the steps of dipping the valve acting metal having formed thereon the dielectric film layer in a solution containing a monomer compound and at least one anthracenemonosulfonate anion selected from anthracenesulfonic acid having one sulfonate group and derivatives thereof and then dipping the metal in a solution containing an oxidizing agent.

(72) The method for producing a solid electrolytic capacitor as described in (71) above, in which the method comprises the step of repeating in a plurality of times the steps of dipping the valve acting metal having formed thereon the dielectric film layer in a solution containing a monomer compound and at least one anthracenemonosulfonate anion selected from anthracenesulfonic acid having one sulfonate group and derivatives thereof and then dipping the metal in a solution containing an oxidizing agent, followed by washing and drying.

(73) The method for producing a solid electrolytic capacitor as described in any one of (59) to (72), in which the monomer compound is a compound represented by the following general formula (VIII)

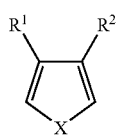

(VIII)

(wherein R¹, R² and X have the same meanings as defined in (27) above).

(74) The method for producing a solid electrolytic capacitor as described in (73), in which the monomer compound represented by the following general formula (VIII) is a compound represented by the following general formula (IX)

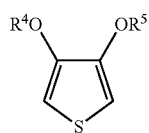

(IX)

(wherein R⁴ and R⁵ have the same meanings as defined in (28) above).

(75) The method for producing a solid electrolytic capacitor as described in any one of (57) to (74) above, in which the oxidizing agent is a persulfate.

DETAILED DESCRIPTION OF THE INVENTION

Figure 1:
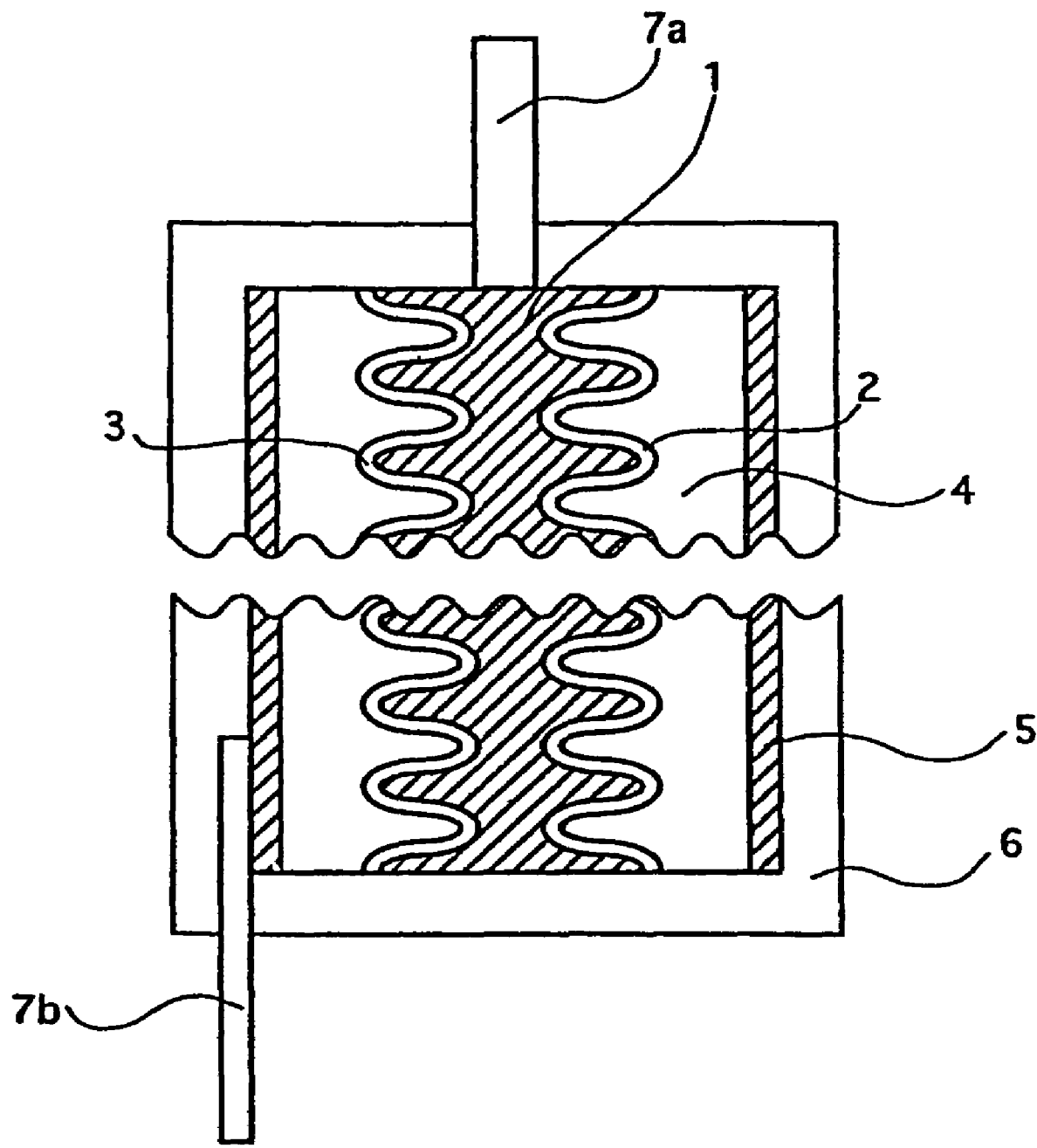
FIG. 1 is a vertical cross-sectional view showing an embodiment of a solid electrolytic capacitor.

The valve acting metal used in the solid electrolytic capacitor of the present invention includes elemental metal such as aluminum, tantalum, titanium, niobium, zirconium, magnesium, and silicon and alloys thereof. Their form may be in any form as far as they are formed article having pores such as an etched rolled foil and a fine powder sintered body.

The valve acting metal has formed thereon a dielectric film composed of an oxide.

One of the solid electrolytic capacitors of the present invention has in at least a portion thereof a lamellar structure so that the ability of relaxing thermal stress can be provided.

The solid electrolyte layer is formed inside pores and outer surface thereof on the dielectric layer on the surface of the valve acting metal. The thickness of the outer surface layer is in the range of 1–200 μm, preferably 1–100 μm. In the present invention, many of the above-mentioned lamellar structures are formed on the outer surface but it is desirable that it is also formed inside the pores. The direction in which the layers are arranged is such that many layers are arranged substantially parallel to the valve acting metal surface. In at least a part between adjacent layers, there is formed a space portion. The thickness per unit layer constituting the lamellar structure is in the range of 0.01–5 μm, preferably 0.01–1 μm, more preferably 0.1 to 0.3 μm.

The solid electrolyte used in the solid electrolytic capacitor of the present invention is preferably a π-electron conjugated polymer or other polymers and complex of these. In particular, a π-electron conjugated polymer or a polymer containing it is preferred.

As the π-electron conjugated polymer, preferred is a polymer represented by the general formula (I) above

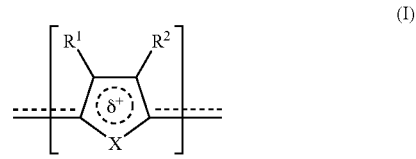

(I)

(wherein the symbols have the same meanings as defined above).

In the general formula (I), the substituents R¹, R² and R³ when x is NR³, independently a linear or branched, saturated or unsaturated C1–6 alkyl group. Specific examples thereof include methyl, ethyl, vinyl, propyl, allyl, isopropyl, butyl, and 1-butenyl. Specific examples of the linear or branched, saturated or unsaturated C1–6 alkoxy group include methoxy, ethoxy, propoxy, isopropoxy, and butoxy. Further, the substituents other than the alkyl group and alkoxy group include, for example, a nitro group, a cyano group, a phenyl group and a substituted phenyl group (halogen-substituted phenyl substituted with a halogen such as Cl, Br, F, etc.). The alkyl group or alkoxy group represented by R¹ or R² may optionally contain in the chain thereof a carbonyl bond, an ether bond, an ester bond, an amide bond, or an imino bond, and particularly useful examples include methoxyethoxy and methoxyethoxyethoxy.

The above-mentioned substituents R¹ and R² may bond to each other at any position to form a divalent group which forms at least one 5-, 6- or 7-membered saturated or unsaturated cyclic structure. Examples of such a divalent group represented by the general formula (I) includes a 3,4-propylene-substituted structure, a 3,4-butylene-substituted structure, a 3,4-butenylene-substituted structure, a 3,4-butadienylene-substituted structure, and a naphtho[2,3-c] condensed structure.

X represents a hetero atom. Specific examples thereof include S, O, Se, Te and NR³. The above-mentioned 3,4-butenylene-substituted structure in which X is S, when it assumes the chemical structure represented by the general formula (I), is also called as an isothianaphthenylene structure. Further, a naphtho[2,3-c] condensed structure, when it assumes the chemical structure represented by the general formula (I), is a naphtho[2,3-c]thienylene condensed structure. In the formulae, δ is a value in the range of 0 to 1.

The polymer represented by the general formula (I) above includes polymers represented by the following general formula (II)

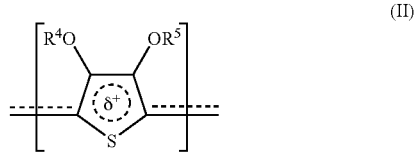

(II)

(wherein the symbols have the same meanings as defined above).

Examples of the substituents represented by the general formula (II) include methyl, ethyl, propyl, isopropyl, vinyl, and allyl. Further, C1–6 alkyl groups represented by $R^4$ and $R^5$ may bond to each other at any position to form a substituent group constituting at least one cyclic structure of 5-, 6- or 7-membered saturated hydrocarbon containing the two oxygen atoms described in the general formula (II) above, preferably 1,2-ethylene, 1,2-propylene, and 1,2-dimethylethylene. The above-mentioned cyclic structure includes those having a vinylene bond, those having a phenylene structure which may be substituted, for example, 1,2-vinylene, 1,2-propenylene, 2,3-butylen-2-ene, 1,2-cyclohexylene, methyl-o-phenylene, 1,2-dimethyl-o-phenylene, and ethyl-o-phenylene.

The above-mentioned solid electrolytic capacitor of the present invention, which has a lamellar structure in at least a portion of solid electrolyte on the dielectric layer and preferably is provided with an electrically conducting polymer layer having a space portion in at least a part of adjacent layers, can relax thermal stress efficiently. Also, preferably the solid electrolyte layer such as the electrically conducting polymer formed on the outer surface of the valve acting metal has a space portion therein so that the electrically conducting paste layer can get into the space to give a good adhesion. Formation of a space portion in the pores secures supply of oxygen to improve the ability of repairing dielectric film upon electric conduction.

To form a lamellar structure and a space portion in the solid electrolyte layer, for example, a method can be used in which the step of supplying a monomer and an oxidizing agent and polymerizing them in a predetermined manner is repeated as shown in examples described later. As the oxidizing agent, there can be used Fe(III) base compounds such as $FeCl_3$, $FeClO_4$, and Fe (organic acid anion) salt, anhydrous aluminum chloride/cuprous chloride, alkali metal persulfates, ammonium persulfates, peroxides, manganese compounds such as potassium permanganate, quinones such as 2,3-dichloro-5,6-dicyano-1,4-benzoquinone (DDQ), and tetrachloro-1,4-benzoquinone, tetracyano-1,4-benzoquinone, halogens such as iodine and bromine, peracids, sulfuric acid, fuming sulfuric acid, sulfur trioxide, sulfonic acids such as chlorosulfuric acid, fluorosulfuric acid and amidosulfuric acid, ozone, etc., and combinations of a plurality of the oxidizing agents.

Next, explanation will be made on the solid electrolytic capacitor of the present invention having an increased soldering heat resistance. The capacitor uses a condensed heteropolycyclic polymer represented by the general formula (III)

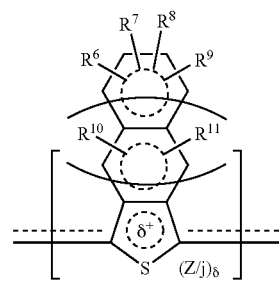

(III)

(wherein the symbols have the same meanings as defined above).

The polymer represented by the general formula (III) is a condensed heteropolycyclic compound whose repeating unit is represented by the general formula (VI) above

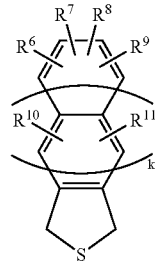

(VI)

(wherein the symbols have the same meanings as defined above).

The compound represented by the general formula (VI), more specifically, is, for example, a derivative having 1,3-dihydroisothianaphthene (also referred to as 1,3-dihydrobenzo[c]thiophene) skeleton represented by the following general formula (X), i.e., k=0,

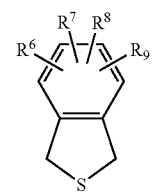

(X)

(wherein $R^6$, $R^7$, $R^8$ and $R^9$ have the same meanings as in the general formula (VI), and the condensed ring in the formula may optionally contain nitrogen or N-oxide) or a derivative having 1,3-dihydronaphtho[2,3-c]thiophene skeleton represented by the general formula (XI), i.e., k=1,

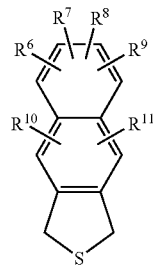

(XI)

(wherein $R^6$, $R^7$, $R^8$, $R^9$, $R^{10}$, and $R^{11}$ have the same meanings as in the general formula (VI), and the condensed ring in the formula may optionally contain nitrogen or N-oxide). Further, there can also be exemplified those derivatives having a 1,3-dihyroanthra[2,3-c]thiophene skeleton and those derivatives having a 1,3-dihydronaphthaceno[2,3-c]thiophene skeleton.

Furthermore, derivatives, in which two adjacent substituents among the substituents $R^6$, $R^7$, $R^8$ and $R^9$ in the condensed heteropolycyclic compound represented by formula (VI) are combined to each other through an unsaturated bond to newly form a condensed 6-membered ring (ortho-substitution), may also be used and specific examples thereof include, when k=0, a 1,3-dihydronaphtho[1,2-c]thiophene derivative, when k=1, a 1,3-dihydrophenanthra[2,3-c]thiophene derivative and a 1,3-dihydrotriphenylo[2,3-c]thiophene derivative, and when k=2, a 1,3-dihydrobenzo[a]anthraceno[7,8-c]thiophene derivative.

The condensed ring in the condensed heteropolycyclic compound represented by formula (VI) may optionally contain nitrogen or N-oxide and examples of such a condensed ring include, when k=0, 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide.

As the substituent group for the substituted phenyl represented by $R^6$, $R^7$, $R^8$, $R^9$, $R^{10}$, and $R^{11}$, there can be cited Cl, Br, I, F, or $CF_3$.

As stated above, the condensed heteropolycyclic compounds represented by the general formula (VI) have a 1,3-dihydro type condensed heteropolycyclic compound skeleton as described above, so that they can readily give rise to an electrically conducting polymer by the oxidation reaction process according to the present invention described herein.

The polymers having the compounds represented by the general formulae (VI), (X), and (XI) are polymers represented by the general formulae (III), (IV), and (V), respectively.

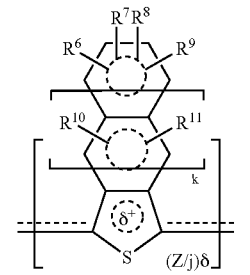

(III)

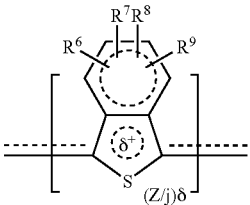

(IV)

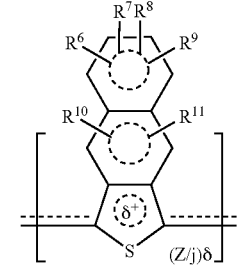

(V)

The compounds represented by the general formulae (VI), (IX), and (X) include, for example, the compounds represented by the following structural formulae.

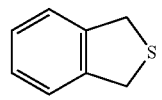

(a)

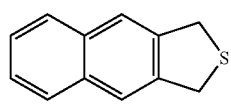

(b)

-continued

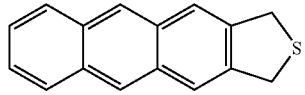

(c)

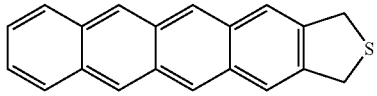

(d)

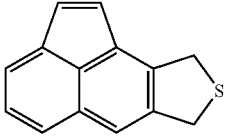

(e)

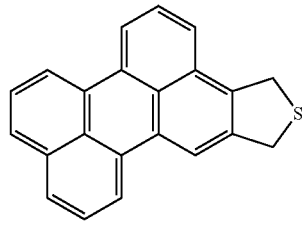

(f)

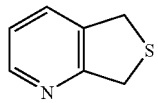

(g)

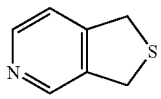

(h)

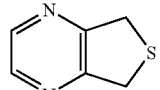

(i)

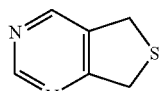

(j)

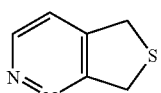

(k)

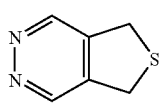

(l)

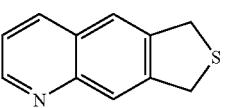

(m)

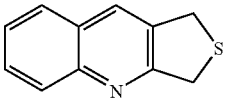

(n)

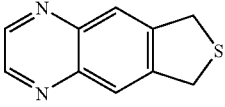

(o)

-continued (p)

(q)

(r)

(s)

(t)

In the solid electrolytic capacitor of the present invention, use of a specified electrically conducting polythiophene composition as a solid electrolyte can increase reflow heat resistance, etc.

The eletrically conducting polythiophene composition preferably contains a sulfate ion in the electrically conducting polythiophene and preferably further contains an other anion having a dopant function.

As the electrically conducting polythiophene, there can be used those represented by the general formula (II) above, that is, the one represented by the following formula.

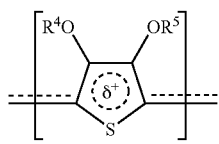

(II)

In the formula, $R^4$ and $R^5$ each independently represents hydrogen atom, a linear or branched, saturated or unsaturated C1–6 alkyl group and prefererable substituent group includes methyl, ethyl, propyl, isopropyl, vinyl, or allyl.

Further, C1–6 alkyl groups represented by $R^4$ and $R^5$ may bond to each other at any position to form a substituent for forming at least one 5-, 6- or 7-membered saturated hydrocarbon ring structure containing the two oxygen elements shown in the formula (II) above and, for example, 1,2-ethylene, 1,2-propylene, 1,2-dimethylethylene are preferred.

Furthermore, the C1–6 alkyl groups represented by $R^4$ and $R^5$ may be combined at any position to each other to form an unsaturated hydrocarbon ring structure such as substituted vinylene group and substituted o-phenylene group, and examples thereof include 1,2-vinylene, 1,2-propenylene, 2,3-butylen-2-ene, 1,2-cyclohexylene, methyl-o-phenylene, 1,2-dimethyl-o-phenylene and ethyl-o-phenylene. δ is in the range of 0 to 1.

The sulfate ion in the above-mentioned electrically conducting polythiophene composition is preferably derived from a reduced form of persulfate such as ammonium persulfate or alkali metal persulfate.

In the solid electrolytic capacitor of the present invention, at least a portion of the solid electrolyte layer can be rendered a lamellar structure by use of the condensed heteropolycyclic polymer represented by the general formulae (III) to (V) and the above-mentioned electrically conducting polythiophene composition. In this case, it is preferred to form a space portion at least a portion of interlamellar space of the lamellar structure. Other lamellar structure is formed on the outer surface of the valve acting metal but it is preferred that it is also formed inside the pores on the dielectric film, the thickness per unit layer constituting the lamellar structure is in the range of 0.01–5 μm, the total thickness of the solid electrolyte layer formed on the outer surface of the valve acting metal is in the range of 1–200 μm, preferably 1–100 μm, as described above.

By so constructing, not only the solid electrolyte is excellent in reflow heat resistance but also there can be obtained a solid electrolytic capacitor which is excellent in the ability of relaxing thermal stress, adhesion with the electrically conducting paste, the ability of repairing the oxide dielectric film.

Next, the invention on the production method will be explained.

The solid electrolytic capacitor of the present invention can be produced by polymerizing each heterocyclic compound corresponding to the repeating unit of the above-mentioned heteropolycyclic polymer as a solid electrolyte on a dielectric film which in turn is formed on a surface of a valve acting metal having pores by the action of an oxidizing agent and using the polymer as a solid electrolyte layer.

The invention of the production method for the solid electrolytic capacitor described in (29) above is a method in which the condensed heteropolycyclic compound represented by the general formula (VI) is polymerized in the same manner as above. This method can give rise to the condensed heteropolycyclic polymer represented by the general formula (III).

The condensed heterpolycyclic compound represented by the general formula (VI) in which k=0, is a compound represented by the general formula (X) above and the compound represented by the general formula (VI) in which k=1 is a compound represented by the general formula (XI). Specific compounds of those represented by the general formulae (X) and (XI), including those represented by the formulae (a) to (t) above, are the same as described above.

Polymerization of the compounds represented by the general formula (X) or (XI) can give rise to the condensed heteropolycyclic polymer represented by the general formulae (IV) and (V), respectively.

The invention in (32) above is a method in which the condensed heteropolycyclic compound represented by the general formula (VII)

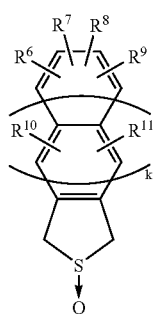

(wherein the symbols have the same meanings as defined above) is polymerized in the same manner as described above. By this method, the condensed heteropolycyclic polymer represented by the general formula (III) can be obtained.

The condensed heteropolycyclic compound represented by the general formula (VII) where k=0 is a derivative having a 1,3-dihydroisothianaphthene-2-oxide (or also called 1,3-dihydrobenzo[c]thiophene-2-oxide) skeleton represented by the following formula (XII):

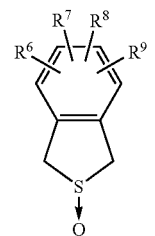

(wherein $R^6$, $R^7$, $R^8$ and $R^9$ are the same as in the general formula (VII), and the condensed ring may optionally contain nitrogen or N-oxide) or a derivative having a 1,3-dihydronaphtho[2,3-c]thiophene-2-oxide skeleton represented by the following formula (XIII):

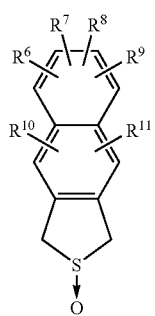

(wherein the substituent $R^6$, $R^7$, $R^8$, $R^9$, $R^{10}$ and $R^{11}$ are the same as in the general formula (VII), and the condensed ring may optionally contain nitrogen or N-oxide). Other examples include a derivative having a 1,3-dihydroanthra[2,3-c]thiophene-2-oxide skeleton and a derivative having a 1,3-dihydronaphthaceno[2,3-c]thiophene-2-oxide skeleton.

Furthermore, derivatives, in which two adjacent substituents among the substituents $R^6$, $R^7$, $R^8$ and $R^9$ in the condensed heteropolycyclic compound represented by formula (VII) are combined to each other through an unsaturated bond to newly form a condensed 6-membered ring (ortho-substitution), may also be used and specific examples thereof include, when k=0, a 1,3-dihydronaphtho[1,2-c]thiophene-2-oxidederivative, when k=1, a 1,3-dihydrophenanthra[2,3-c]thiophene-2-oxide derivative and a 1,3-dihydrotriphenylo[2,3-c]thiophene-2-oxide derivative, and when k=2, a 1,3-dihydrobenzo[a]anthraceno[7,8-c]thiophene-2-oxide derivative.

The condensed ring in the condensed heteropolycyclic compound represented by formula (VII) may optionally contain nitrogen or N-oxide and examples of such a condensed ring include, when k=0, 1,3-dihydrothieno[3,4-b]quinoxaline-2-oxide, 1,3-dihydrothieno[3,4-b]quinoxaline-2,4-dioxide and 1,3-dihydrothieno[3,4-b]quinoxaline-2,4,9-trioxide.

As described in the foregoing, the condensed heteropolycyclic compound represented by formula (VII) has the above-described 1,3-dihydro-2-oxide-type condensed heteropolycyclic compound skeleton and can easily provide an electrically conducting polymer composition by the oxidation reaction process described in the present invention.

Specific compounds represented by the general formulae (XII) and (XIII) include the following compounds.

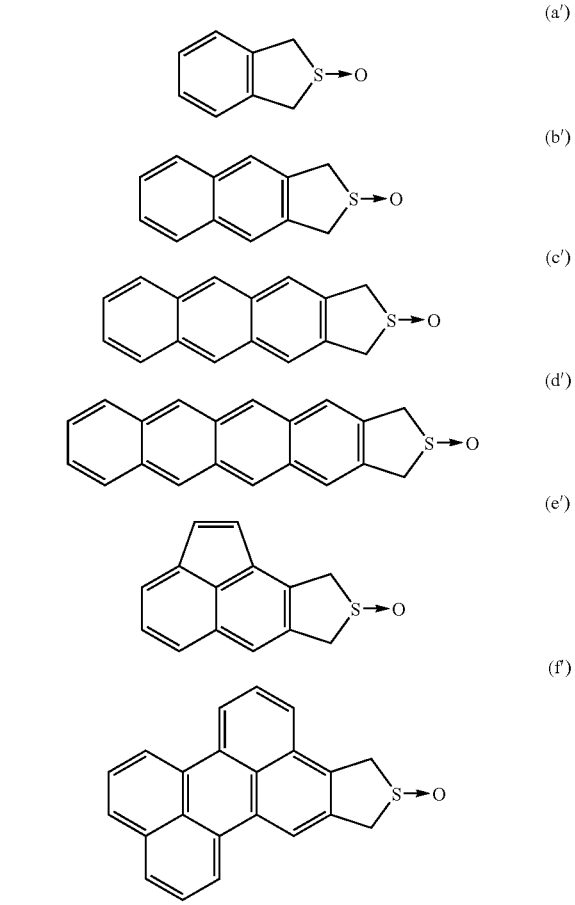

-continued (g′) 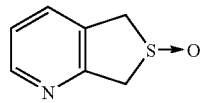

(h′) 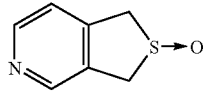

(i′) 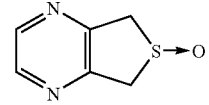

(j′) 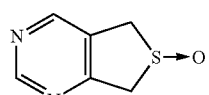

(k′) 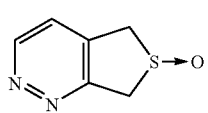

(l′) 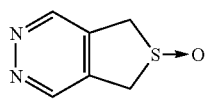

(m′) 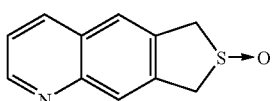

(n′) 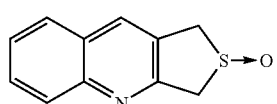

(o′) 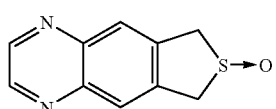

(p′) 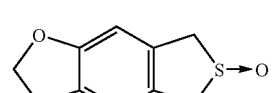

(q′) 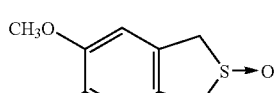

(r′) 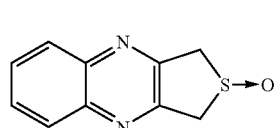

-continued (s′) 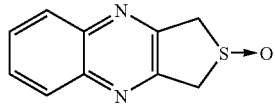

(t′) 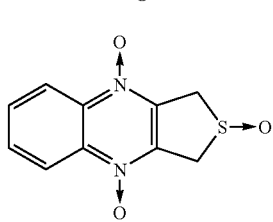

The polymerization process for the compounds of the general formulae (VI) and (VII) is characterized by the oxidative dehydrogenation reaction (polymerization reaction) of the condensed heteropolycyclic compound and further in the case of the compounds of the general formula (VII) it is characterized in that in addition to the reaction, intramolecular dehydrogenation reaction takes place within pores of a metal oxide dielectric layer and further that due to such a reaction, more activation occurs and accelerates the polymerization reaction to efficiently provide a polymer having a high electric conductivity, which polymer is preferable for the characteristics of a capacitor, e.g., capacity, tan δ, leakage current, impedance, and reflow heat resistance.

In other words, according to the production process of a solid electrolyte (polymer) of the present invention, the dehydrogenative oxidation reaction (4 electron oxidation) of the condensed heteropolycyclic compound can be effectively achieved on or in the vicinity of the surface of a metal oxide in the presence or absence of a solvent under short-time and simple reaction conditions. Therefore, as compared with the case using a conventionally known dehydrogenative oxidation reaction of a pyrrole or a thiophene (in this case, 2 electron oxidation polymerization), industrially useful solid electrolytic capacitor properties can be provided.

The effect of accelerating the in-situ chemical polymerization in the dielectric layer may be considered to come out due to the complicated finely porous structure or large specific area of the dielectric or due to the surface free energy of the oxide thin film, although the principle thereof is not yet elucidated.

With respect to conventionally known examples of the method for producing a polymer, JP-A-63-118323 and JP-A-2-242816 disclose a method of oxidatively polymerizing a monomer having a 1,3-dihydroisothianphthene structure in the presence of an oxidizing agent. This is, however, an example of a mere polymerization method in the polymer chemistry and the above-described patent publications are completely silent on the chemical reaction process (in-situ chemical polymerization process) using the effect on the surface of a metal oxide described in the present invention. Synthetic Metals, Vol. 16, pp. 379–380 (1986) discloses a method of oxidatively polymerizing a monomer having a 1,3-dihydroisothianaphthene structure in the presence of oxygen and an oxidizing agent together, but this is also an example of mere synthesis reaction. Furthermore, JP-A-62-118509 and JP-A-62-118511 disclose use of an electrochemically polymerized polymer as a solid electrolyte and thus, these patent publications differ in the production process from the present invention. Moreover, the capacitor properties are different from those in the present invention.

According to the production process for the compounds of the general formulae (VII), 1,3-dihydro-2-oxide type condensed heteropolycyclic compound (monomer) is subjected to an intramolecular dehydration reaction and dehydrogenative 2 electron oxidation reaction (polymerization) which takes place within pores of a metal oxide dielectric layer generate in-situ a polymer having a proper electric conductivity. That is, the process is characterized in that the intramolecular dehydrogenation reaction and dehydrogenative 2 electron oxidation reaction described above can be effectively achieved on or in the vicinity of the surface of a metal oxide in the presence or absence of a solvent under short-time and simple reaction conditions. Therefore, as compared with the case using a conventionally known dehydrogenative oxidation reaction of a pyrrole or a thiophene (in this case, 2 electron oxidation polymerization), industrially useful solid electrolytic capacitor properties can be provided. The effect of accelerating the in-situ chemical polymerization in the dielectric layer may be considered to be attributable to the fact that the dielectric is an oxide so that it induces intramolecular dehydration reaction (dehydration effect as a Lewis acid), and that the dielectric has a large specific area, which efficiently accelerates the above-described dehydrogenative 2 electron oxidation reaction by the oxidizing.

The conventionally known methods for producing a polymer (for example, J. Org. Chem., Vol. 49, p. 3382 (1984)) include a method of polymerizing a monomer having a 1,3-dihydroisothianaphthene-2-oxide structure in the presence of sulfuric acid, but this is merely an example of mere synthesis reaction and teaches nothing on the chemical reaction process (in-situ chemical polymerization process) using the effect on the surface of a metal oxide described in the present invention.

According to the above-mentioned production method of the present invention, capacitors having a higher capacity can be provided. That is, according to the present invention, an oxidizing agent is charged together with the monomer alone or further with another anion having a dopant ability and by performing step by step the dehydrogenative 4 electron oxidation reaction (polymerization) (in the case of the compounds of the general formula (VI)) or intramolecular dehydration reaction and dehydrogenative 2 electron oxidation reaction (polymerization) (in the case of the compounds of the general formula (VII)) directly within a metal oxide foil (for example, an formed aluminum foil), a polymer composition can be effectively filled into and formed within the foil. More specifically, the polymerization of a condensed heteropolycyclic compound proceeds through such a process that an oxidizing agent is carried and activated on the surface of a metal oxide having a porous structure by the coating according to a solution process or by the sublimation or evaporation according to a vapor phase process and then a condensed heteropolycyclic compound is introduced into the surface of the fine structure, if desired, together with a compound capable of donating another anion having a dopant ability, thereby forming the polymer composition on or in the vicinity of the dielectric. By repeating this process step by step, a solid electrolyte comprising the polymer composition can be effectively filled and formed inside the pores. Due to this, homogeneity in the electric conducting path within the solid electrolyte layer can be remarkably improved, unnecessary formation of stresses inside the pores can be prevented (prevention of rupture of the dielectric layer) and as a result, excellent capacitor properties including high capacity and low impedance can be realized.

Further, according to the production method of the present invention, solid electrolytic capacitors having excellent soldering heat resistance (heat stability) can be provided. Conventionally known capacitors using a solid electrolyte comprising polypyrrole or the like undergo large fluctuation in the LCR (inductance, capacitance, resistance) values at a high temperature and a high humidity and has poor reliability. However, the electrically conducting composition having a chemical formula shown in the present invention has excellent heat stability and exhibits good stability in the doped state. Furthermore, this polymer composition is step by step deposited on the surface of a dielectric and accordingly, a structure of many polymer composition thin films being overlapped can be formed. Thus, the polymer can prevent damages of the dielectric film and a capacitor having excellent heat stability can be provided.

The oxidizing agent for use in the production method of the present invention may be any oxidizing agent as far as oxidation reaction by dehydrogenative 4 electron oxidation or dehydrogenative 2 electron oxidation can be satisfactorily effected and the capacitor performance can be improved in the use environment for the reaction within fine pores. In practice, compounds which are industrially inexpensive and easy to handle are preferred. Specific examples thereof include Fe(III) compounds such as $FeCl_3$, $FeClO_4$ and Fe (organic acid anion) salt, anhydrous aluminum chloride/cuprous chloride, alkali metal persulfates, ammonium persulfate salts, peroxides, manganese such as potassium permanganese, quinones such as 2,3-dichloro-5,6-dicyano-1,4-benzoquinone (DDQ), tetrachloro-1,4-benzoquinone and tetracyano-1,4-benzoquinone, halogens such as iodine and bromine, peracid, sulfuric acid, fuming sulfuric acid, sulfur trioxide, sulfonic acids such as chlorosulfuric acid, fluorosulfuric acid and amidosulfuric acid, ozone, and combinations of a plurality of these oxidizing agents.

Examples of the base compound for the organic acid anion constituting the Fe (organic acid anion) salt include an organosulfonic acid, an organocarboxylic acid, an organophosphoric acid and an organoboric acid. Specific examples of the orgnosulfonic acid include benzenesulfonic acid, p-toluenesulfonic acid, methanesulfonic acid, ethanesulfonic acid, α-sulfonaphthalene, β-sulfonaphthalene, naphthalenedisulfonic acid, alkylnaphthalenesulfonic acid (examples of the alkyl group include butyl, triisopropyl and di-t-butyl, etc.).

Specific examples of the organocarboxylic acid include acetic acid, propionic acid, benzoic acid and oxalic acid. Furthermore, in the present invention, a polyelectrolyte anion such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid may also be used. However, these are described only for the purpose of illustrating examples of the organosulfonic acid and the organocarboxylic acid and the present invention is by no means limited thereto. The counter cation of the above-described anion is not particularly limited in the present invention and examples thereof include $H^+$, alkali metal ion such as $Na^+$ and $K^+$, and ammonium ion substituted by a hydrogen atom, a tetramethyl group, a tetraethyl group, a tetrabutyl group or a tetraphenyl group. Of these oxidizing agents, oxidizing agents containing a trivalent Fe compound, cuprous chloride, a persulfuric acid alkali salt, an ammonium persulfate, a manganic acid or a quinone are suitably used.

Examples of the anion having a dopant ability which is allowed to be present together, if desired, in the production process of the polymer composition of the present invention include electrolytic compounds comprised of anion of oxidizing agent (a reduced form of the oxidizing agent) produced from the above-described oxidizing agent as a counter anion, and other anionic electrolytes. Specific examples thereof include Group 5B element halide anions such as $PF_6^-$, $SbF_6^-$ and $AsF_6^-$, Group 3B element halide anions such as $BF_4^-$, halogen anions such as $I^-(I_3^-)$, $Br^-$ and $Cl^-$, halogen acid anions such as $ClO_4^-$, Lewis acid anions such as $AlCl_4^-$, $FeCl_4^-$, and $SnCl_5^-$, and protonic acid anions including inorganic acid anions such as $NO_3^-$ and $SO_4^{2-}$, organosulfonic acid anions such as p-toluenesulfonic acid, naphthalenesulfonic acid, C1–5 alkyl-substituted naphthalene sulfonic acid, $CF_3SO_3^-$ and $CH_3SO_3^-$, and carboxylic acid anion such as $CH_3COO^-$ and $C_6H_5COO^-$. Other examples include polyelectrolytic anions of the compounds such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid. However, the present invention is by no means limited thereto. Of these, preferred are anions of a high molecular or low molecular organosulfonic acid compound and a polyphosphoric acid, and more preferred is an anion of an aromatic sulfonic acid compound such as sodium dodecylbenzylsulfonate and sodium naphthalenesulfonate.

The reaction solvent for use in the production method of the present invention may be any solvent as far as it can dissolve the monomer, the oxidizing agent and the electrolyte having a dopant ability individually or altogether. Examples thereof include ethers such as tetrahydrofuran (THF), dioxane and diethyl ether, aprotic polar solvents such as dimethylformamide (DMF), acetonitrile, benzonitrile, N-methylpyrrolidone (NMP) and dimethylsulfoxide (DMSO), esters such as ethyl acetate and butyl acetate, nonaromatic chlorine solvents such as chloroform and methylene chloride, nitro compounds such as nitromethane, nitroethane and nitrobenzene, alcohols such as methanol, ethanol and propanol, organic acids such as formic acid, acetic acid and propionic acid, acid anhydrides of the organic acid (e.g., acetic anhydride), water, and a mixed solvent thereof. The compound may be introduced into the dielectric layer (may be subjected to polymerization) in a solvent system, namely, a two-liquid system or a three-liquid system, where the above-described oxidizing agent and/or the electrolyte having a dopant ability and the monomer are individually dissolved.

The production method of the present invention described in (35) above is a method in which in a heterocyclic compound represented by the following general formula (VIII)

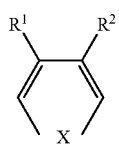

(VIII)

(wherein $R^1$, $R^2$, and X have the same meanings as defined above) is polymerized a thiophene monomer represented by the following general formula (IX)

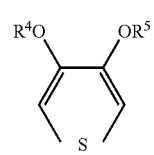

(IX)

(wherein $R^4$ and $R^5$ have the same meanings as defined above) by the action of a persulfate (oxidizing agent) in the presenece of a napthalenesulfonate anion.

This method provides an electrolyte layer comprising an electrically conducting polythiophene composition containing a sulfate ion and a naphthalenesulfonate anion. The polythiophene in the composition is that represented by the general formula (II) above.

Preferred substituents in the general formula (IX) are the same as described in the explanation on the electrically conducting polythiophene represented by the general formula (II).

Out of thiophenes represented by formula (IX) for use in the production method of the present invention, a part of monomer compounds including 3,4-dioxyethylenethiophene are already known (JP-A-2-15611 (U.S. Pat. No. 4,910,645)). Furthermore, out of the persulfates as the oxidizing agent for use in the present invention, use of ammonium persulfate (hereinafter simply referred to as "APS") or alkali metal persulfate is also known.

However, in the present invention, the electrically conducting composition after oxidative polymerization has a sulfate ion content of from 0.1 to 10 mol %, preferably from 0.2 to 5 mol %, and a naphthalenesulfonate ion content of from 1 to 50 mol %, preferably from 5 to 40 mol %.

A solid electrolytic capacitor comprising a solid electrolyte formed of an polymer containing a structural unit represented by the general formula (IX) in the electrically conducting composition has particularly excellent voltage withstanding property and this has hitherto been not known. In the present invention, the total of the sulfate ion content and the naphthalenesulfonate ion content is preferably from 1.1 to 60 mol % based on the entire weight of the electrically conducting composition. According to the processes described above, conditions for production can be determined so that the sulfate ion contents and so on in the composition may fall within the above range.

In the production of a capacitor, the method for forming the above-described solid electrolyte plays an important role in the production of a capacitor for attaining high capacity and high frequency property and improving tan δ, leakage current, heat resistance (reflow property) and durability. More specifically, it is important to form a densely filled solid electrolyte and thereby improve the homogeneity of the electric conducting path. To this effect, the constitution of the electrically conducting composition has a great effect on the capacity properties. In the present invention, the process of oxidation-polymerizing the above-described thiophene monomer by the action of a persulfate in the coexistence of a naphthalenesulfonate anion to produce the solid electrolyte is performed in a plurality of repetitions, preferably from 5 to 20 repetitions to an anode substrate (valve acting metal) and thereby an objective solid electrolyte can be easily obtained. In this process, a step where the dielectric layer is coated with or dipped in a solution containing the above-described thiophene monomer and naphthalenesulfonate anion (Solution 1) may be provided separately before or after a step where the layer is coated with or dipped in a solution having dissolved therein a persulfate (Solution 2). Solution 1 and Solution 2 may use the same solvent or may differ in the solvent system.

Repeating the oxidation-polymerization process facilitates the production of a solid electrolyte having excellent soldering heat resistance (heat stability). The capacitor comprising a solid electrolyte formed of an electrically conducting composition of the present invention has excellent heat stability and exhibits good stability in the doped state, because the polymer composition having such a sulfate ion and a naphthalenesulfate ion as described above can be filled well step by step into the dielectric surface, even inside the pore, and thereby a structure where many thin films of the polymer composition are overlaid one on another can be formed. As a result, the polymer can prevent damages of the dielectric film and a capacitor having excellent heat stability can be provided.

The persulfate used in the production method is preferably ammonium persulfate or potassium persulfate.

The reaction solvent used is the same as those used in the reaction of the compounds represented by the general formulae (VI) and (VII).

Preferred conditions for the polymerization reaction using the compounds represented by the general formulae (VI), (VII), or (IX) are described below.

The concentration of the monomer represented by formulae (VII), (VI), or (IX) for use in the production method of a capacitor of the present invention varies depending on the substituent (species) of the compound or the kind of solvent, however, it is in general preferably from $10^{-3}$ to 10 mol/l, more preferably from $10^{-2}$ to 5 mol/l. The reaction temperature is selected according to respective reaction processes and cannot be specifically limited, however, it is generally from −70 to 250° C., preferably from 0 to 150° C. and more preferably from 15 to 100° C.

In the above-mentioned polymerization method, it is preferred that first the oxidant is carried on the surface of the dielectric layer and then the monomer is supplied to carry out the polymerization.

The solid electric conductor thus produced has an electric conductivity of from 0.1 to 200 S/cm, preferably from 1 to 100 S/cm, more preferably from 10 to 100 S/cm.

Generally, capacitors are jacketed with a an electric conductor layer on the solid electrolyte layer (semiconductor) in order to improve electrical contact. In the case of the capacitor of the present invention, it is preferred that such an electric conductor layer is provided, for example, by solidifying or plating an electrically conducting paste, vapor deposition of a metal or forming an electrically conducting resin film.

Next, explanation will be made on a high performance solid electrolytic capacitor which is small in size and has a low impedance and a durability to sparking voltage test, with its capacitor containing sulfoquinone having at least one sulfo anion group and a quinone structure in the molecule and in addition to the quinone an other anion having a dopant ability, and a production method therefor, which are preferred embodiments of the present invention as described in (15) to (21) and (38) to (56) above.

In the present invention, by incorporating into the electrically conducting polymer composition a sulfoquinone anion having one or more sulfoanion groups and a quinone structure in the molecule (hereinafter simply referred to as a "sulfoquinone") as a main anion having a dopant ability and further containing an anion other than a sulfoquinone as an auxiliary dopant, a preferred electrically conducting composition layer (charge-transfer complex) having heat resistance can be formed. As a result, a solid electrolytic capacitor having excellent low impedance property and a production method thereof can be provided.

The π electron-conjugated polymer in an electrically conducting polymer composition suitable for the capacitor of the present invention is a polymer having a π electron-conjugated structure in the polymer main chain structure. Specific examples thereof include polyaniline, poly-p-phenylene, poly-p-phenylenevinylene, polythienylenevinylene, polyheterocyclic polymer and substituted derivatives thereof. Of these specific examples, preferred is a π electron-conjugated polymer comprising a structural unit represented by formula (I):

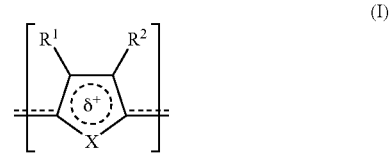

(wherein the symbols have the same meanings as defined above.) and more preferred is a π electron-conjugated polymer comprising a structural unit represented by formula (II).

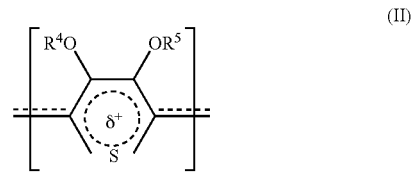

(wherein the symbols have the same meanings as defined above.)

The polymer represented by the general formula (I) above can be obtained by polymerizing a heterocyclic compound represented by the general formula (VIII)

(wherein $R^1$, $R^2$ and X have the same meanings as defined above), and the polymer represented by the general formula (II) above can be obtained by polymerizing a compound represented by the general formula (IX)

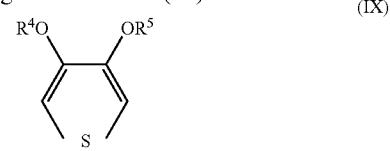

(wherein $R^4$ and $R^5$ have the same meanings as defined above).

In formulae (I) and (VIII), useful examples of the linear or branched, saturated or unsaturated C1–6 alkyl group represented by the substituent $R^1$, $R^2$ or $R^3$ include methyl, ethyl, vinyl, propyl, allyl, isopropyl, butyl and 1-butenyl. Useful examples of the linear or branched, saturated or unsaturated C1–6 alkoxy group include methoxy, ethoxy, propoxy, isopropoxy and butoxy. Useful examples of the substituent other than the above-described alkyl group or alkoxy group include a nitro group, a cyano group, a phenyl group and a substituted phenyl group (e.g., phenyl group substituted by a halogen group such as Cl, Br, F, etc.). The alkyl group or alkoxy group in $R^1$ or $R^2$ may optionally contain in the chain thereof a carbonyl bond, an ether bond, an ester bond, an amide bond or an imino bond, and particularly useful examples thereof include methoxyethoxy and methoxyethoxyethoxy.

The substituents $R^1$ and $R^2$ may be combined to each other at any position to form at least one divalent chain for forming at least one 5-, 6- or 7-membered saturated or unsaturated ring structure. Examples of the substitution in formula (I) or (VIII) include a 3,4-propylene-substituted structure, a 3,4-butylene-substituted structure, 3,4-butenylene-substituted structure, 3,4-butadienylene-substituted structure and a naphtho[2,3-c]-condensed structure.

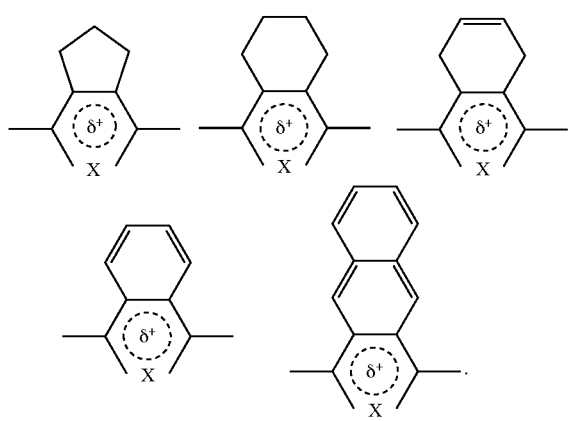

X represents a hetero atom and examples thereof include S, O, Se, Te and $NR^3$. The above-described 3,4-butadienylene-substituted structure where X is S is denoted an isothianaphthenylene structure in the case of the monomer compound structure of formula (I) or denoted isothianaphthene in the case of the monomer compound structure of formula (VIII). Similarly, the naptho[2,3-c]condensed structure is denoted a naphtho[2,3-c]thienylene structure in the case of formula (I) or denoted naphtho[2,3-c]thiophene in the case of the monomer compound structure of formula (VIII). In the formulae, δ represents a number of charges per the repeating structure unit, of from 0 to 1.

Useful examples of the substituents $R^4$ and $R^5$ in formulae (II) and (IX) include methyl, ethyl, propyl, isopropyl, vinyl and allyl. Furthermore, $R^4$ and $R^5$ may be substituents of which C1–6 alkyl groups are bonded to each other at any position to form at least one or more 5-, 6- or 7-membered heterocyclic ring structure containing the two oxygen elements in formula (II) or (IX). Preferred examples thereof include 1,2-ethylene, 1,2-propylene and 1,2-dimethylethylene. Furthermore, the C1–6 alkyl groups of $R^4$ and $R^5$ may be combined to each other at any position to form an unsaturated hydrocarbon ring structure such as substituted vinylene group and substituted o-phenylene group, and examples thereof include 1,2-vinylene, 1,2-propenylene, 2,3-butylen-2-ene, 1,2-cyclohexylene, methyl-o-phenylene, 1,2-dimethyl-o-phenylene and ethyl-o-phenylene.

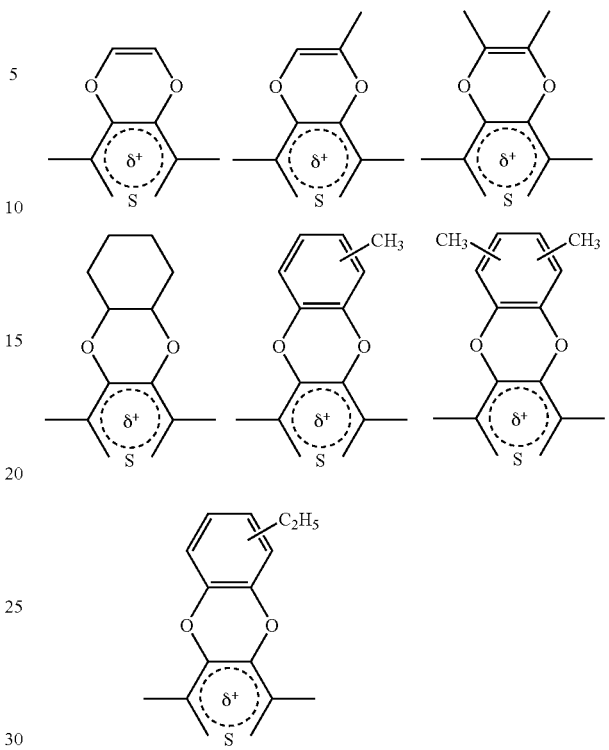

Among the monomer compounds represented by formula (VIII) for use in the solid capacitor and the production process thereof of the present invention, for example thiophene ($R^1=R^2=H$, $X=S$) and pyrrole ($R^1=R^2=H$, $X=NH$), or among thiophenes represented by formula (IX), a monomer compound of 3,4-dioxyethylene-thiophene are known. Also, many of oxidizing agents which can polymerize such a monomer compound are known. However, a capacitor comprising a solid electrolyte formed of an electrically conducting composition containing a sulfoquinone anion as a dopant and using another anion in combination as an auxiliary dopant has heretofore been unknown.

More specifically, the capacitor disclosed in JP-A-10-32145 (European Patent Application Laid-open No. 820076 (A2)) uses an electrically conducting composition which is a poly(3,4-dioxyethylene-thiophene) having doped therein a specific organic sulfonic acid such as benzoquinonesulfonic acid or alicyclic sulfonic acid, thus, the dopant is only the organic sulfonate anion having a specific chemical structure. This patent publication discloses a technique of providing an organic sulfonate anion from an iron(III) compound used in the oxidizing agent or an anion constituting a cupric compound but addition of an auxiliary dopant is not disclosed therein.

The solid electrolytic capacitor of the present invention comprises a solid electrolyte constituted by anions such that the above-described sulfoquinone anion is contained in an amount of from 0.1 to 50 mol % and another anion in addition to the above-described anion is contained in an amount of from 0.1 to 10 mol %, based on the total weight of the π-conjugated polymer composition, and is particularly characterized by having excellent low impedance property with other problems described above to be solved. Such a capacitor has been heretofore not known. Furthermore, although JP-B-6-101418 (U.S. Pat. No. 4,959,753) discloses an example of the solid electrolytic capacitor containing as a dopant an anthraquinonesulfonate anion which is one of the sulfoquinone anion, this capacitor has a constitution such that an electrically conducting polymer composition is provided on a valve metal having provided thereon a dielectric film on which manganese dioxide is attached. Thus, the constitution differs from that of the present invention. Moreover, this constitution is disadvantageous in that, as described above, the oxide film layer may be ruptured at the time of formation (thermal decomposition) of the manganese dioxide.

The capacitor of the present invention comprises a solid electrolyte capable of providing a capacitor excellent particularly in the low impedance property, wherein the sulfoquinone content is preferably from 1 to 30 mol % based on the total weight of the π-conjugated polymer composition. On the other hand, in the solid electrolyte of the present invention, the content of another anion in addition to a sulfoquinone anion is preferably from 0.1 to 5 mol % based on the total weight of the polymer composition. In the production method of the present invention, an oxidizing agent is used at the polymerization of a monomer compound, the another anion is contained as a reduced form of anion of the oxidizing agent, although it may be added by a different method and the method is not limited.

Usually, the method for producing the above-described solid electrolyte plays an important role in the production of a capacitor for attaining high capacity and high frequency property and improving tan δ, leakage current, heat resistance (reflow property), impedance, durability, etc. To these effects, it is important to properly combine the π electron conjugated structure constituting a solid electrolyte and the dopant, and to densely fill and form an electrically conducting polymer composition layer on a fine dielectric layer to thereby increase or improve the homogeneity of the electric conducting path. In particular, the constitution of the electrically conducting polymer composition has a great effect on the capacity properties.

The production method of the present invention is characterized by allowing a sulfoquinone anion and another anion to be present together as dopants for the polymer of the above-described monomer compound. More specifically, the production method of the present invention comprises a step of producing a polymer composition as the solid electrolyte on the dielectric surface and the polymer composition is produced by causing oxidative polymerization of a monomer compound represented by formula (VIII) or preferably by formula (IX) on the finely porous dielectric layer in the presence of a compound capable of providing a sulfoquinone anion by the action of the oxidizing agent. By repeating this production process once or more, preferably from 3 to 20 times per one anode substrate, a dense solid electrolyte layer can be easily formed.

For example, in one preferred embodiment of the production process, the polymerization step may include a step of dipping a valve-acting metal anode foil having formed thereon an oxide dielectric film layer in a solution containing an oxidizing agent (Solution 1) and a step of dipping the anode foil in a solution containing a monomer compound and a sulfoquinone anion (Solution 2), or may include a step of dipping the anode foil in Solution 2 and then dipping it in Solution 1 or a step of dipping the anode foil in Solution 1 and then dipping it in Solution 2.

In another embodiment, the production step may include a step of dipping the anode foil in a solution containing an oxidizing agent and a sulfoquinone anion (Solution 3) and a step of dipping the anode foil in a solution containing a monomer compound (Solution 4) or may include a step of dipping the anode foil in Solution 4 and then dipping it in Solution 3 or a step of dipping the anode foil in Solution 3 and then dipping it in Solution 4. Solution 1 to 4 each may be used in the form of a suspension.

Furthermore, the dipping process may be replaced to the coating operation. Solutions 1 to 4 may be the same, if desired, or may be different solvent systems. According to the kind of the solvent, a drying step may be additionally provided between the process of Solution 1 and Solution 2 or between the process of Solution 3 and Solution 4. After producing the solid electrolyte, a step of washing the device with an organic solvent or with water may be provided. In this case, it is simple and preferred to use the solvent used in any of Solutions 1 to 4 as the organic solvent for use in the washing, however, any solvent may be used as far as it can merely dissolve the monomer compound, the sulfoquinone compound or the compound providing another anion having a dopant ability.

The above-described repetition of oxidation polymerization process facilitates the production of a solid electrolyte having excellent soldering heat resistance (heat stability). In conventionally known capacitors using a solid electrolyte comprising polypyrrole or the like, the capacitor properties greatly fluctuate at a high temperature and a high humidity and the reliability is low. However, the capacitor comprising a solid electrolyte formed with an electrically conducting composition of the present invention has excellent heat stability and exhibits good stability in the doped state, because the polymer composition having the above-described two or more dopants can be filled well step by step into the dielectric surface and even inside the pore, and thereby a structure where many thin films of the polymer composition are overlaid one on another can be formed. As a result, a capacitor having excellent heat stability such that the dielectric film is prevented from damages by the polymer can be provided.

The sulfoquinone anion used in the present invention is a compound anion having a chemical structure such that ketone groups in a quinone structure and a sulfonic acid group as an electron withdrawing group are bound as the substituents within the same molecule. Accordingly, this anion differs from conventionally known molecular anions (e.g., $ClO_4^-$, $BF_4^-$, $Cl^-$, $SO_4^{2-}$, etc.) in the dopant ability (e.g., stability of the charge transfer complex, electric conductivity) and the chemical properties, and further exhibits superior effects as compared with the system of using a conventionally known molecular anion (e.g., $ClO_4^-$, $BF_4^-$, $Cl^-$, $SO_4^{2-}$, etc.) alone. More specifically, when a plurality of capacitor devices are manufactured and compared, particularly excellent effects can be brought out on the capacitor performance.

The sulfoquinone used in the present invention is a generic term of compounds having one or more sulfonic acid groups and a quinone structure within the molecule and any may be used as far as it has a chemical structure of allowing effective working as a dopant in the form of the sulfonate anion. Examples of the sulfoquinone basic skeleton include p-benzoquinone, o-benzoquinone, 1,2-naphthoquinone, 1,4-naphthoquinone, 2,6-naphthoquinone, 9,10-anthraquinone (hereinafter simply referred to as an "anthraquinone"), 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone Furthermore, the sulfonic acid group in the above-described sulfoquinone includes an aromatic sulfonic acid structure resulting from replacing one or more hydrogens of the quinone compound by a sulfonic acid group, or an aliphatic sulfonic acid structure resulting from replacement by sulfoalkylene group through a divalent saturated or unsaturated C1–12 hydrocarbon group. Also, a chemical structure resulting from replacing one or more hydrogens of the sulfoquinone by a saturated or unsaturated C1–12, preferably C1–6, alkyl or alkoxy group, or by a substituent selected from F, Cl and Br may also be used.

In particular, the sulfoquinone for use in the present invention is preferably a sulfoquinone having a skeleton of anthraquinone, 1,4-naphthoquinone or 2,6-naphthoquinone. Examples of anthraquinones which can be used include anthraquinone-1-sulfonic acid, anthraquinone-2-sulfonic acid, anthraquinone-1,5-disulfonic acid, anthraquinone-1,4-disulfonic acid, anthraquinone-1,3-disulfonic acid, anthraquinone-1,6-disulfonic acid, anthraquinone-1,7-disulfonic acid, anthraquinone-1,8-disulfonic acid, anthraquinone-2,6-disulfonic acid, anthraquinone-2,3-disulfonic acid, anthraquinone-2,7-disulfonic acid, anthraquinone-1,4,5-trisulfonic acid, anthraquinone-2,3,6,7-tetrasulfonic acid, and/or an alkali metal salt and/or ammonium salt thereof.

Examples of 1,4-naphthoquinones which can be used include 1,4-naphthoquinone-5-sulfonic acid, 1,4-naphthoquinone-6-sulfonic acid, 1,4-naphthoquinone-5,7-disulfonic acid, 1,4-naphthoquinone-5,8-disulfonic acid, and/or an alkali metal and/or ammonium salt thereof.

Examples of 2,6-naphthoquinones which can be used include 2,6-naphthoquinone-1-sulfonic acid, 2,6-naphthoquinone-3-sulfonic acid, 2,6-naphthoquinone-4-sulfonic acid, 2,6-naphthoquinone-3,7-disulfonic acid, 2,6-naphthoquinone-4,8-disulfonic acid, and/or an alkali metal and/or ammonium salt thereof.

The sulfoquinone further may be selected from industrial dyes and examples thereof include Anthraquinone Iris R and Anthraquinone Violet RN-3RN. These industrial dyes each may also be used as a useful sulfoquinone-based dopant in the form of the above-described salt.

The sulfoquinone for use in the present invention participates into the polymerization reaction of the monomer compound depending on the compound and acts as one oxidative dehydrogenating agent. A proton adduct of the quinone structure, namely a hydroquinone structure, or quinhydron resulting from the reduction of the sulfoquinone in the polymerization reaction may be contained as it is as a dopant in the solid electrolyte.

The oxidizing agent for use in the present invention may be any oxidizing agent suitable for the oxidation polymerization of pyrrole or thiophenes. Examples of the oxidizing agent which can be used include oxidizing agents over a wide range, such as iron(III) chloride, $Fe(ClO_4)_3$, organic acid iron(III), inorganic acid iron(III), alkylpersulfate, ammonium persulfate, hydrogen peroxide and $K_2Cr_2O_7$ described in JP-A-2-15611 (U.S. Pat. No. 4,910,645). Examples of the organic acid of organic acid iron(III) include a similar alkylsulfonic acid such as methanesulfonic acid and dodecylbenzenesulfonic acid, and a C1–20 aliphatic carboxylic acid. However, the oxidizing agent may be restricted in the range of use by the chemical structure of the monomer compound represented by formula (III), the oxidizing agent, reaction conditions and the like. For example, according to *Handbook of Conducting polymers*, page 99, Marcel Dekker, Inc. (1987), FIG. 5, the species of the substituent greatly affects the oxidation potential (one index for showing whether the polymerization readily or difficultly occurs) and in turn, governs the oxidation (polymerization) of thiophenes (oxidation potential expands over a wide range of from about 1.8 to about 2.7 V). Accordingly, in practice, the combination of the monomer compound and oxidizing agent used and the reaction conditions is important.

The anion other than the sulfoquinone anion is a reductant anion after the reaction of the oxidizing agent and specific examples thereof include chloride ion, $ClO_4^-$, aliphatic organic carboxylate anion having from 1 to 12 carbon atoms, sulfate ion, phosphate anion, aliphatic organophosphate anion having from 1 to 12 carbon atoms and borate anion. Furthermore, an electron acceptor dopant such as $NO^+$ and $NO_2^+$ salt (e.g., $NOBF_4$, $NOPF_6$, $NOSbF_6$, $NOAsF_6$, $NOCH_3SO_3$, $NO_2BF_4$, $NO_2 PF_6$, $NO_2CF_3SO_3$) may also be used.

In the production method of a solid electrolytic capacitor of the present invention, the chemical polymerization of a thiophene represented by formula (IX) is particularly preferably performed using a persulfate. The use of iron(III) salt-based oxidizing agent has a problem in that an iron element remains and adversely affects the capacitor properties. Persulfates suitable for the monomer compound represented by formula (IX) are not suitable for the thiophene represented by formula (VIII) ($R^1=R^2=H$, $X=S$) and thus, the use of the oxidizing agent has a restriction. Examples of the persulfate which can be particularly suitably used for the chemical polymerization of a thiophene represented by formula (IX) include ammonium persulfate and potassium persulfate.

Preferred conditions for the producing (polymerization) reaction are described below.

The concentration of the monomer compound represented by formula (VIII) or preferably by formula (IX) for use in the production method of a capacitor of the present invention and the concentrations of the oxidizing agent and the sulfoquinone used vary depending on the kind of the compound or substituents thereof and the combination with a solvent or the like. However, it is in general from $1\times10^{-4}$ to 10 mol/l, preferably from $1\times10^{-3}$ to 5 mol/l. The reaction temperature is selected according to respective reaction processes and cannot be specifically limited, however, it is generally from –70 to 250° C., preferably from 0 to 150° C. and more preferably from 15 to 100° C.

Examples of the solution for use in the production method of the present invention or the solvent for use in washing after the polymerization include ethers such as tetrahydrofuran (THF), dioxane and diethyl ether, ketones such as acetone and methyl ethyl ketone, aprotic polar solvents such as dimethylformamide (DMF), acetonitrile, benzonitrile, N-methylpyrrolidone (NMP) and dimethylsulfoxide (DMSO), esters such as ethyl acetate and butyl acetate, nonaromatic chlorine-type solvents such as chloroform and methylene chloride, nitro compounds such as nitromethane, nitroethane and nitrobenzene, alcohols such as methanol, ethanol and propanol, organic acids such as formic acid, acetic acid and propionic acid, acid anhydrides of the organic acid (e.g., acetic anhydride), water, and a mixed solvent thereof. Of these, preferred are water, an alcohol, a ketone and/or a combination thereof.

The solid electrolyte thus produced has an electric conductivity of from 0.1 to 200 S/cm, preferably from 1 to 100 S/cm, more preferably from 10 to 100 S/cm.

In the present invention, for one part electrode, a known material such as a foil or bar having a valve action of aluminum, titanium, tantalum, niobium or an alloy using such a material as a substrate, or a sintered body mainly comprising such a material. This metal electrode is used after treating the surface thereof by a known method such as etching or chemical forming so as to increase the specific surface area, and thereby forming a metal oxide film layer on the metal foil.

The solid electrolyte is preferably formed by effecting the producing process on the dielectric layer. In particular, a method of chemically depositing an organic electric conductor having excellent heat resistance of the present invention on a dielectric material having a porous or void structure is preferred. Furthermore, in order to attain good electrical contacting, an electric conductor layer is preferably provided on the semiconductor and the electric conductor layer is formed, for example, by solidifying or plating an electrically conducting paste, vapor deposition of a metal or forming an electrically conducting resin film.

Next, explanation will be made on a high performance solid electrolytic capacitor which is small in size and has a low impedance and a durability to sparking voltage test, with its capacitor containing anthracenesulfonic acid selected from at least one anthracenemonosulfonic acid having one sulfonate group or its derivatives as a dopant, and a production method therefor, which are preferred embodiments of the present invention as described in (22) to (28) and (57) to (75) above.

In the present invention, by incorporating into the electrically conducting polymer composition at least one anthracenemonosulfonic acid selected from anthracenesulfonic acid having one sulfonate group or its derivatives (hereinafter simply referred to as a "anthracenemonosulfonic acid") anion as a main anion having a dopant ability, a preferred electrically conducting composition layer (charge-transfer complex) having heat resistance can be formed. As a result, a solid electrolytic capacitor having excellent low impedance property and a production method thereof can be provided. In addition to the anthracenemonosulfonate anion dopant, a further anion may be added as a dopant.

The π electron-conjugated polymer in an electrically conducting polymer composition suitable for the capacitor of the present invention is a polymer having a π electron-conjugated structure in the polymer main chain structure. Specific examples thereof include polyaniline, poly-p-phenylene, poly-p-phenylenevinylene, polythienylenevinylene, polyheterocyclic polymer and substituted derivatives thereof. Of these specific examples, preferred is a π electron-conjugated polymer comprising a structural unit represented by the general formula (I) above, and more preferred is a π electron-conjugated polymer comprising a structural unit represented by the general formula (II) above.

The general formulae (I) and (VIII) above contain the above-mentioned sulfoquinone having a sulfo anion group and a quinone structure in the molecule and as the dopant other than quinone, the same explanation as the solid electrolytic capacitor containing other anion having a dopant ability is also applicable so that detailed description will be omitted here.

Among the monomer compounds represented by formula (VIII) for use in the solid electrolytic capacitor and the production process thereof of the present invention, for example thiophene ($R^1=R^2=H$, $X=S$) and pyrrole ($R^1=R^2=H$, $X=NH$), or among thiophenes represented by formula (IX), a monomer compound of 3,4-dioxyethylenethiophene are known. Also, many of oxidizing agents which can polymerize such a monomer compound are known. However, a capacitor comprising a solid electrolyte formed of an electrically conducting composition containing a anthracenemonosulfonate (meaning a species of anion, herein) having a sulfo group as a dopant and using another anion in combination as an auxiliary dopant has heretofore been unknown.

More specifically, the capacitor disclosed in JP-A-10-32145 (European Patent Application Laid-open No. 820076 (A2)) discloses a polymer of a monomer selected from pyrrole, thiophene, furan, aniline and derivatives thereof doped with an aromatic polysulfonic acid compound having a plurality of sulfo groups in the molecule as a dopant, but the above-mentioned anthracenemonosulfonic acid having a sulfo group used in the capacitor of the present invention has been unknown. Further combined use togther with other dopant other than anthracenemonosulfonate has also been unknown.

The preferred embodiment of the solid electrolytic capacitor of the present invention comprises a solid electrolyte which comprises dopants such that the above-described anthracenemonosulfonate is contained in an amount of from 0.1 to 50 mol % and another anion in addition to the above-described anion is contained in an amount of from 0.1 to 10 mol %, based on the total weight of the α-conjugated polymer composition, and is particularly characterized by having excellent low impedance property with other problems described above to be solved. Such a capacitor has been heretofore not known.

In the capacitor of the present invention, the content of the above-mentioned anthracenemonosulfonate is preferably in the range of 1–30 mol % based on the total weight of the π electron-conjugated polymer composition for providing a capacitor having particularly excellent low impedance property. On the other hand, the content of other dopant other than the anthracenemonosulfonate is in the range of 0.1 to 5 mol % based on the total weight of the repeating units of the π electron-conjugated polymer. The other dopant is used as a reduced chemical species (anion) of an oxidizing agent since the oxidizing agent is used in the polymerization of monomer compounds in the production method of the present invention. It may be added in a different manner and the method of co-existence is not limited particularly.

Usually, the method for producing (formation of) the above-described solid electrolyte plays an important role in the production of a capacitor for attaining high capacity and high frequency property and improving tan δ, leakage current, heat resistance (reflow property), impedance, durability, etc. To these effects, it is important to properly combine the π electron conjugated structure constituting a solid electrolyte and the dopant, and to densely fill and form an electrically conducting polymer composition layer on a fine dielectric layer to thereby increase or improve the homogeneity of the electric conducting path. In particular, the constitution of the electrically conducting polymer composition has a great effect on the capacity properties.

The production method of the present invention is characterized by allowing an anthracenemonosulfonate and another anion to be present together as dopants for the polymer of the above-described monomer compound. More specifically, the production method of the present invention comprises a step of producing a polymer composition as the solid electrolyte on the dielectric surface and the polymer composition is produced by causing oxidative polymerization of a monomer compound represented by formula (VIII) or preferably by formula (IX) on the finely porous dielectric layer in the presence of a compound capable of providing an anthracenemonosulfonate by the action of the oxidizing agent. By repeating this production process once or more, preferably from 3 to 20 times per one anode substrate, a dense solid electrolyte layer can be easily formed.

For example, in one preferred embodiment of the production process, the polymerization step may include a step of dipping a valve-acting metal anode foil having formed thereon an oxide dielectric film layer in a solution containing an oxidizing agent (Solution 1) and a step of dipping the anode foil in a solution containing a monomer compound and an anthracenemonosulfonate (Solution 2), or may include a step of dipping the anode foil in Solution 2 and then dipping it in Solution 1 or a step of dipping the anode foil in Solution 1 and then dipping it in Solution 2.

In another embodiment, the production step may include a step of dipping the anode foil in a solution containing an oxidizing agent and an anthracenemonosulfonate (Solution 3) and a step of dipping the anode foil in a solution containing a monomer compound (Solution 4) or may include a step of dipping the anode foil in Solution 4 and then dipping it in Solution 3 or a step of dipping the anode foil in Solution 3 and then dipping it in Solution 4. Solution 1 to 4 each may be used in the form of a suspension.

Furthermore, the dipping process may be replaced to the coating operation. Solutions 1 to 4 may be the same, if desired, or may be different solvent systems. According to the kind of the solvent, a drying step may be additionally provided between the process of Solution 1 and Solution 2 or between the process of Solution 3 and Solution 4. After producing the solid electrolyte, a step of washing the device with an organic solvent or with water may be provided. In this case, it is simple and preferred to use the solvent used in any of Solutions 1 to 4 as the organic solvent for use in the washing. However, any solvent may be used as far as it can merely dissolve the monomer compound, the anthracenemonosulfonic acid compound or the compound providing another anion having a dopant ability. The washing step with a solvent can decrease the content of dopants other than anthracenemonosulfonate dopant in the polymer. However, existence of the anthracenemonosulfonate dopant may sometimes contribute to the property of the solid electrolytic capacitor of the present invention.

The above-described repetition of oxidation polymerization process facilitates the production of a solid electrolyte having excellent soldering heat resistance (heat stability). In conventionally known capacitors using a solid electrolyte comprising polypyrrole or the like, the capacitor properties greatly fluctuate at a high temperature and a high humidity and the reliability is low. However, the capacitor comprising a solid electrolyte formed with an electrically conducting composition of the present invention has excellent heat stability and exhibits good stability in the doped state, because the polymer composition having the above-described anthracenemonosulfonate dopant and an other dopant derived from the oxidizing agent can be filled well step by step into the dielectric surface and even inside the pore, and thereby a structure where many thin films of the polymer composition are overlaid one on another can be formed. As a result, a capacitor having excellent heat stability such that the dielectric film is prevented from damages by the polymer can be provided.

The charge transfer complex comprised anthracenemonosulfonate and π electron-conjugated polymer is superior in thermal stability and stability in electric conductivity to the complex with conventionally known dopants (e.g., $ClO_4^-$, $BF_4^-$, $Cl^-$, $SO_4^{2-}$, benzensulfonate, etc.) because it is attributable to high aromaticity of the anthracene skeleton and electron attractive property and water solubility of the sulfonic group and as a result can provide an excellent capacitor property.

The anthracenemonosulfonate used in the present invention is a generic term of anthracenemonosulfonate compounds subsituted with a sulfo group on the anthracene skeleton. Examples of preferred compounds include unsubstituted anthracenesulfonate, or substituted compounds in which at least one of the hydrogen atoms on the anthracene ring of anthracenesulfonic acid are substituted by linear or branched, saturated or unsaturated C1–12, preferably C1–6, hydrocarbon group or alkoxy group.

Specific examples of the compounds which donate the above-mentioned unsubstituted anthracenemonosulfonate include anions of anthracene-1-sulfonic acid, anthracene-2-sulfonic acid, anthracene-9-sulfonic acid, and their alkali metal salts, ammonium salts, etc. Specific examples of the subsituent of the substituted anthracenemonosulfonate compound whose anthracene ring hydrogen(s) were subsitutued include alkyl groups such as methyl, ethyl, propyl, isopropyl, butyl, isobutyl, t-butyl, pentyl, hexyl, octyl, decyl, and dodecyl, unsaturated groups such as vinyl, allyl, 3-butenyl, and 5-hexenyl, and methoxy, ethoxy, propyloxy, butoxy, pentoxy, hexyloxy, octyloxy, decyloxy, and dodecyloxy, etc.

The oxidizing agent for use in the present invention may be any oxidizing agent suitable for the oxidation polymerization of pyrroles or thiophenes. Examples of the oxidizing agent which can be used include oxidizing agents over a wide range, such as iron(III) chloride, $Fe(ClO_4)_3$, organic acid iron(III), inorganic acid iron(III), alkylpersulfate, ammonium persulfate, hydrogen peroxide and $K_2Cr_2O_7$ described in JP-A-2-15611 (U.S. Pat. No. 4,910,645). Examples of the organic acid of the organic acid iron(III) include a C1–20 alkylsulfonic acid such as methanesulfonic acid and dodecylbenzenesulfonic acid, and a similar aliphatic carboxylic acid. However, the oxidizing agent may be restricted in the range of use by the chemical structure of the monomer compound represented by formula (VIII), the oxidizing agent, reaction conditions and the like. For example, according to Handbook of Conducting Polymers, page 99, Marcel Dekker, Inc. (1987), FIG. 5, the kind of the substituent greatly affects the oxidation potential (one index for showing whether the polymerization readily or difficultly occurs) and in turn, governs the oxidation (polymerization) of thiophenes (oxidation potential expands over a wide range of from about 1.8 to about 2.7 V). Accordingly, in practice, the combination of the monomer compound and oxidizing agent used and the reaction conditions is important.

The anion other than the anthracenemonosulfonate is a reduced chemical species anion after the reaction of the oxidizing agent and specific examples thereof include chloride ion, $ClO_4^-$, C1–12 aliphatic organic carboxylate ion, sulfate ion, phosphate ion, C1–12 aliphatic organophosphate and borate. Furthermore, an electron acceptor dopant such as $NO^+$ and $NO_{2+}$ salts (e.g., $NOBF_4$, $NOPF_6$, $NOSbF_6$, $NOAsF_6$, $NOCH_3SO_3$, $NO_2BF_4$, $NO_2PF_6$, $NO_2CF_3SO_3$) may also be used.

In the production method of a solid electrolytic capacitor of the present invention, the chemical polymerization of thiophene represented by formula (IX) is particularly preferably performed using persulfate. The use of iron(III) salt-based oxidizing agent has a problem in that an iron element remains and adversely affects the capacitor properties. Persulfates suitable for the monomer compound represented by formula (IX) are not suitable for the thiophene represented by formula (VIII) ($R^1=R^2=H$, $X=S$) and thus, the use of the oxidizing agent has a restriction. Examples of the persulfate which can be particularly suitably used for the chemical polymerization of a thiophene represented by formula (IX) include ammonium persulfate and potassium persulfate.

Preferred conditions for the producing (polymerization) reaction are described below.

The concentration of the monomer compound represented by formula (VIII) or preferably by formula (IX) for use in the production method of a capacitor of the present invention and the concentrations of the oxidizing agent and the anthracenemonosulfonic acid used vary depending on the kind of the compound or substituents thereof and the combination with a solvent or the like. However, it is in general from $1 \times 10^{-4}$ to 10 mol/l, preferably from $1 \times 10^{-3}$ to 5 mol/l. The reaction temperature is selected according to respective reaction processes and cannot be specifically limited, however, it is generally from −70 to 250° C., preferably from 0 to 150° C. and more preferably from 15 to 100° C.

Examples of the solution for use in the production method of the present invention or the solvent for use in washing after the polymerization include ethers such as tetrahydrofuran (THF), dioxane and diethyl ether, ketones such as acetone and methyl ethyl ketone, aprotic polar solvents such as dimethylformamide (DMF), acetonitrile, benzonitrile, N-methylpyrrolidone (NMP) and dimethylsulfoxide (DMSO), esters such as ethyl acetate and butyl acetate, nonaromatic chlorinated solvents such as chloroform and methylene chloride, nitro compounds such as nitromethane, nitroethane and nitrobenzene, alcohols such as methanol, ethanol and propanol, organic acids such as formic acid, acetic acid and propionic acid, acid anhydrides of the organic acid (e.g., acetic anhydride), water, and a mixed solvent thereof. Of these, preferred are water, alcohols, ketones and/or a combination thereof.

The solid electrolyte thus produced has an electric conductivity of from 0.1 to 200 S/cm, preferably from 1 to 100 S/cm, more preferably from 10 to 100 S/cm.

In the present invention, for one part electrode, a known material such as a foil or bar having a valve action of aluminum, titanium, tantalum, niobium or an alloy using such a material as a substrate, or a sintered body mainly comprising such a material. This metal electrode is used after treating the surface thereof by a known method such as etching or chemical forming so as to increase the specific surface area, and thereby forming a metal oxide film layer on the metal foil.

The solid electrolyte is preferably formed by effecting the producing process on the dielectric layer. In particular, a method of chemically depositing an organic electric conductor having excellent heat resistance of the present invention on a dielectric material having a porous or void structure is preferred. Furthermore, in order to attain good electrical contacting, an electric conductor layer is preferably provided on the semiconductor and the electric conductor layer is formed, for example, by solidifying or plating an electrically conducting paste, vapor deposition of a metal or forming an electrically conducting resin film.

An example of the solid electrolytic capacitor product by the present invention is shown in FIG. 1 in a cross-sectional view. A basic device includes an oxide film (dielectric layer) (3) of an anode substrate composed of an etched metal foil (1), a solid semiconductor (solid electrolyte) (4) as an electrode opposite to the outside of the oxide film, and an electric conductor layer (5) formed from an electrically conducting paste. A cathode lead terminal (7*a*) is connected to the metal foil (1) and an anode lead terminal (7*b*) is connected to the electric conductor layer (5). The whole device is sealed with an insulating resin (6) such as an epoxy resin completely and is further is jacketed with a resin mold, a resin case or a metal-made jacket case or by resin dipping and then the capacitor can be used as a product capacitor for various uses.

BEST MODE FOR CARRYING OUT THE INVENTION

Hereafter, this invention will be described in detail by examples. However, the invention is by no means limited thereto.

EXAMPLE 1

On an etched, formed aluminum foil cut to 3 mm×10 mm was applied a polyimide tape of 1 mm wide so as to extend over both surfaces thereof so that it divides the foil into 4 mm and 5 mm portions. The 3 mm×4 mm portion of the etched, formed aluminum foil was subjected to forming at 13V in an aqueous 10 wt % ammonium adipate solution to form an oxide dielectric film. Then, the 3 mm×4 mm portion of the aluminum foil was dipped in an aqueous 30 wt % ammonium persulfate solution (solution 1) and taken out of the solution, followed by drying at 80° C. for 30 minutes. Subsequently, the 3 mm×4 mm portion of the aluminum foil (the portion having formed thereon an oxide dielectric film) was dipped in an isopropanol solution containing 20 wt % 3,4-dioxyethylene-thiophene (solution 2) and taken out of the solution and left standing in an environment at 60° C. for 10 minutes, thereby completing the oxidative polymerization. The substrate was dipped again in solution 1 and processed in the same manner as described above. The procedure from the dipping in solution 1 to the oxidative polymerization was repeated 10 times and then the substrate was washed with warm water at 50° C. for 10 minutes, followed by drying at 100° C. for 30 minutes to form an electrically conducting polymer layer (solid electrolyte layer).

Figure 2:
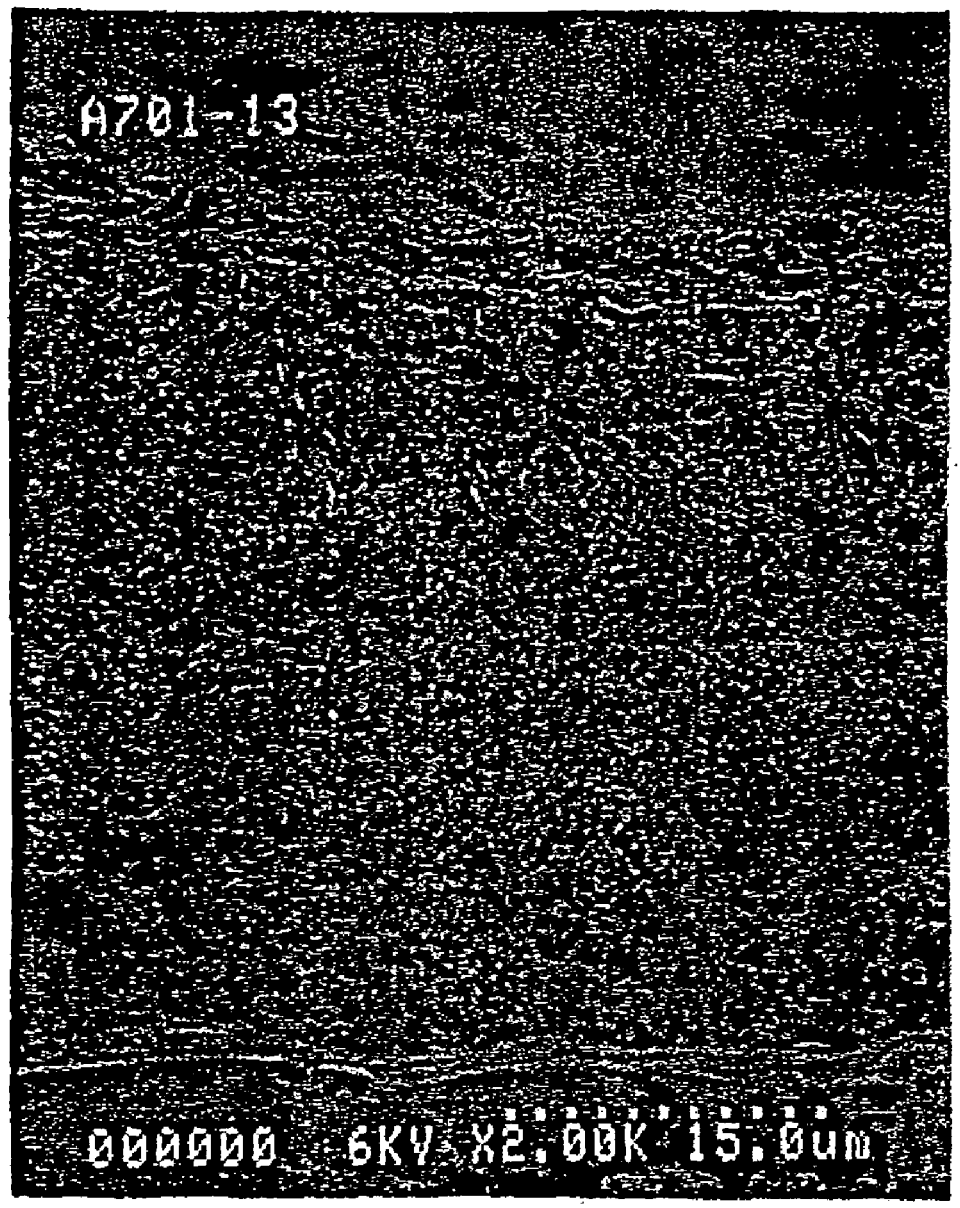
FIG. 2 is a scanning electron micrograph (at a magnification of ×2,000) illustrating in cross section an aluminum foil with a pore structure having formed thereon an electrically conducting polymer layer according to Example 1 of the invention.
Figure 3:
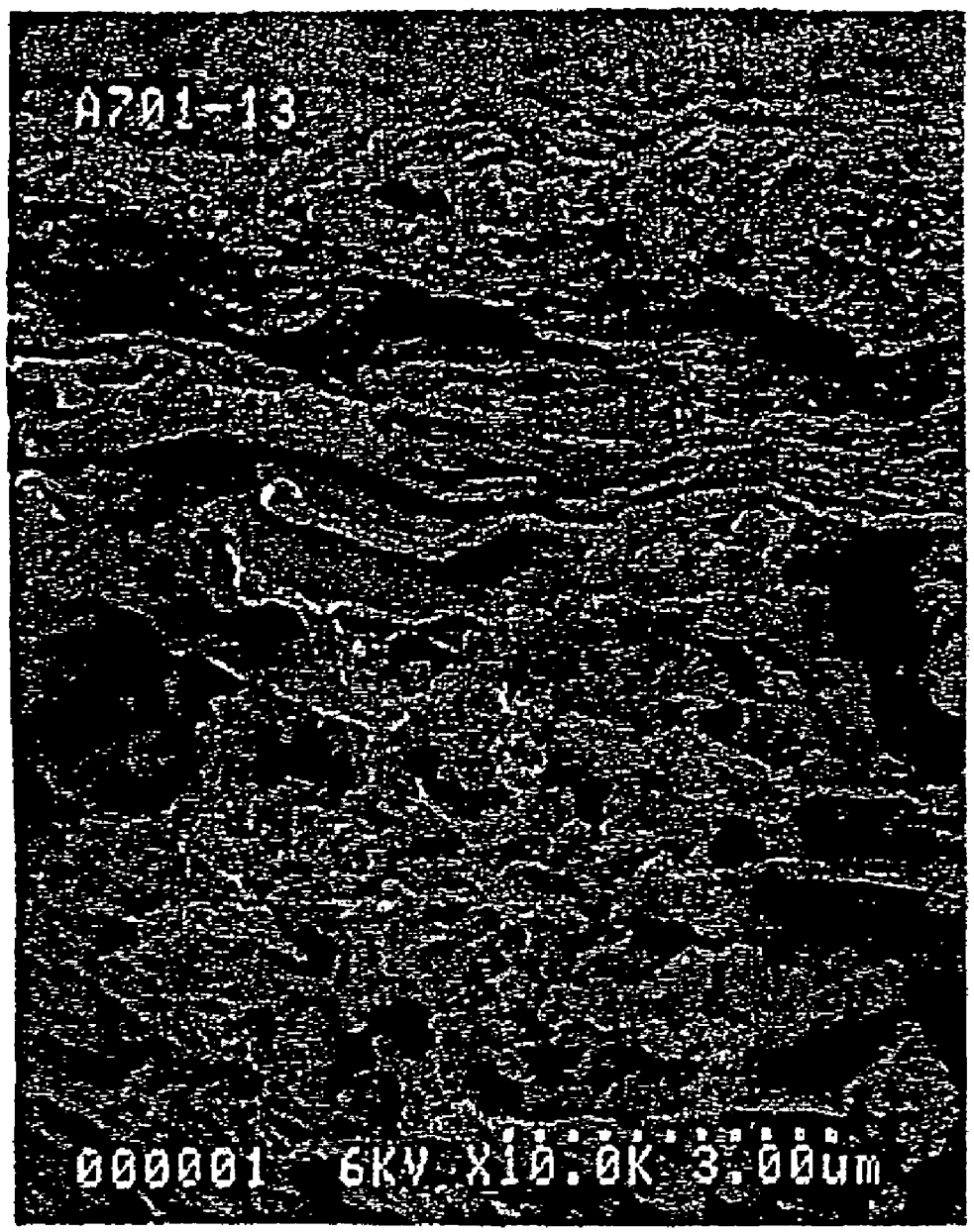
FIG. 3 is an enlarged scanning electron micrograph (at a magnification of ×10,000) with an outside surface portion of the pore structure illustrated in FIG. 2 on an enlarged scale.
Figure 3:
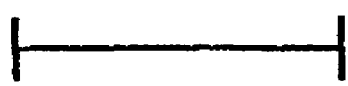
Figure 4:
FIG. 4 is an enlarged scanning electron micrograph (at a magnification of ×50,000) with an outside surface portion of the pore structure illustrated in FIG. 3 on an enlarged scale.

A scanning electron micrograph (at magnification of ×2,000) of a cross-section of the aluminum foil having formed thereon an electrically conducting polymer layer thus obtained is shown in FIG. 2. FIG. 3 is an enlarged illustration (at a magnification of ×10,000) of the portion formed on an outer surface of microfine pore structure on the dielectric material layer of the electrically conducting polymer layer shown in FIG. 2. FIG. 4 is a scanning electron micrograph (at a magnification of ×50,000), illustrating the microfine pore portion shown in FIG. 3 in an enlarged view.

From these figures, it revealed that the electrically conducting polymer covers in the form of a lamellar structure the surface inside the microfine pores of dielectric material (alumina) on the metallic aluminum to form void spaces in the lamellar electrically conducting polymer layer. The thickness of the electrically conducting polymer layer formed on the outside surface of the microfine pore structure is about 5 μm and the thickness per unit layer which constitutes the lamellar structure is in the range of about 0.1 to 0.3 μm.

FIGS. 2 to 4, which are enlarged views of the microfine portion of the above-described aluminum foil, indicate that although the electrically conducting polymer covers the entire surface inside the microfine pores, there exist voids even in these covered portions.

Subsequently, the part of the aluminum foil on which the electrically conducting polymer layer was formed was connected to a lead terminal of the cathode through carbon paste and silver paste and the portion on which no electrically conducting polymer layer was formed was welded with a lead terminal of the anode of the element. These elements were sealed with an epoxy resin to fabricate a capacitor device. The rated voltage was applied to the capacitor device thus fabricated and it was aged at 125° C. for 2 hours. Thus, 30 capacitor devices in total were completed.

The 30 capacitor devices were measured for initial characteristics, i.e., capacitance (C) and tangent of loss angle (tan δ)(DF) at 120 Hz, impedance (Z) at a resonance frequency, and leakage current (LC). The leakage current (LC) was measured one minute after application of a rated voltage. Table 1 shows average values of the measured values and fraction defective and number of shorted units when those having an LC of 0.16 μA (0.002 CV) or more are judged as a shorted product (defective). The average LC is calculated exclusive of the defective units. Table 2 shows the results of reflow tests and subsequent moisture resistance tests. In the moisture resistance tests, leakage current of 3.2 μA (0.04 CV) or more are judged as a defective unit. The reflow tests were carried out by passing samples through a temperature region at 230° C. for 30 minutes. The moisture resistance tests were carried out by leaving samples to stand at high temperature and high humidity conditions of 85° C. and 85% RH for 500 hours.

COMPARATIVE EXAMPLE 1

Thirty (30) capacitor devices were fabricated in the same manner as in Example 1 except for using the following method. That is, the 3 mm×4 mm portion of the aluminum foil was dipped in an isopropanol solution containing 20 wt % 3,4-dioxyethylene-thiophene (solution 2) and then in an aqueous 30 wt % ammonium persulfate solution (solution 1). Then the foil was taken out and left standing in an environment at 60° C. for 10 minutes, thus completing the oxidative polymerization. Thereafter, the substrate was washed with warm water at 50° C. for 10 minutes and dried at 100° C. for 30 minutes. The operations of the dipping in solution 2 and then solution 1, taking out and leaving standing, washing with warm water, and drying were repeated 20 times to form an electrically conducting polymer layer. In the capacitor device of the instant comparative example, an electrically conducting polymer layer of about 5 μm in thickness was formed on the outer surface of microfine pore structure, but scanning electron micrograph indicated no lamellar structure like that in Example 1 (FIGS. 2 to 4). The evaluation of the characteristics of the capacitor devices were performed in the same manner as in Example 1 and the results obtained are shown in Tables 1 and 2.

EXAMPLE 2

Thirty (30) capacitor devices were fabricated in the same manner as in Example 1 except for using in Example 1 potassium persulfate in place of ammonium persulfate and N-methylpyrrole in place of 3,4-dioxyethylene-thiophene. Also in the electrically conducting polymer layer of the capacitor device of this example, a lamellar structure similar to that in Example 1 (FIGS. 2 to 4) was observed and an electrically conducting polymer layer formed on the outer surface of microfine pore structure had a thickness of about 10 μm and a unit layer constituting the lamellar structure had a thickness of about 0.1 to 0.5 μm. Inside the microfine pore structure, there were observed void spaces similar to those illustrated in FIG. 3. Evaluation of the characteristics of capacitor devices were performed in the same manner as in Example 1. The results obtained are shown in Tables 1 and 2.

COMPARATIVE EXAMPLE 2

Thirty (30) capacitor devices were fabricated in the same manner as in Comparative Example 1 except for using in Comparative Example 1 potassium persulfate in place of ammonium persulfate and N-methylpyrrole in place of 3,4-dioxyethylene-thiophene. Also in the electrically conducting polymer layer of the capacitor device of this comparative example, a lamellar structure similar to that in Comparative Example 1 was observed but there was observed no lamellar structure like that in Example 1 (FIGS. 2 to 4). The evaluation of the characteristics of the capacitor devices were performed in the same manner as in Example 1 and the results obtained are shown in Tables 1 and 2.

EXAMPLE 3

Thirty (30) capacitor devices were fabricated in the same manner as in Example 1 except for using the following method. That is, the 3 mm×4 mm portion of the aluminum foil was dipped in a dioxane solution containing 30 wt % 2,3-dichloro-5,6-dicyanobenzoquinone (solution 1) and taken out and dried at 100° C. for 30 minutes. Subsequently, the aluminum foil was dipped in an isopropanol solution containing 20 wt % of isothianaphthene (solution 2) and taken out and left standing in an environment at 80° C. for 30 minutes, thus completing the oxidative polymerization. Then, the operations of from the dipping in solution 1 to the oxidative polymerization were repeated 10 times. Thereafter, the substrate was washed with dioxane at 50° C. for 10 minutes and dried at 100° C. for 30 minutes to form an electrically conducting polymer layer. In the capacitor device of the instant example, a lamellar structure similar to that in Example 1 (FIGS. 2 to 4) was observed and an electrically conducting polymer layer formed on the outer surface of microfine pore structure had a thickness of about 20 μm and a unit layer constituting the lamellar structure had a thickness of about 0.2 to 1 μm. Inside the microfine pore structure, there were observed void spaces similar to those illustrated in FIG. 3. Evaluation of the characteristics of capacitor devices were performed in the same manner as in Example 1. The results obtained are shown in Tables 1 and 2.

COMPARATIVE EXAMPLE 3

Thirty (30) capacitor devices were fabricated in the same manner as in Comparative Example 1 except for using the following method. That is, the 3 mm×4 mm portion of the aluminum foil was dipped in an isopropanol solution containing 20 wt % isothianaphthene (solution 2) and then in a dioxane solution containing 30 wt % 2,3-dichloro-5,6-dicyanobenzoquinone (solution 1). Then the foil was taken out and left standing in an environment at 80° C. for 30 minutes, thus completing the oxidative polymerization. Thereafter, the substrate was washed with warm water at 50° C. for 10 minutes and dried at 100° C. for 30 minutes. The operations of the dipping in solution 2 and to the washing and drying were repeated 20 times to form an electrically conducting polymer layer. In the capacitor device of the instant comparative example, an electrically conducting polymer layer of about 15 μm in thickness was formed on the outer surface of microfine pore structure, but scanning electron micrograph indicated no lamellar structure like that in Example 1 (FIGS. 2 to 4). The evaluation of the characteristics of the capacitor devices were performed in the same manner as in Example 1 and the results obtained are shown in Tables 1 and 2.

TABLE 1

|  | Initial Characteristics | | | | | |
| --- | --- | --- | --- | --- | --- | --- |
|  | C (μF) | DF (%) | Z (mΩ) | LC (μA) | Ratio of Defective/Sample (units/units) | Number of Short Circuit |
| Example 1 | 12.8 | 0.7 | 42 | 0.03 | 0/30 | 0 |
| Example 2 | 12.3 | 0.9 | 34 | 0.05 | 0/30 | 0 |
| Example 3 | 12.5 | 0.8 | 51 | 0.06 | 0/30 | 0 |
| Comparative Example 1 | 12.4 | 1.4 | 78 | 0.11 | 2/30 | 1 |
| Comparative Example 2 | 11.9 | 1.7 | 89 | 0.19 | 4/30 | 2 |
| Comparative Example 3 | 12.6 | 2.2 | 93 | 0.17 | 3/30 | 2 |

TABLE 2

|  | Reflow Test | | Humidity Resistance Test | | |
| --- | --- | --- | --- | --- | --- |
|  | Defective Rate | Number of Short Circuit | LC (μA) | Defective Rate | Number of Short Circuit |
| Example 1 | 0/30 | 0 | 0.49 | 0/30 | 0 |
| Example 2 | 0/30 | 0 | 0.54 | 1/30 | 0 |
| Example 3 | 0/30 | 0 | 0.59 | 0/3 | 0 |
| Comparative Example 1 | 4/28 | 2 | 1.53 | 3/24 | 2 |
| Comparative Example 2 | 7/26 | 5 | 1.94 | 8/21 | 5 |
| Comparative Example 3 | 6/27 | 3 | 1.68 | 5/24 | 3 |

*Defective Rate: Ratio of Defective/Sample(units/units)

EXAMPLE 4

An aluminum foil having a purity of 99.99% and a thickness of 100 μm was used as an anode and the surface thereof was electrochemically etched by an ordinary method to prepare a porous aluminum foil. The porous aluminum foil obtained was subjected to formation in an ammonium adipate solution to form an aluminum oxide layer as a dielectric thin film on the aluminum foil and then boiled in hot water to again effect formation to homogenize the dielectric thin film. The thus-prepared aluminum foil was thoroughly dried and coated with an aqueous solution of 0.1M ferric sulfate as an oxidizing agent on the porous surface, and then dried under heating (at a temperature of 80° C.) to support and activate the oxidizing agent. Thereafter, the aluminum foil was dipped in an ethanol solution having dissolved therein 5 g of 1,3-dihydroisothianaphthene and 0.1 g of sodium dodecylbenzenesulfonate (hereinafter simply referred to as "DBSNa") and heated at 80° C. for 10 minutes in a vapor phase. This in-situ polymerization accompanied by the evaporation of solvent was repeated 20 times to produce a polymer composition. The polymer composition deposited on the surface was very carefully measured on the electric conductivity by a four-probe method and found to be 50 S/cm. The capacitor device thus manufactured was measured on the properties and the results obtained are shown in Table 3. The capacitance and tan δ are the values at a frequency of 120 Hz and the impedance is a value at 1,000 KHz.

COMPARATIVE EXAMPLE 4

An aluminum foil subjected to formation in the same manner as in Example 4 was dipped in a three-component mixed solution (the monomer, oxidizing agent and dopant were the same) adjusted so that each component had the same concentration as in Example 4 and immediately the in-situ polymerization by heating at 80° C. for 10 minutes was repeated 20 times to manufacture a capacitor device. The electric conductivity on the surface was carefully measured by a four-probe method and found to be $10^{-2}$ S/cm. However, the capacitor formed therefrom had a small capacitance and the capacitor properties were not satisfied. The properties of the capacitor are shown together in Table 3.

EXAMPLE 5

A capacitor device was manufactured by the same production method except for using 1,3-dihydronaphtho[2,3-c]thiophene in place of 1,3-dihydroisothianaphthene used in Example 4. The polymer composition deposited on the surface had an electric conductivity of 20 S/cm (by a four-probe method). The capacitor properties were also measured in the same manner. The results obtained are shown in Table 3.

EXAMPLE 6

A capacitor device was manufactured through the same process except for using 5,6-dioxymethylene-1,3-dihydroisothianaphthene in place of 1,3-dihydroisothianaphthene used in Example 4 and using a monomer solution not containing the dopant (DBSNa) described in Example 4. The processing conditions in the in-situ polymerization were 50° C. and 10 minutes. The polymer composition deposited on the surface had an electric conductivity of 80 S/cm (by a four-probe method). The capacitor properties obtained are shown in Table 3.

COMPARATIVE EXAMPLE 5

An aluminum foil prepared in the same manner as in Example 4 was dipped in a mixed component solution containing the same monomer and oxidizing agent as in Example 6 adjusted so that each component had the same concentration as in Example 6, and then the processing was performed under the same conditions (50° C., 10 minutes) in the same repetitions as in Example 6 to manufacture a capacitor device. The electric conductivity on the surface was 0.1 S/cm. The capacitor properties obtained are shown in Table 3. With respect to the capacitor properties, the capacitance was small.

EXAMPLE 7

A capacitor device was manufactured by the same production method as in Example 4 except for using 1,3-dihydrothieno[3,4-b]quinoxaline in place of 1,3-dihydroisothianaphthene used in Example 4 and using sodium naphthalenesulfonate (hereinafter simply referred to as "NSNa") in place of DBSNa as a dopant. The polymer composition deposited on the surface had an electric conductivity of 5 S/cm (by a four-probe method). The capacitor properties were measured and the data obtained are shown in Table 3.

EXAMPLE 8

A capacitor device was manufactured by the same production method as in Example 4 except for using 5,6-dimethoxy-1,3-dihydroisothianaphthene in place of 1,3-dihydroisothianaphthene used in Example 4 and using NSNa in place of DBSNa. The polymerization temperature and time were changed to 70° C. and 20 minutes. The polymer composition deposited on the surface had an electric conductivity of 80 S/cm (by a four-probe method). The capacitor properties were measured and the results obtained are shown in Table 3.

TABLE 3

| | Capacitor Properties | | | |
|---|---|---|---|---|
| | C(μF) | DF(%) | LC (μA · 10 V value) | Z(Ω) |
| Example 4 | 9.9 | 0.88 | 0.09 | 0.078 |
| Example 5 | 9.8 | 0.92 | 0.08 | 0.092 |
| Example 6 | 10.1 | 0.80 | 0.08 | 0.052 |
| Example 7 | 9.9 | 0.95 | 0.06 | 0.080 |
| Example 8 | 10.2 | 0.86 | 0.06 | 0.055 |
| Comparative Example 4 | 4.8 | 2.50 | 10.50 | 0.95 |
| Comparative Example 5 | 6.7 | 2.30 | 8.65 | 0.67 |

Property Test 1:

The every 10 capacitors manufactured according to the production methods of Examples 4 to 8, Comparative Examples 4 and 5 were subjected to reflow tests by passing a region at a tempreature of 230° C. for 30 seconds and compared on the properties between before and after the reflow processing. The results obtained are shown in Table 4.

TABLE 4

| Results of Test on Reflow Heat Resistance (number of products accepted per 10 devices) | | |
|---|---|---|
| | Before Reflow Processing | After Reflow Processing |
| Device produced in Example 4 | 10 | 10 |
| Device produced in Example 5 | 9 | 7 |
| Device produced in Example 6 | 10 | 9 |
| Device produced in Example 7 | 10 | 10 |
| Device produced in Example 8 | 10 | 10 |
| Device produced in Comparative Example 4 | 3 | 0 |
| Device produced in Comparative Example 5 | 2 | 1 |

REFERENCE EXAMPLE 1

1,3-dihydroisothianaphthene monomer (melting point: 23° C.) was solution-polymerized in nitrobenzene at 50° C. in the presence of oxygen and ferric chloride (oxidizing agent) according to the method described in *Synthetic Metals*, Vol. 16, pp. 379–380 (1986) and the polymer obtained was measured on the electric conductivity. The electric conductivity was as low as 0.1 S/cm and the polymer was not suitable for the solid electrolyte of a capacitor.

EXAMPLE 9

A capacitor device was manufactured through the same process as in Example 4 except for using 1,3-dihydroisothianaphthene-2-oxide in place of 1,3-dihydroisothianaphthene used in Example. 4. The polymer composition deposited on the surface was very carefully measured on the electric conductivity by a four-probe method and found to be 70 S/cm. The capacitor device thus manufactured was measured on the properties and the results obtained are shown in Table 5. The capacity and tan δ are the values at a frequency of 120 Hz and the impedance is a value at 1,000 KHz.

COMPARATIVE EXAMPLE 6

An aluminum foil prepared in the same manner as in Example 9 was dipped in a mixed component solution containing the same monomer, oxidizing agent, and dopant as in Example 9 adjusted so that each component had the same concentration as in Example 9, immediately followed by conducting in-situ polymerization 20 times repeatedly by heating at 80° C. for 10 minutes to manufacture a capacitor device. The electric conductivity on the surface was carefully measured by a four-probe method and found to be $10^{-2}$ S/cm. However, the capacitor formed therefrom had a small capacitance and the capacitor properties were insufficient as shown together in Table 5.

EXAMPLE 10

A capacitor device was manufactured by the same production method except for using 1,3-dihydronaphtho[2,3-c]thiophene-2-oxide in place of 1,3-dihydroisothianaphthene-2-oxide used in Example 9. The polymer composition deposited on the surface had an electric conductivity of 10 S/cm (by a four-probe method). The capacitor properties were measured and the data obtained are shown in Table 5.

EXAMPLE 11

A capacitor device was manufactured by the same process except for using 5,6-dioxymethylene-1,3-dihydroisothianaphthene-2-oxide in place of 1,3-dihydroisothianaphthene-2-oxide used in Example 9 and using the monomer solution described in that example (DBSNa) but from which the dopant described was eliminated. The in-situ polymerization conditions were 50° C. and 10 minutes. The polymer composition deposited on the surface had an electric conductivity of 100 S/cm (by a four-probe method). The capacitor properties were measured and the data obtained are shown in Table 5.

COMPARATIVE EXAMPLE 7

An aluminum foil prepared in the same manner as in Example 9 was dipped in a mixed component solution containing the same monomer and oxidizing agent as in Example 11 adjusted so that each component were the same and had the same concentration as in Example 11, followed by conducting the treatment in the same times at the same temperature (50° C.) for the same time (10 minutes) to manufacture a capacitor device. The polymer composition deposited on the surface had an electric conductivity of 0.05 S/cm. However, the capacitor formed therefrom had a small capacitance as shown together in Table 5.

EXAMPLE 12

A capacitor device was manufactured by the same production method as in Example 9 except for using 1,3-dihydrothieno[3,4-b]quinoxaline-2-oxide in place of 1,3-dihydroisothianaphthene-2-oxide used in Example 9 and using NSNa as the dopant in stead of DBSNa. The polymer composition deposited on the surface had an electric conductivity of 1 S/cm (by a four-probe method). The capacitor properties were measured and the data obtained are shown in Table 5.

EXAMPLE 13

A capacitor device was manufactured by the same production method as in Example 9 except for using 5,6-dimethoxy-1,3-dihydroisothianaphthene-2-oxide in place of 1,3-dihydroisothianaphthene-2-oxide used in Example 9 and using NSNa in stead of DBSNa. The polymerization temperature and time were changed to 70° C. and 20 minutes, respectively. The polymer composition deposited on the surface had an electric conductivity of 100 S/cm (by a four-probe method). The results of measurement of capacitor properties are as shown in Table 5.

TABLE 5

| | Capacitor Properties | | | |
|---|---|---|---|---|
| | C (μF) | DF (%) | LC (μA · 10 V value) | Z (Ω) |
| Example 9 | 10.2 | 0.83 | 0.08 | 0.070 |
| Example 10 | 9.3 | 0.95 | 0.09 | 0.080 |
| Example 11 | 9.9 | 0.90 | 0.09 | 0.060 |
| Example 12 | 9.3 | 0.92 | 0.07 | 0.075 |
| Example 13 | 9.9 | 0.88 | 0.09 | 0.050 |
| Comparative Example 6 | 6.2 | 2.54 | 10.30 | 0.99 |
| Comparative Example 7 | 3.5 | 2.45 | 9.35 | 0.72 |

Property Test 2:

The every 10 capacitors manufactured according to the production methods of Examples 9 to 13, Comparative Examples 6 and 7 were subjected to reflow tests by passing a region at a tempreature of 230° C. for 30 seconds and compared on the properties between before and after the reflow processing. The results obtained are shown in Table 6.

TABLE 6

Results of Test on Reflow Heat Resistance
(number of products accepted per 10 devices)

| | Before Reflow Processing | After Reflow Processing |
|---|---|---|
| Device produced in Example 9 | 10 | 9 |
| Device produced in Example 10 | 10 | 8 |
| Device produced in Example 11 | 10 | 10 |
| Device produced in Example 12 | 10 | 8 |
| Device produced in Example 13 | 10 | 10 |
| Device produced in Comparative Example 6 | 2 | 0 |
| Device produced in Comparative Example 7 | 3 | 0 |

REFERENCE EXAMPLE 2

A 1,3-dihydroisothianaphthene-2-oxide monomer was polymerized in the presence of sulfuric acid at room temperature according to the method described in *J. Org. Chem.*, Vol. 49, pp. 3382 (1984) and the polymer obtained was measured on the electric conductivity. The electric conductivity was as low as 0.5 S/cm and the polymer was not preferable for the solid electrolyte of a capacitor.

EXAMPLE 14

A formed aluminum foil was subjected to forming at 13 V in an aqueous 10 wt % ammonium adipate solution to prepare a dielectric material thereon. The surface of this dielectric material was impregnated with an aqueous solution prepared to have an ammonium persulfate (hereinafter simply referred to as "APS") concentration of 20 wt % and a sodium 1-naphthalenesulfonate concentration of 0.1 wt %, and then the dielectric material was dipped in an isopropanol (hereinafter simply referred to as "IPA") solution having dissolved therein 5 g of 3,4-dioxyethylene-thiophene. The resulting substrate was left standing in an environment at 60° C. for 10 minutes, thereby completing the oxidation polymerization, and then washed with water. This polymerization reaction and washing process each was repeated 10 times. The polymer composition was reduced by hydrazine in a water/IPA solvent and then carefully extracted with the solvent and the contents of sulfate ion and 1-naphthalenesulfonate ion in the polymer composition were determined by ion chromatography method. As a result, the sulfate ion content was 1.3 wt % and the 1-naphthalenesulfonate ion content was 33 wt %, based on the dry weight of the polymer composition.

Thereafter, an aluminum foil having accumulated thereon the polythiophene polymer composition was treated in an aqueous 10 wt % ammonium adipate solution and then examined on the sparking voltage. The test was performed 5 times (n=5) in an environment of 50° C. under the conditions of a current density of 10 mA/cm$^2$. The results obtained are shown in Table 7. Subsequently, the aluminum core part was welded with a plus side lead terminal for collecting the current from the anode and on the other hand, connected to the minus side lead terminal through carbon paste and silver paste for collecting the current from the cathode. These elements were sealed by an epoxy resin to manufacture a capacitor device. The capacitor device manufactured was aged at 125° C. for 2 hours and then determined on the initial characteristics. The results obtained are shown together in Table 8. These were each measured at 120 Hz. The impedance (Z) is shown by a value at a resonance frequency. LC (leakage current) was measured one minute after application of a rated voltage. The measured values each is an average of 30 samples. With respect to LC, those having an LC of 1 μA or more are judged as a shorted product (defective) and the average LC is calculated exclusive of the defective units.

EXAMPLE 15

A capacitor device was prepared and evaluated in the same manner as in Example 14 except for using potassium persulfate in place of APS used in Example 14 and preparing a solution having a potassium sulfate concentration of 10 wt % and a sodium 1-naphthalenesulfonate concentration of 0.1 wt %. The results obtained are shown in Tables 7 and 8. The contents of sulfate ion and 1-naphthalenesulfonate ion in the polymer composition were determined by the method described in Example 14 and it was found that the sulfate ion content was 2.1 wt % and the 1-naphthalenesulfonate ion content was 29.5 wt %.

EXAMPLE 16

A capacitor device was prepared and evaluated in the same manner as in Example 14 except for preparing a solution by changing the concentration of APS used in Example 14 from 20 wt % to 35 wt % and the concentration of sodium 1-naphthalenesulfonate from 0.1 wt % to 0.04 wt %. The results obtained are shown in Tables 7 and 8. The contents of sulfate ion and 1-naphthalenesulfonate ion in the polymer composition were determined by the method described in Example 14 and it was found that the sulfate ion content was 4.7 wt % and the 1-naphthalenesulfonate ion content was 9.5 wt %.

COMPARATIVE EXAMPLE 8

A capacitor device was prepared and evaluated in the same manner as in Example 14 except for using ferric sulfate in place of APS used in Example 14 and preparing a solution having a ferric sulfate concentration of 10 wt % and a sodium 1-naphthalenesulfonate concentration of 0.1 wt %. The results obtained are shown in Tables 7 and 8. The contents of sulfate ion and 1-naphthalenesulfonate ion in the polymer composition were determined by the method described in Example 14 and it was found that the sulfate ion content was 20.5 wt % and the 1-naphthalenesulfonate ion content was 36.8 wt %. Since 8 wt % of iron ion (ferric and ferrous ions) was also present and the sulfate ion content exceeded 10 wt %, the capacitor had poor properties.

COMPARATIVE EXAMPLE 9

A capacitor device was prepared and evaluated in the same manner as in Example 14 except for using ferric chloride in place of APS used in Example 14 and preparing a solution having a ferric chloride concentration of 10 wt % and a sodium 1-naphthalenesulfonate concentration of 0.1 wt %. The results obtained are shown in Tables 7 and 8. The content of 1-naphthalenesulfonate ion in the polymer composition was determined by the method described in Example 14 and found to be 4.5 wt %. Since sulfate ion was not used in combination, the capacitor had poor properties.

COMPARATIVE EXAMPLE 10

A process for manufacturing a capacitor device was performed under the same conditions as in Example 14 except for using thiophene in place of 3,4-dioxyethylenethiophene used in Example 14. However, black blue polythiophene polymer was not produced at all and thus, polymerization of thiophene was not caused by the action of APS. In other words, occurrence of the oxidation polymerization of a thiophene by APS was peculiar to 3,4-dioxyethylene group-substituted thiophenes.

TABLE 7

Sparking Voltage (unit: V, n = 5)

| Number of Reaction Times | Example 14 | Example 15 | Example 16 | Comparative Example 8 | Comparative Example 9 |
|---|---|---|---|---|---|
| 1 |  |  |  | 29 | 25 |
| 2 | 32 | 35 | 32 | 25 | 20 |
| 3 |  |  |  | 22 | 16 |
| 4 | 29 | 31 | 28 | 21 | 2 |
| 5 |  |  |  | 9 |  |
| 6 | 29 | 30 | 28 | 3 |  |
| 8 | 28 | 29 | 28 |  |  |
| 10 | 28 | 29 | 28 |  |  |

TABLE 8

Initial Characteristics

| | C (μF) | DF (%) | Z (mΩ) | LC (μA) | Ratio of Defective/Sample (units/units) | Number of Short Circuit |
|---|---|---|---|---|---|---|
| Example 14 | 5.3 | 0.8 | 15 | 0.03 | 0/30 | 0 |
| Example 15 | 5.0 | 0.9 | 21 | 0.04 | 2/30 | 0 |
| Example 16 | 5.2 | 0.7 | 23 | 0.06 | 1/30 | 0 |
| Comparative Example 8 | 4.7 | 1.8 | 65 | 0.03 | 16/30 | 9 |
| Comparative Example 9 | 4.0 | 3.4 | 355 | 0.45 | 28/30 | 17 |

As being apparent from Table. 7, in the sparking voltage test of Examples 14 to 16, although the voltage was greatly reduced at the initial stage, the sparking voltage at the completion of the reaction was 27 V or more in each Example. In Comparative Example 8 using ferric sulfate, the sparking voltage was largely reduced due to remaining of iron ion (ferric and ferrous ions) in a concentration as high as 8 wt % and the sparking voltage could not withstand until the prescribed reaction was completed. As a result, the solid electrolyte was insufficiently filled and this was disadvantageous.

EXAMPLE 17

A formed aluminum foil processed to have a prescribed area was subjected to forming at 13 V in an aqueous 10 wt % ammonium adipate solution to prepare a dielectric material on the aluminum foil. The surface of this dielectric material was impregnated with an aqueous solution prepared to have an APS concentration of 20 wt % and a sodium anthraquinone-2-sulfonate concentration of 0.1 wt %, and then the dielectric foil was dipped in 1.2 mol/l of an IPA solution having dissolved therein 5 g of 3,4-dioxyethylenethiophene. The resulting substrate was taken out and left standing in an environment at 60° C. for 10 minutes, thereby completing the oxidative polymerization, and then the substrate was washed with water. This polymerization reaction and washing process each was repeated times. The polymer composition was reduced by hydrazine in a water/IPA solvent and then carefully extracted and the contents of sulfate ion and anthraquinone-2-sulfonate ion in the polymer composition were determined by ion chromatography method. As a result, the sulfate ion content was 1.1 wt % and the anthraquinone-2-sulfonate ion content was 34 wt %, based on the dry weight of the polymer composition. The solid electrolyte layer had an electric conductivity of 75 S/cm.

Thereafter, an aluminum foil having deposited thereon the polythiophene composition was treated in an aqueous 10 wt % ammonium adipate solution and then examined on the sparking voltage. The test was performed by increasing the number of devices (the same in the following Examples) so as to attain distinguished comparison of the device properties, namely, in an environment of 50° C. under the conditions of a current density of 10 mA/cm² in n=5 times. The results obtained are shown in Table 9. Subsequently, the aluminum core part was welded with a plus side lead terminal for collecting the current from the anode and on the other hand, connected to the minus side lead terminal through carbon paste and silver paste for collecting the current from the cathode. These elements were finally sealed by an epoxy resin to manufacture a capacitor device. The capacitor device manufactured was aged at 125° C. for 2 hours and then subjected to the initial evaluation. The results obtained are shown together in Table 10. In the Table, C in the column of initial characteristics indicates a capacitance and DF indicates a tangent of the loss angle (tan δ). These were each measured at 120 Hz. The impedance is shown by a value at a resonance frequency. LC (leakage current) was measured one minute after applying a rated voltage. The measured values each is an average of 30 samples. With respect to LC, those having an LC of 1 μA or more are judged as a defective and those having an LC of 10 μA or more are judged as a shorted product. The average LC is calculated exclusive of the defective units.

EXAMPLE 18

A formed aluminum foil processed to have a prescribed area was subjected to forming at 13 V in an aqueous 10 wt % ammonium adipate solution to prepare a dielectric material. The surface of this dielectric material was impregnated with an aqueous solution prepared to have an APS concentration of 20 wt % and then dipped in an IPA/water mixed solution prepared by adding ammonium anthraquinone-2,6-disulfonate to 1.2 mol/l of an IPA solution having dissolved therein 5 g of 3,4-dioxyethylenethiophene to have an ammonium anthraquinone-2,6-disulfonate concentration of 0.1 wt %. The resulting substrate was taken out and left standing in an environment at 60° C. for 10 minutes, thereby completing the oxidative polymerization, and then the substrate was washed with water. This polymerization reaction and washing process each was repeated 10 times. The capacitor device obtained was evaluated. The results obtained are shown in Tables 9 and 10. The contents of sulfate ion and anthraquinone-2,6-disulfonate ion in the polymer composition were determined by the method described in Example 17. As a result, the sulfate ion content was 1.3 wt % and the anthraquinone-2,6-disulfonate ion content was 31 wt %. The solid electrolyte layer had an electric conductivity of 80 S/cm.

EXAMPLE 19

A formed aluminum foil processed to have a prescribed area was subjected to forming at 13 V in an aqueous 10 wt % ammonium adipate solution to prepare a dielectric material. This dielectric material was dipped in 1.2 mol/l of an IPA solution having dissolved therein 5 g of 3,4-dioxyethylene-thiophene and then dipped in an aqueous solution prepared to have an APS concentration of 20 wt % and a sodium 1,4-naphthoquinone-2-sulfonate concentration of 0.1 wt %. The resulting substrate was taken out and left standing in an environment at 60° C. for 10 minutes, thereby completing the oxidative polymerization, and then the substrate was washed with water. This polymerization reaction and washing process each was repeated 10 times. The capacitor device obtained was evaluated and the results obtained are shown in Tables 9 and 10. The contents of sulfate ion and 1,4-naphthoquinone-2-sulfonate ion in the polymer composition were determined by the method described in Example 17. As a result, the sulfate ion content was 1.0 wt % and the 1,4-naphthoquinone-2-sulfonate ion content was 28 wt %. The solid electrolyte layer had an electric conductivity of 68 S/cm.

EXAMPLE 20

A formed aluminum foil processed to have a prescribed area was subjected to forming at 13 V in an aqueous 10 wt % ammonium adipate solution to prepare a dielectric material. The surface of this dielectric material was impregnated with an aqueous solution prepared to have a potassium persulfate concentration of 10 wt % and a sodium anthraquinone-2-sulfonate concentration of 0.1 wt % and then dipped in 1.2 mol/l of an IPA solution having dissolved therein 5 g of 3,4-dioxyethylene-thiophene. The resulting substrate was taken out and left standing in an environment at 60° C. for 10 minutes, thereby completing the oxidative polymerization. This polymerization reaction comprising the above process was repeated 10 times and then the substrate was washed with water and dried. The capacitor device obtained was evaluated and the results obtained are shown in Tables 9 and 10. The contents of sulfate ion and anthraquinonesulfonate ion in the polymer composition were determined by the method described in Example 17. As a result, the sulfate ion content was 2.0 wt % and the anthraquinone-2-sulfonate ion content was 30.0 wt %. The solid electrolyte layer had an electric conductivity of 69 S/cm.

EXAMPLE 21

A formed aluminum foil processed to have a prescribed area was subjected to forming at 13 V in an aqueous 10 wt % ammonium adipate solution to prepare a dielectric material. The surface of this dielectric material was impregnated with an aqueous solution prepared to have an APS concentration of 35 wt % and then dipped in an IPA/water mixed solution having an ammonium anthraquinone-2,6-disulfonate concentration of 0.04 wt % prepared by adding ammonium anthraquinone-2,6-disulfonate to an IPA solution of 1.2 mol/l having dissolved therein 5 g of 3,4-dioxyethylene-thiophene. The resulting substrate was taken out and left standing in an environment at 60° C. for 10 minutes, thereby completing the oxidative polymerization. This polymerization reaction comprising the above process was repeated 10 times and then the substrate was washed with water and dried. The capacitor device obtained was evaluated and the results obtained are shown in Tables 9 and 10. The contents of sulfate ion and anthraquinone-2,6-disulfonate ion in the polymer composition were determined by the method described in Example 17. As a result, the sulfate ion content was 4.5 wt % and the anthraquinone-2,6-disulfonate ion content was 9.2 wt %. The solid electrolyte layer had an electric conductivity of 50 S/cm.

EXAMPLE 22

A formed aluminum foil was processed to have a prescribed area and then subjected to forming at 13 V in an aqueous 10 wt % ammonium adipate solution to prepare a dielectric material. This dielectric material was dipped in a degassed IPA solution of 5,6-dimethoxy-isothianaphthene synthesized and produced by sublimation according to the method described in JP-A-2-242816 wherein the concentration of the compound was 1.2 mol/l and then dipped in 20 wt % of aqueous APS solution of sodium 3-methyl-2-anthraquinolylmethanesulfonate synthesized according to the method described in *Tetrahedron*, Vol. 35, No. 19, page 2263 (1979) wherein the concentration of the sodium 3-methyl-2-anthraquinolylmethanesulfonate was adjusted to be 0.1 wt % in the aqueous solution. The resulting substrate was taken out and left standing in an environment at 60° C. for 10 minutes, thereby completing the oxidative polymerization. This polymerization reaction comprising the above process was repeated 10 times and then the substrate was washed with water and dried. The capacitor device obtained was evaluated and the results obtained are shown in Tables 9 and 10. The contents of sulfate ion and 3-methyl-2-anthraquinolylmethanesulfonate ion in the polymer composition were determined by the method described in Example 17. As a result, the sulfate ion content was 0.5 wt % and the 3-methyl-2-anthraquinolylmethanesulfonate ion content was 4.8 wt %. The solid electrolyte layer had an electric conductivity of 40 S/cm.

EXAMPLE 23

A capacitor device was prepared and evaluated in the same manner as in Example 17 except for using a solution of pyrrole-N-methyl prepared to have the same concentration in place of 3,4-dioxyethylene-thiophene used in Example 1. The results obtained are shown in Tables 9 and 10. The contents of sulfate ion and anthraquinone-2-sulfonate ion in the polymer composition were determined by the method described in Example 17. As a result, the sulfate ion content was 7.5 wt % and the anthraquinone-2-sulfonate ion content was 20.3 wt %. The solid electrolyte had an electric conductivity of 8 S/cm.

EXAMPLE 24

A formed aluminum foil was processed to have a prescribed area and then subjected to forming at 13 V in an aqueous 10 wt % ammonium adipate solution to prepare a dielectric material. This dielectric material was dipped in a 30% DMF-IPA solution prepared to have a sodium anthraquinone-2-sulfonate concentration of 0.1 wt % and a 3,4-dioxyethylene-thiophene concentration of 1.2 mol/l and then dipped in a 20 wt % aqueous APS solution. The resulting substrate was taken out and left standing in an environment at 60° C. for 10 minutes, thereby completing the oxidative polymerization. These dipping processes each was repeated 10 times and then the substrate was washed with water and dried. The capacitor device obtained was evaluated and the results obtained are shown in Tables 9 and 10. The sulfate ion content was 1.2 wt % and the anthraquinone-2-sulfonate ion content was 37 wt %, based on the dry weight of the polymer composition. The solid electrolyte layer had an electric conductivity of 80 S/cm.

REFERENCE EXAMPLE 3

A process for manufacturing a capacitor device was performed under the same conditions as in Example 17 except for using thiophene in place of 3,4-dioxyethylene-thiophene used in Example 17. However, black blue polythiophene was not produced at all and thus, polymerization of thiophene was not caused by the action of APS. In other words, occurrence of the oxidation polymerization of a thiophene by APS was peculiar to 3,4-dioxy group-substituted thiophenes.

COMPARATIVE EXAMPLE 10

A formed dielectric material was prepared in the same manner as in Example 17 and the dielectric material obtained was dipped in a 12% IPA solution of ferric anthraquinone-2-sulfonate and then dipped in 1.2 mol/l of an IPA solution having dissolved therein 5 g of 3,4-dioxyethylene-thiophene. The resulting substrate was left standing in an environment at 60° C. for 10 minutes, thereby completing the oxidative polymerization, and then the substrate was washed with water. This polymerization reaction and washing process each was repeated 10 times. The polymer composition was reduced by hydrazine in a water/IPA solvent and then carefully extracted and the content of anthraquinone-2-sulfonate ion in the polymer composition was determined by ion chromatography method. As a result, the anthraquinone-2-sulfonate ion content was 25 wt % based on the dry weight of the polymer composition. The solid electrolyte layer had an electric conductivity of 30 S/cm. Thereafter, a capacitor device was manufactured and examined on the sparking voltage and other capacitor properties in the same manner as in Example 17. The results obtained are shown in Tables 9 and 10.

COMPARATIVE EXAMPLE 11

A capacitor device was prepared and evaluated in the same manner as in Example 17 except for changing the concentration of APS used in Example 17 from 20 wt % to 12 wt %. The results obtained are shown in Tables 9 and 10. The contents of sulfate ion and anthraquinone-2-sulfonate ion in the polymer composition were determined by the method described in Example 17. As a result, the sulfate ion content was 0.09 wt % and the anthraquinone-2,6-disulfonate ion content was 32 wt %. The solid electrolyte had an electric conductivity of 40 S/cm.

COMPARATIVE EXAMPLE 12

A capacitor device was prepared and evaluated in the same manner as in Example 17 except for using a solution prepared to have a ferric sulfate concentration of 10 wt % and a sodium anthraquinone-2-sulfonate concentration of 0.1 wt % in place of APS used in Example 17. The results obtained are shown in Tables 9 and 10. The contents of sulfate ion and anthraquinone-2-sulfonate ion in the polymer composition were determined by the method described in Example 17. As a result, the sulfate ion content was 20.0 wt % and the anthraquinonesulfonate ion content was 37.8 wt %. In the polymer composition, 8 wt % of iron ion (ferric and ferrous) was present and the sulfate ion content exceeded 10 wt %, as a result, the capacitor exhibited poor properties.

COMPARATIVE EXAMPLE 13

A capacitor device was prepared and evaluated in the same manner as in Example 17 except for using thiophene in place of 3,4-dioxyethylene-thiophene used in Example 17 and preparing a solution to have a concentration of ferric chloride used in place of APS, of 10 wt % and a sodium anthraquinone-2-sulfonate concentration of 0.1 wt %. The results obtained are shown in Tables 9 and 10. The anthraquinone-2-sulfonate ion content in the polymer composition was determined by the method described in Example 17 and found to be 4.2 wt %. Since sulfate ion was not used in combination, the capacitor exhibited poor properties.

TABLE 9

Sparking Voltage (unit: V, n = 5)

Number of Reaction Times

| | 1 | 2 | 3 | 4 | 5 | 6 | 8 | 10 |
|---|---|---|---|---|---|---|---|---|
| Example 17 | 19 | 19 | 19 | 19 | 19 | 19 | 19 | 19 |
| Example 18 | 19 | 19 | 19 | 19 | 19 | 19 | 19 | 19 |
| Example 19 | 19 | 19 | 19 | 19 | 19 | 19 | 19 | 19 |
| Example 20 | 19 | 19 | 19 | 18 | 17 | 15 | 13 | 10 |
| Example 21 | 19 | 19 | 19 | 19 | 19 | 19 | 19 | 19 |
| Example 22 | 19 | 19 | 19 | 19 | 19 | 19 | 19 | 19 |
| Example 23 | 19 | 19 | 19 | 19 | 19 | 19 | 19 | 19 |
| Example 24 | 19 | 19 | 19 | 19 | 19 | 19 | 19 | 19 |
| Comparative Example 10 | 19 | 16 | 13 | 5 | 2 | | | |
| Comparative Example 11 | 19 | 19 | 19 | 19 | 19 | 19 | 19 | 19 |
| Comparative Example 12 | 19 | 17 | 13 | 3 | | | | |
| Comparative Example 13 | 18 | 15 | 11 | 3 | | | | |

TABLE 10

Initial Characteristics

| | C (µF) | DF (%) | Z (mΩ) | LC (µA) | Ratio of Defective/Sample (units/units) | Short Circuit |
|---|---|---|---|---|---|---|
| Example 17 | 8.0 | 0.7 | 60 | 0.02 | 0/30 | 0 |
| Example 18 | 8.2 | 0.7 | 60 | 0.02 | 0/30 | 0 |
| Example 19 | 7.5 | 0.8 | 60 | 0.03 | 0/30 | 0 |
| Example 20 | 7.0 | 0.8 | 60 | 0.04 | 1/30 | 0 |
| Example 21 | 6.9 | 0.9 | 60 | 0.05 | 1/30 | 0 |
| Example 22 | 6.8 | 0.8 | 60 | 0.05 | 1/30 | 0 |
| Example 23 | 4.1 | 1.2 | 60 | 0.09 | 1/30 | 0 |
| Example 24 | 8.1 | 0.7 | 60 | 0.02 | 1/30 | 0 |
| Comparative Example 10 | 7.1 | 1.2 | 60 | 0.15 | 10/30 | 8 |
| Comparative Example 11 | 7.0 | 0.7 | 60 | 0.09 | 1/30 | 0 |
| Comparative Example 12 | 6.1 | 3.2 | 83 | 0.40 | 15/30 | 10 |
| Comparative Example 13 | 5.9 | 3.3 | 90 | 0.43 | 27/30 | 18 |

As will be apparent from Table 9, in the sparking voltage test of Examples 17 to 24, substantially no decrease in voltage was observed at the initial stage, the sparking voltage at the completion of the reaction was 19 V or less in each Example. In Comparative Example 12 using ferric sulfate, the sparing voltage was largely reduced due to remaining of iron ion (ferric and ferrous ions) in a concentration as high as 8 wt % and the sparking voltage could not withstand until the prescribed reaction was completed. As a result, the solid electrolyte was insufficiently filled and this was disadvantageous.

EXAMPLE 25

A formed aluminum foil processed to have a prescribed area was subjected to forming at 13 V in an aqueous 10 wt % ammonium adipate solution to prepare a dielectric material on the aluminum foil. The surface of this dielectric material was impregnated with an aqueous solution prepared to have an ammonium persulfate concentration of 20 wt % and a sodium anthracene-2-sulfonate (manufactured by Salor Co.) concentration of 0.3 wt %, and then the dielectric foil was dipped in 1.2 mol/l of IPA solution having dissolved therein 5 g of 3,4-dioxyethylene-thiophene. The resulting substrate was taken out and left standing in an environment at 60° C. for 10 minutes, thereby completing the oxidative polymerization, and then the substrate was washed with water. This polymerization reaction and washing process each was repeated times. The polymer composition was reduced by hydrazine in a water/IPA solvent and then carefully extracted and the contents of sulfate ion and anthracene-2-sulfonate ion in the polymer composition were determined by ion chromatography method. As a result, the sulfate ion content was 1.7 mol % and the anthracene-2-sulfonate ion content was 14.6 mol %, based on the dry weight of the polymer composition. The solid electrolyte layer had an electric conductivity of 70 S/cm.

Thereafter, an aluminum foil having deposited thereon the polythiophene composition was treated in an aqueous 10 wt % ammonium adipate solution and then examined on the sparking voltage. The test was performed by increasing the number of devices (the same in the following Examples) so as to attain distinguished comparison of the device properties, namely, in an environment of 50° C. under the conditions of a current density of 10 mA/cm$^2$ in n=5 times. The results obtained are shown in Table 11. Subsequently, the aluminum core part was welded with a plus side lead terminal for collecting the current from the anode and on the other hand, connected to the minus side lead terminal through carbon paste and silver paste for collecting the current from the cathode. These elements were finally sealed by an epoxy resin to manufacture a capacitor device. The capacitor device manufactured was aged at 125° C. for 2 hours and then subjected to the initial evaluation. The results obtained are shown together in Table 12. In the Table, C in the column of initial characteristics indicates a capacitance and DF indicates a tangent of the loss angle (tan δ). These were each measured at 120 Hz. The impedance is shown by a value at a resonance frequency. LC (leakage current) was measured one minute after applying a rated voltage. The measured values each is an average of 30 samples. With respect to LC, those having an LC of 1 µA or more are judged as a defective and those having an LC of 10 µA or more are judged as a shorted product. The average LC is calculated exclusive of the defective units.

EXAMPLE 26

A dielectric material was prepared by the method described in Example 25 and the surface of the dielectric material was impregnated with an aqueous solution prepared to have an APS concentration of 20 wt % and then dipped in an IPA/water mixed solution prepared by adding tetrabutylammonium 9,10-dimethoxy-anthracene-2-sulfonate (hereafter, abbreviated as DMASTB) to 1.2 mol/l of an IPA solution having dissolved therein 5 g of 3,4-dioxyethylene-thiophene to have a DMASTB concentration of 0.1 wt %. The above-mentioned DMASTB salt used was prepared by mixing sodium 9,10-dimethoxy-anthracene-2-sulfonate (manufactured by Aldrich Co.) with tetrabutylammonium bromide and recrystallizing the reaction product. The resulting substrate was left standing in an environment at 60° C. for 10 minutes, thereby completing the oxidation polymerization, and then washed with water. This polymerization reaction and washing process each was repeated 10 times. The capacitor device obtained was evaluated. The results obtained are shown in Tables 11 and 12. The contents of sulfate ion and 9,10-dimethoxy-anthracene-2-sulfonate ion in the polymer composition were determined by the method described in Example 25. As a result, the sulfate ion content was 1.8 mol % and the 9,10-dimethoxy-anthracene-2-sulfonate ion content was 8.1 mol %. The solid electrolyte layer had an electric conductivity of 60 S/cm.

EXAMPLE 27

A dielectric material prepared by the method described in Example 25 was dipped in an IPA solution having dissolved therein 5 g of 3,4-dioxyethylene-thiophene and then impregnated with an aqueous solution prepared to have an APS concentration of 20 wt % and a sodium 9,10-dimethoxy-anthracene-2-sulfonate concentration of 0.1%. The resulting substrate was left standing in an environment at 60° C. for 10 minutes, thereby completing the oxidation polymerization, and then washed with water. This polymerization reaction and washing process each was repeated 10 times. The capacitor device obtained was evaluated. The results obtained are shown in Tables 11 and 12. The contents of sulfate ion and 9,10-dimethoxy-anthracene-2-sulfonate ion in the polymer composition were determined by the method described in Example 25. As a result, the sulfate ion content was 2.2 mol % and the 9,10-dimethoxy-anthracene-2-sulfonate ion content was 0.6 mol %. The solid electrolyte layer had an electric conductivity of 65 S/cm.

EXAMPLE 28

A dielectric material prepared by the method described in Example 25 was impregnated with an aqueous solution prepared to have a potassium persulfate concentration of 10 wt % and a sodium anthracene-1-sulfonate concentration of 0.1% and then dipped in 1.2 mol/l of an IPA solution having dissolved therein 5 g of 3,4-dioxyethylene-thiophene The resulting substrate was left standing in an environment at 60° C. for 10 minutes, thereby completing the oxidation polymerization, and then washed with water. This dipping process was repeated 10 times and then the substrate was washed with water and dried. The capacitor device obtained was evaluated. The results obtained are shown in Tables 11 and 12. The contents of sulfate ion and anthracene-1-sulfonate ion in the polymer composition were determined by the method described in Example 1. As a result, the sulfate ion content was 5.8 mol % and the anthracene-2-sulfonate ion content was 15 mol %. The solid electrolyte layer had an electric conductivity of 75 S/cm.

EXAMPLE 29

A dielectric material was prepared by the method described in Example 25 and the surface of the dielectric material was impregnated with an aqueous solution prepared to have an APS concentration of 35 wt % and then dipped in an IPA/water mixed solution prepared by adding tetrabutylammonium 9,10-dihexyl-anthracene-2-sulfonate (DHASTB) to 1.2 mol/l of an IPA solution having dissolved therein 5 g of 3,4-dioxyethylene-thiophene to have a DMASTB concentration of 0.04 wt %. The above-mentioned DHASTB salt used was prepared from sodium 9,10-dimethoxy-anthracene-2-sulfonate (manufactured by Aldrich Co.) by the following method. That is, sodium 9,10-dimethoxy-anthracene-2-sulfonate was reacted with thionyl chloride in an anhydrous dimethylformamide solvent to prepare a sulfonyl chloride form, which was then reacted with methanol to obtain methyl sulfonate form. Thereafter, the dimethoxy group was split with aluminum iodide to synthesize methyl 9,10-dihydro-anthracene-2-sulfonate. Then, in the presence of potassium carbonate, this was reacted with hexyl bromide, followed by treatment with alkali to obtain sodium 9,10-dihexyloxy-anthracene-2-sulfonate. Further, this was reacted with tetrabutylammonium bromide in an aqueous solution to synthesize DHASTB salt. For the evaluation of a capacitor device, recrystallized product was used.

The resulting substrate was left standing in an environment at 60° C. for 10 minutes, thereby completing the oxidation polymerization, and then washed with water. This dipping process was repeated 10 times and then the substrate was washed with water and dried. Then, the capacitor device obtained was evaluated. The results obtained are shown in Tables 11 and 12. The contents of sulfate ion and 9,10-dihexyloxy-anthracene-2-sulfonate ion in the polymer composition were determined by the method described in Example 25. As a result, the sulfate ion content was 6.2 mol % and the 9,10-dihexyloxy-anthracene-2-sulfonate ion content was 7.6 mol %. The solid electrolyte layer had an electric conductivity of 42 S/cm.

EXAMPLE 30

A dielectric material prepared by the method described in Example 25 was dipped in an deaerated IPA solution (1.2 mol/l concentration) of 5,6-dimethoxy-isothianaphthene synthesized and purified by sublimation according to the method described in JP-A-2-242816 and then impregnated with an aqueous solution prepared to have an APS concentration of 20 wt % and a sodium anthracene-1-sulfonate concentration of 0.1%. The resulting substrate was taken out and left standing in an environment at 60° C. for 10 minutes, thereby completing the oxidation polymerization. This dipping process was repeated 10 times and then the substrate was washed with water and dried. The capacitor device obtained was evaluated. The results obtained are shown in Tables 11 and 12. The contents of sulfate ion and anthracene-1-sulfonate ion in the polymer composition were determined by the method described in Example 25. As a result, the sulfate ion content was 0.8 mol % and the anthracene-1-sulfonate ion content was 5.6 mol %. The solid electrolyte layer had an electric conductivity of 30 S/cm.

EXAMPLE 31

A capacitor device was manufactured through the same process as described in Example 25 except for using the same concentration of pyrrole-N-methyl in place of 3,4-dioxyethylene-thiophene used in Example 25 and the capacitor device was evaluated. The results obtained are shown in Tables 11 and 12. The contents of sulfate ion and anthracene-2-sulfonate ion in the polymer composition were determined by the method described in Example 25. As a result, the sulfate ion content was 6.9 mol % and the anthracene-2-sulfonate ion content was 15.8 mol %. The solid electrolyte layer had an electric conductivity of 5 S/cm.

EXAMPLE 32

A formed aluminum foil processed to have a prescribed area was subjected to forming at 13 V in an aqueous 10 wt % ammonium adipate solution to prepare a dielectric material on the aluminum foil. The surface of this dielectric material was impregnated with a 30 wt % DMF-IPA solution prepared to have a sodium anthracene-2-sulfonate concentration of 0.1 wt % and a 3,4-dioxyethylene-thiophene concentration of 1.2 mol/l, and then the dielectric foil was dipped in an aqueous 20 wt % APS solution. The resulting substrate was taken out and left standing in an environment at 60° C. for 10 minutes, thereby completing the oxidative polymerization, and then the substrate was washed with water. This dipping process was repeated 10 times and then the substrate was washed with water and dried. The capacitor device obtained was evaluated. The results obtained are shown in Tables 11 and 12. As a result, the sulfate ion content was 1.7 mol % and the anthracene-2-sulfonate ion content was 32 mol % based on the total repeating units of the polymer. The solid electrolyte layer had an electric conductivity of 75 S/cm.

REFERENCE EXAMPLE 4

A process for manufacturing a capacitor device was performed under the same conditions as in Example 25 except for using thiophene in place of 3,4-dioxyethylene-thiophene used in Example 25. However, black blue polythiophene was not produced at all and thus, polymerization of thiophene was not caused by the action of APS. In other words, occurrence of the oxidation polymerization of a thiophene by APS was peculiar to 3,4-dioxy-ethylene group-substituted thiophenes.

COMPARATIVE EXAMPLE 14

A formed dielectric material was prepared in the same manner as in Example 25 and the dielectric material obtained was dipped in a 12% IPA solution of ferric anthracene-2-sulfonate and then dipped in 1.2 mol/l of an IPA solution having dissolved therein 5 g of 3,4-dioxyethylene-thiophene. The resulting substrate was left standing in an environment at 60° C. for 10 minutes, thereby completing the oxidative polymerization, and then the substrate was washed with water. This polymerization reaction and washing process each was repeated 10 times. The polymer composition was reduced by hydrazine in a water/IPA solvent and then carefully extracted and the content of anthracene-2-sulfonate ion in the polymer composition was determined by ion chromatography method. As a result, the anthraquinone-2-sulfonate ion content was 16 mol % based on the total repeating units of the polymer of the polymer composition. The solid electrolyte layer had an electric conductivity of 32 S/cm. Thereafter, a capacitor device was manufactured and examined on the sparking voltage and other capacitor properties in the same manner as in Example 25. The results obtained are shown in Tables 11 and 12.

COMPARATIVE EXAMPLE 15

A capacitor device was prepared and evaluated in the same manner as in Example 25 except for changing the concentration of APS used in Example 25 from 20 wt % to 12 wt %. The results obtained are shown in Tables 11 and 12. The contents of sulfate ion and anthracene-2-sulfonate ion in the polymer composition were determined by the method described in Example 25. As a result, the sulfate ion content was 0.15 mol % and the anthracene-2-sulfonate ion content was 27 mol %. The solid electrolyte had an electric conductivity of 36 S/cm.

COMPARATIVE EXAMPLE 16

A capacitor device was prepared and evaluated in the same manner as in Example 25 except for using a solution prepared to have a ferric sulfate concentration of 10 wt % and a sodium anthracene-2-sulfonate concentration of 0.1 wt % in place of APS used in Example 25. The results obtained are shown in Tables 11 and 12. The contents of sulfate ion and anthracene-2-sulfonate ion in the polymer composition were determined by the method described in Example 25. As a result, the sulfate ion content was 23.6 mol % and the anthracenesulfonate ion content was 33.8 mol %. In the polymer composition, 8 wt % of iron ion (ferric and ferrous) was present and the sulfate ion content exceeded 10 wt % and as a result the capacitor exhibited poor properties.

COMPARATIVE EXAMPLE 17

A capacitor device was prepared and evaluated in the same manner as in Example 25 except for using thiophene in place of 3,4-dioxyethylene-thiophene used in Example 25 and preparing a solution to have a concentration of ferric chloride used in place of APS, of 10 wt % and a sodium anthracene-2-sulfonate concentration of 0.1 wt %. The results obtained are shown in Tables 11 and 12. The anthracene-2-sulfonate ion content in the polymer composition was determined by the method described in Example 25 and found to be 2.9 mol %. Since sulfate ion was not used in combination, the capacitor exhibited poor properties.

TABLE 11

Sparking Voltage (unit: V, n = 5)

| | Number of Reaction Times | | | | | | | |
|---|---|---|---|---|---|---|---|---|
| | 1 | 2 | 3 | 4 | 5 | 6 | 8 | 10 |
| Example 25 | 19 | 19 | 19 | 19 | 19 | 19 | 19 | 19 |
| Example 26 | 19 | 19 | 19 | 19 | 19 | 19 | 19 | 19 |
| Example 27 | 19 | 19 | 19 | 19 | 19 | 19 | 19 | 19 |
| Example 28 | 19 | 19 | 19 | 18 | 17 | 16 | 14 | 10 |
| Example 29 | 19 | 19 | 19 | 19 | 19 | 19 | 19 | 19 |
| Example 30 | 19 | 19 | 19 | 19 | 19 | 19 | 19 | 19 |
| Example 31 | 19 | 19 | 19 | 19 | 19 | 19 | 19 | 19 |
| Example 32 | 19 | 19 | 19 | 19 | 19 | 19 | 19 | 19 |
| Comparative Example 14 | 19 | 16 | 12 | 6 | 3 | | | |
| Comparative Example 15 | 19 | 19 | 19 | 19 | 19 | 19 | 19 | 19 |
| Comparative Example 16 | 19 | 17 | 13 | 5 | | | | |
| Comparative Example 17 | 18 | 15 | 11 | 3 | | | | |

TABLE 12

| | Initial Characteristics | | | | | |
|---|---|---|---|---|---|---|
| | C (μF) | DF (%) | Z (mΩ) | LC (μA) | Ratio of Defective/Sample (units/units) | Number of Short Circuit |
| Example 25 | 8.2 | 0.7 | 60 | 0.02 | 0/30 | 0 |
| Example 26 | 8.0 | 0.7 | 60 | 0.02 | 0/30 | 0 |
| Example 27 | 7.5 | 0.8 | 60 | 0.03 | 0/30 | 0 |
| Example 28 | 7.1 | 0.7 | 60 | 0.04 | 1/30 | 0 |
| Example 29 | 6.8 | 0.9 | 60 | 0.05 | 1/30 | 0 |
| Example 30 | 6.7 | 0.8 | 60 | 0.05 | 1/30 | 0 |
| Example 31 | 4.1 | 1.2 | 60 | 0.10 | 1/30 | 0 |
| Example 32 | 8.1 | 0.7 | 60 | 0.02 | 1/30 | 0 |

TABLE 12-continued

| | | Initial Characteristics | | | |
|---|---|---|---|---|---|
| | C (µF) | DF (%) | Z (mΩ) | LC (µA) | Ratio of Defective/Sample (units/units) | Number of Short Circuit |
| Comparative Example 14 | 6.9 | 1.3 | 60 | 0.16 | 9/30 | 7 |
| Comparative Example 15 | 6.8 | 0.6 | 60 | 0.09 | 1/30 | 0 |
| Comparative Example 16 | 6.0 | 3.2 | 85 | 0.41 | 14/30 | 9 |
| Comparative Example 17 | 5.8 | 3.3 | 91 | 0.42 | 28/30 | 17 |

As will be apparent from Table 11, in the sparking voltage test of Examples 25 to 32, substantially no decrease in voltage was observed at the initial stage, the sparking voltage at the completion of the reaction was 19 V or less in each Example. In Comparative Example 16 using ferric sulfate, the sparking voltage was largely reduced due to remaining of iron ion (ferric and ferrous ions) in a concentration as high as 8 wt % and the sparking voltage could not withstand until the prescribed reaction was completed. As a result, the solid electrolyte was insufficiently filled and this was disadvantageous.

INDUSTRIAL APPLICABILITY

The solid electrolytic capacitor device of the present invention, firstly, has a lamellar structure in the solid electrolyte layer and further advantageously has void spaces between the layers so that it is excellent in thermal relaxation ability, adhesion to electrically conducting paste layer, and ability of recovering dielectric film.

Secondly, since a specified condensed heterocyclic polymer is used as the solid electrolyte, the capacitor of the present invention is excellent in soldering heat resistance (reflow property) and thermal stability and also has good humidity resistance property. It has a high capacitance and low impedance. Also, its leakage current is low.

Thirdly, use of the above-mentioned polymer to form a lamellar structure and preferably further provision of a space portion therein gives rise to a solid electrolytic capacitor having excellent ability of relaxing thermal stress and excellent soldering heat resistance.

In particular, a solid electrolytic capacitor containing a sulfoquinone having at least one sulfoanion group and a quinone structure in the molecule in the solid electrolyte and an other anion other than the sulfoquinone, having a dopant function in combination, with the content of the sulfoquinone being 0.1–50 wt % and the sulfate ion content being 0.1–10 wt % and a solid electrolytic capacitor containing at least one anthracenemonosulfonic acid selected from anthracenesulfonic acid or derivatives thereof having a sulfonic acid group as a dopant in the solid electrolyte electrolyte and an other anion other than the sulfoquinone, having a dopant function in combination, with the content of the anthracenemonosulfonate being 0.1–50 wt % and the sulfate ion content being 0.1–10 wt % have greatly improved voltage resistant property (a sparking voltage test), high frequency property, tan δ, impedance property, leakage current, heat resistance (reflow property), etc., and has low impedance, is small in size and exhibits a high performance.

The invention claimed is:

1. A method for producing a solid electrolytic capacitor comprising a valve acting metal having pores, a dielectric film formed on a surface of the valve acting metal, and an electrically conducting polythiophene composition as a solid electrolyte provided on the dielectric film, the method comprising polymerizing a thiophene monomer represented by the following formula (IX):

wherein $R^4$ and $R^5$ each independently represents a hydrogen atom, a linear or branched, saturated or unsaturated C1–6 alkyl group or a substituent for forming at least one 5-, 6- or 7-membered heterocyclic structure containing two oxygen elements shown in the formula by combining the C1–6 alkyl groups to each other at any position, the ring structure formed in the scope thereof includes a chemical structure such as a vinylene group which may be substituted and a substituted phenylene group which maybe substituted, in the presence of naphthalenesulfonate anion by the action of a persulfate to form a solid electrolyte layer on the dielectric film, wherein the composition has a sulfate ion content of from 0.1 to 10 mol %.

2. The method for producing a capacitor as claimed in claim 1, in which the persulfate is ammonium persulfate or potassium persulfate.

3. The method for producing a capacitor as claimed in any one of claims 1 to 2, in which the polymerization by the action of an oxidizing agent within the metal oxide pores in the dielectric layer is repeated at least twice.

4. A method for producing a capacitor comprising a valve acting metal having pores, a dielectric film formed on a surface of the valve acting metal, and a solid electrolyte layer comprising an electrically conducting polymer composition layer provided on the dielectric film, in which the composition contains sulfoquinone anion having at least one sulfo anion group and a quinone structure in the molecule in an amount of 0.1–50 mol % and an anion other than the sulfoquinone anion in the range of 0.1–10 mol %, in which the method comprises polymerizing a monomer compound represented by the following formula (VIII):

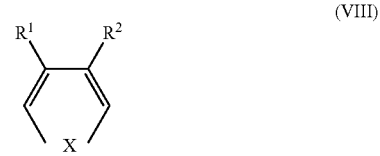

wherein $R^1$ and $R^2$ each independently represents a hydrogen atom, a linear or branched, saturated or unsaturated C1–6 alkyl, a linear or branched, saturated or unsaturated C1–6 alkoxy group, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, X represents a hetero atom selected from S, 0, Se, Te or NR$^3$, R$^3$ represents a hydrogen atom, a linear or branched, saturated or unsaturated C1–6 hydrocarbon group, a phenyl group or a linear or branched, saturated or unsaturated C1–6 alkoxy group, the alkyl group and the alkoxy group represented by R$^1$, R$^2$ or R$^3$ may optionally contain in the chain thereof a carbonyl bond, an ether bond, an ester bond, an amide bond or an imino bond, in the presence of a compound which donates a sulfoquinone anion by the action of an oxidizing agent to form a solid electrolyte layer.

5. The method for producing a solid electrolytic capacitor as claimed in claim 4, in which the monomer compound represented by general formula (VIII) above is a compound represented by the following general formula (IX):

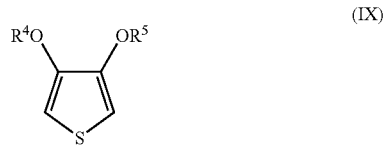

wherein R$^4$ and R$^5$ each independently represents a hydrogen atom, a linear or branched, saturated or unsaturated C1–6 alkyl group or a substituent for forming at least one 5-, 6- or 7-membered heterocyclic structure containing the two oxygen elements shown in the formula by combining the C1–6 alkyl groups to each other at any position, the ring structure formed in the scope thereof includes a chemical structure such as a vinylene group which may be substituted and a substituted phenylene group which may be substituted.

6. A method for producing a solid electrolytic capacitor comprising a valve acting metal having pores, a dielectric film formed on a surface of the valve acting metal, and a solid electrolyte layer comprising an electrically conducting polymer composition provided on the dielectric film, in which the composition contains sulfoquinone anion having at least one sulfo anion group and a quinone structure in the molecule in an amount of 0.1–50 mol % and an anion other than the sulfoquinone anion in the range of 0.1–10 mol %, the method comprising polymerizing a monomer by the action of an oxidizing agent to form a solid electrolyte layer on the dielectric film, in which the method comprises the steps of dipping the valve acting metal having formed thereon the dielectric film layer in a solution containing a monomer compound, and dipping in a solution containing an oxidizing agent and a sulfoquinone anion.

7. The method for producing a solid electrolytic capacitor as claimed in claim 6, in which the valve acting metal having formed thereon the dielectric film layer is dipped in a solution containing a monomer compound and then in a solution containing an oxidizing agent and a sulfoquinone anion.

8. The method for producing a solid electrolytic capacitor as claimed in claim 7, in which the method comprises the step of repeating in a plurality of times the steps of dipping the valve acting metal having formed thereon the dielectric film layer in a solution containing a monomer compound and then dipping the metal in a solution containing an oxidizing agent and a sulfoquinone anion.

9. The method for producing a solid electrolytic capacitor as claimed in claim 8, in which the method comprises the step of repeating in a plurality of times the steps of dipping the valve acting metal having formed thereon the dielectric film layer in a solution containing a monomer compound and then dipping the metal in a solution containing an oxidizing agent and a sulfoquinone anion, followed by washing and drying.

10. The method for producing a solid electrolytic capacitor as claimed in claim 6, in which the method comprises the step of dipping the valve acting metal having formed thereon the dielectric film in a solution containing an oxidizing agent and a sulfoquinone anion and then dipping the metal in a solution containing a monomer compound.

11. The method for producing a solid electrolytic capacitor as claimed in claim 10, in which the method comprises the step of repeating in a plurality of times the steps of dipping the valve acting metal having formed thereon the dielectric film in a solution containing an oxidizing agent and a sulfoquinone anion and then dipping the metal in a solution containing a monomer compound.

12. The method for producing a solid electrolytic capacitor as claimed in claim 11, in which the method comprises the step of repeating in a plurality of times the steps of dipping the valve acting metal having formed thereon the dielectric film in a solution containing an oxidizing agent and a sulfoquinone anion and then dipping the metal in a solution containing a monomer compound, followed by washing and drying.

13. A method for producing a solid electrolytic capacitor comprising a valve acting metal having pores, a dielectric film formed on a surface of the valve acting metal, and a solid electrolyte layer comprising an electrically conducting polymer composition provided on the dielectric film, in which the composition contains sulfoquinone anion having at least one sulfo anion group and a quinone structure in the molecule in an amount of 0.1–50 mol % and an anion other than the sulfoquinone anion in the range of 0.1–10 mol %, the method comprising polymerizing a monomer by the action of an oxidizing agent to form a solid electrolyte layer on the dielectric film, in which the method comprises the steps of dipping the valve acting metal having formed thereon the dielectric film layer in a solution containing an oxidizing agent and of dipping the metal in a solution containing a monomer compound and a sulfoquinone anion.

14. The method for producing a solid electrolytic capacitor as claimed in claim 13, in which the valve acting metal having formed thereon the dielectric film layer is dipped in a solution containing an oxidizing agent and then in a solution containing a monomer compound and a sulfoquinone anion.

15. The method for producing a solid electrolytic capacitor as claimed in claim 14, in which the method comprises the step of repeating in a plurality of times the steps of dipping the valve acting metal having formed thereon the dielectric film layer in a solution containing an oxidizing agent and then dipping the metal in a solution containing a monomer compound and a sulfoquinone anion.

16. The method for producing a solid electrolytic capacitor as claimed in claim 15, in which the method comprises the step of repeating in a plurality of times the steps of dipping the valve acting metal having formed thereon the dielectric film layer in a solution containing an oxidizing agent and then dipping the metal in a solution containing a monomer compound and a sulfoquinone anion, followed by washing and drying.

17. The method for producing a solid electrolytic capacitor as claimed in claim 13, in which the valve acting metal having formed thereon the dielectric film layer is dipped in a solution containing a monomer compound and a sulfoquinone anion and then in a solution containing an oxidizing agent.

18. The method for producing a solid electrolytic capacitor as claimed in claim 17, in which the method comprises the step of repeating in a plurality of times the steps of dipping the valve acting metal having formed thereon the dielectric film layer in a solution containing a monomer compound and a sulfoquinone anion and then dipping the metal in a solution containing an oxidizing agent.

19. The method for producing a solid electrolytic capacitor as claimed in claim 18, in which the method comprises the step of repeating in a plurality of times the steps of dipping the valve acting metal having formed thereon the dielectric film layer in a solution containing a monomer compound and a sulfoquinone anion and then dipping the metal in a solution containing an oxidizing agent, followed by washing and drying.

20. The method for producing a solid electrolytic capacitor as claimed in any one of claims 4 to 19, in which the oxidizing agent is a persulfate.

21. The method for producing a solid electrolytic capacitor as claimed in any one of claims 6 to 19, in which the oxidizing agent is a persulfate and the monomer compound is a compound represented by the following general formula (VIII)

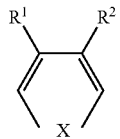

(VIII)

wherein $R^1$ and $R^2$ each independently represents a hydrogen atom, a linear or branched, saturated or unsaturated C1–6 alkyl, a linear or branched, saturated or unsaturated C1–6 alkoxy group, a hydroxyl group, a halogen atom, a nitro group, a cyano group, a trihalomethyl group, a phenyl group and a substituted phenyl group, $R^1$ and $R^2$ may be combined to each other at any position to form at least one divalent chain for forming at least one 5-, 6- or 7-membered saturated or unsaturated ring structure, X represents a hetero atom selected from S, O, Se, Te or $NR^3$, $R^3$ represents a hydrogen atom, a linear or branched, saturated or unsaturated C1–6 hydrocarbon group, a phenyl group or a linear or branched, saturated or unsaturated C1–6 alkoxy group, the alkyl group and the alkoxy group represented by $R^1$, $R^2$ or $R^3$ may optionally contain in the chain thereof a carbonyl bond, an ether bond, an ester bond, an amide bond or an imino bond.

22. The method for producing a solid electrolytic capacitor as claimed in claim 21, in which the monomer compound represented by the general formula (VIII) above is a compound represented by the following general formula (IX)

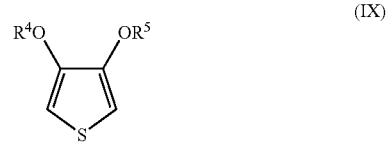

(IX)

wherein $R^4$ and $R^5$ each independently represents a hydrogen atom, a linear or branched, saturated or unsaturated C1–6 alkyl group or a substituent for forming at least one 5-, 6- or 7-membered heterocyclic structure containing the two oxygen elements shown in the formula by combining the C1–6 alkyl groups to each other at any position, the ring structure formed in the scope thereof includes a chemical structure such as a vinylene group which may be substituted and a substituted phenylene group which may be substituted.

* * * * *